(12) United States Patent
Das

(10) Patent No.: US 12,236,138 B2
(45) Date of Patent: Feb. 25, 2025

(54) CREATING ISOLATION BETWEEN MULTIPLE DOMAINS IN A HIERARCHICAL MULTI-TENANT STORAGE DEVICE

(71) Applicant: Kioxia Corporation, Tokyo (JP)

(72) Inventor: Saswati Das, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 44 days.

(21) Appl. No.: 18/194,953

(22) Filed: Apr. 3, 2023

(65) Prior Publication Data
US 2024/0329879 A1    Oct. 3, 2024

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0688* (2013.01)

(58) Field of Classification Search
None
See application file for complete search history.

(56) References Cited

U.S. PATENT DOCUMENTS

| | | | | |
|---|---|---|---|---|
| 11,972,153 | B1* | 4/2024 | Lercari | G06F 3/0659 |
| 2020/0089537 | A1* | 3/2020 | Bahirat | G06F 9/468 |
| 2022/0317931 | A1* | 10/2022 | Lee | G06F 3/0604 |
| 2023/0393877 | A1* | 12/2023 | Maroney | G06F 3/0664 |

OTHER PUBLICATIONS

Bolt, Rory, Unlocking the New Performance and QoS Capabilities of the Software-Enabled Flash™ API, Kioxia America, Inc., Storage Developer Conference, Sep. 22, 2020, https://www.snia.org/educational-library/unlocking-new-performance-and-qos-capabilities-software-enabled-flash™-api-2020, accessed Jul. 5, 2023, 35 pps.

(Continued)

*Primary Examiner* — Edward J Dudek, Jr.
*Assistant Examiner* — Ralph A Verderamo, III
(74) *Attorney, Agent, or Firm* — FOLEY & LARDNER LLP

(57) ABSTRACT

Systems, methods, non-transitory computer-readable media for creating isolation between multiple domains. One system includes a VD level disperser configured to segregate new write commands based on virtual device (VD) identifiers and maintain separate VD specific in-place linked lists. The system further includes a Quality of Service (QOS) level disperser configured to segregate VD specific commands of the VD specific in-place linked lists based on each of the VD specific commands respective QoS domain identifiers and maintain separate QoS domain specific linked lists. The system further includes a superblock level disperser configured to segregate QoS domain specific commands of the QoS domain specific in-place linked lists based on each of the QoS domain specific commands respective superblock or placement identifiers, maintain separate superblock-specific in-place linked lists for each superblock or placement identifier, and provide the superblock-specific in-place linked lists to a write divider.

20 Claims, 26 Drawing Sheets

(56) References Cited

OTHER PUBLICATIONS

The Linux Foundation, Technical Brief, Software-Enabled Flash™ Technology: Presenting Use Cases in Hyperscale and Beyond, Mar. 2023, Rev. 1.0, https://softwareenabledflash.org/wp-content/uploads/sites/4/2023/03/SEF_Use_Cases_in_Hyperscale_Tech_Brief_v1.pdf, accessed Jul. 5, 2023, 6 pps.
Bolt, Rory, Software Enabled Flash for Hyperscale Data Centers, KIOXIA America, Inc., TechTarget, Feb. 23, 2021, https://www.techtarget.com/searchstorage/post/Software-Enabled-Flash-for-Hyperscale-Data-Centers, accessed Jul. 5, 2023, 5 pps.

\* cited by examiner

| ADU number | Write Buffer ID | Flash Address | Internal Program Buffer ID | ADU offset in the SB | Write command ID |
|---|---|---|---|---|---|
| 0 | | | | | |
| 1 | | | | | |
| 2 | | | | | |
| ... | | | | | |
| 47 | | | | | |

| Command id | Next command in Command Table |
|---|---|
| 1 | 2 |
| 2 | 3 |
| 3 | 4 |
| 4 | 5 |
| 5 | 7 |
| 6 | |
| 7 | 8 |
| 8 | 9 |
| 9 | 10 |
| 10 | 12 |
| 11 | |
| 12 | 2047 |
| ... | |
| 2047 | NULL |

→ Head 802

→ Tail 804

| Command id | Next command in same VD |
|---|---|
| 1 | 2 |
| 2 | 3 |
| 3 | 4 |
| 4 | 5 |
| 5 | 7 |
| 6 | 10 |
| 7 | 8 |
| 8 | 9 |
| 9 | NULL |
| 10 | 12 |
| 11 | NULL |
| 12 | 2047 |
| ... | |
| 2047 | NULL |

→ VD1 Head 902

→ VD2 Head 912

→ VD1 Tail 904

→ VD2 Tail 914

| SB ID | Die Group ID |
|---|---|
| 1 | 1 |
| 2 | 2 |
| 3 | 1 |
| 4 | 2 |
| 5 | 1 |
| 6 | 2 |
| 7 | 1 |
| 8 | 2 |
| ..... | |
| 2000 | 2 |

| W1 ADU | W1 ADU | W2 ADU | W2 ADU | W2 ADU | W3 ADU |
|--------|--------|--------|--------|--------|--------|
| P1     | P1     | P2     | P2     | P2     | P3     |

CREATING ISOLATION BETWEEN MULTIPLE DOMAINS IN A HIERARCHICAL MULTI-TENANT STORAGE DEVICE

TECHNICAL FIELD

The present disclosure relates generally to systems and methods for managing data in data storage devices.

BACKGROUND

Software-Enabled Flash (SEF) devices manage and storage data, such as handling read and write operations. Due to fixed memory sizes and limited fast memory (SRAM/DTCM) in the SEF Device SoC it results in restricted support for the number of virtual devices (VDs) and open superblocks, and inadequate tenant isolation for commands across different QoS domains.

SUMMARY

Some arrangements relate to a system including a VD level disperser configured to segregate new write commands based on each of the plurality of new write commands respective virtual device (VD) identifiers and maintain separate VD specific in-place linked lists for each VD of a plurality of VDs. The system further includes a Quality of Service (QOS) level disperser configured to segregate a plurality of VD specific commands of the VD specific in-place linked lists based on each of the plurality of VD specific commands respective QoS domain identifiers and maintain separate QoS domain specific linked lists for each QoS domain of a plurality of QoS domains within the respective VD of the plurality of VDs. The system further includes a superblock level disperser configured to segregate a plurality of QoS domain specific commands of the QoS domain specific in-place linked lists based on each of the plurality of QoS domain specific commands respective superblock identifiers or placement identifiers, maintain separate superblock-specific in-place linked lists for each superblock identifier or placement identifier within a respective QoS domain of the plurality of QoS domains, and provide the superblock-specific in-place linked lists to a write divider.

In some arrangements, the system further includes the write divider configured to process, using a multi-stage round robin scheduler, a plurality of superblock commands of the superblock-specific in-place linked lists based on distributing the plurality of superblock commands into NAND flash units and providing the distributed plurality of superblock commands to individual die managers.

In some arrangements, each of the plurality of VD specific commands, the plurality of QoS domain specific commands, and the plurality of superblock commands include the new write commands.

In some arrangements, each of in-place linked lists maintains tenant isolation at a plurality of tenant isolations levels, the plurality of tenant isolations levels include at least a VD level, a QoS domain level, and a superblock level, and wherein each of the in-place linked lists includes head and tails pointers for each tenant isolation level of the plurality of tenant isolations levels.

In some arrangements, a plurality of VD specific in-place linked lists maintain tenant isolation at the VD level based on the VD level disperser organizing the plurality of VD specific commands in separate VD lists, each VD list corresponding to one of the plurality of VDs, wherein a plurality of QoS specific in-place linked lists maintain tenant isolation at the QoS domain level based on the QoS level disperser organizing the plurality of QoS domain specific commands in separate QoS lists, each QoS list corresponding to one of the plurality of VDs, and wherein a plurality of superblock specific in-place linked lists maintain tenant isolation at the superblock level based on the superblock level disperser organizing the plurality of superblock commands in separate superblock lists, each superblock list corresponding to a specific superblock identifier or placement identifier within one of the plurality of QoS domains.

In some arrangements, each of the separate VD specific in-place linked lists is one of a plurality of in-place linked lists and share a same memory structure including a plurality of command indices, VD head pointers, and VD tail pointers, wherein the separate VD specific in-place linked list is processed sequentially in a first-in-first-out (FIFO) routine by the VD level disperser, wherein the separate VD specific in-place linked list does not include a previous pointer.

In some arrangements, a multi-stage round robin scheduler is implemented with a plurality of stages, each of the plurality of stages corresponding to a different level of tenant isolation of a plurality of tenant isolation levels, and wherein the multi-stage round robin scheduler includes a first stage for the VD level disperser, a second stage for the QoS level disperser, and a third stage for the superblock level disperser.

In some arrangements, the multi-stage round robin scheduler maintains fairness among the plurality of VDs, the plurality of QoS domains, and the superblock identifiers or the placement identifiers for processing based on adjusting a selection frequency associated with a workload and priority of each tenant isolation level of the plurality of tenant isolation levels and tenant isolation based on scheduling commands from different VDs, different QoS domains, and different superblock identifiers or different placement identifiers.

In some arrangements, the multi-stage round robin scheduler is triggered by an event scheduler when any event in any tenant isolation level of the plurality of tenant isolation levels is set, and in response to triggering, initiating a scheduling process for a corresponding disperser operation of at least one of the VD level disperser, the QoS level disperser, or the superblock level disperser.

In some arrangements, the VD level disperser, the QoS level disperser, and the superblock level disperser are further configured to concurrently process commands in different tenant isolation levels.

Some arrangements relate to a method including receiving new write commands associated with a plurality of virtual devices (VDs) and a plurality of Quality of Service (QOS) domains, segregating, using separate VD specific in-place linked lists, the new write commands based on each of the new write commands respective VD identifiers, segregating, using separate QoS domain specific in-place linked lists, a plurality of VD specific commands of the VD specific in-place linked lists based on each of the plurality of VD specific commands respective QoS domain identifiers, segregating, using separate superblock-specific in-place linked lists, a plurality of QoS domain specific commands of the QoS domain specific in-place linked lists based on each of the plurality of QoS domain specific commands respective superblock identifiers or placement identifiers, and providing one or more superblock-specific in-place linked list identifiers of the superblock-specific in-place linked lists to a write divider.

In some arrangements, the method further includes processing, using a round robin scheduler, a plurality of superblock commands of the superblock-specific in-place linked lists based on distributing the plurality of superblock commands into NAND flash units and providing the distributed plurality of superblock commands to individual die managers.

In some arrangements, each of the plurality of VD specific commands, the plurality of QoS domain specific commands, and the plurality of superblock commands include the new write commands.

In some arrangements, each of the in-place linked lists maintains tenant isolation at a plurality of tenant isolations levels, the plurality of tenant isolations levels include at least a VD level, a QoS domain level, and a superblock level, and wherein each of the in-place linked lists includes head and tails pointers for each tenant isolation level of the plurality of tenant isolations levels.

In some arrangements, a multi-stage round robin scheduler is implemented with a plurality of stages, each of the plurality of stages corresponding to a different level of tenant isolation of a plurality of tenant isolation levels, and wherein the multi-stage round robin scheduler includes a first stage for a VD level disperser, a second stage for a QoS level disperser, and a third stage for a superblock level disperser.

In some arrangements, the multi-stage round robin scheduler maintains fairness among a plurality of VDs, a plurality of QoS domains, and superblock identifiers or the placement identifiers for processing based on adjusting a selection frequency associated with a workload and priority of each tenant isolation level of the plurality of tenant isolation levels and tenant isolation based on scheduling commands from different VDs, different QoS domains, and different superblock identifiers or different placement identifiers.

In some arrangements, the multi-stage round robin scheduler is triggered by an event scheduler when any event in any tenant isolation level of the plurality of tenant isolation levels is set, and in response to triggering, initiating a scheduling process for a corresponding disperser operation of at least one of the VD level disperser, the QoS level disperser, or the superblock level disperser.

Some arrangements relate to a method including receiving write commands associated with a plurality of virtual devices (VDs) and a plurality of Quality of Service (QOS) domains, segregating the write commands into a plurality of first segregated write commands for respective VDs, segregating the plurality of first segregated write commands into a plurality of second segregated write commands for respective QoS domains within each VD, segregating the plurality of second segregated write commands into a plurality of third segregated write commands for superblock IDs within each QoS domain, and dividing the plurality of third segregated write commands into NAND flash units based on NAND die WLSTRs.

In some arrangements, segregating the write commands into the plurality of first segregated write commands for the respective VDs includes implementing a VD specific in-place linked list of next pointers to maintain tenant isolation at a VD level, wherein segregating the plurality of first segregated write commands into the plurality of second segregated write commands for the respective QoS domains within the each VD includes implementing a QoS domain specific in-place linked list of next pointers to maintain the tenant isolation at a QoS domain level within each VD, and wherein the segregating the plurality of second segregated write commands into the plurality of third segregated write commands for the superblock IDs within the each QoS domain includes using a superblock specific in-place linked list of next pointers to maintain the tenant isolation for data of different placement IDs or superblock IDs in a respective QoS domain of the plurality of QoS domains.

In some arrangements, a multi-stage round robin scheduler is implemented with a plurality of stages, each of the plurality of stages corresponding to a different level of tenant isolation of a plurality of tenant isolation levels, and wherein the multi-stage round robin scheduler includes a first stage for segregating the write commands into the plurality of first segregated write commands, a second stage for the segregating the plurality of first segregated write commands into the plurality of second segregated write commands, and a third stage for segregating the plurality of second segregated write commands into the plurality of third segregated write commands.

BRIEF DESCRIPTION OF THE DRAWINGS

FIG. 7 depicts a write pointer table utilized in managing write operations, according to some arrangements;

FIG. 8 depicts a command sequence in a command table of VDs, QoS domains, and placement IDs within an SEF device, according to some arrangements;

FIG. 9 depicts a command table implemented by a VD level disperser employing in-place linked lists to segregate commands belonging to different VDs, according to some arrangements;

Figure 1:
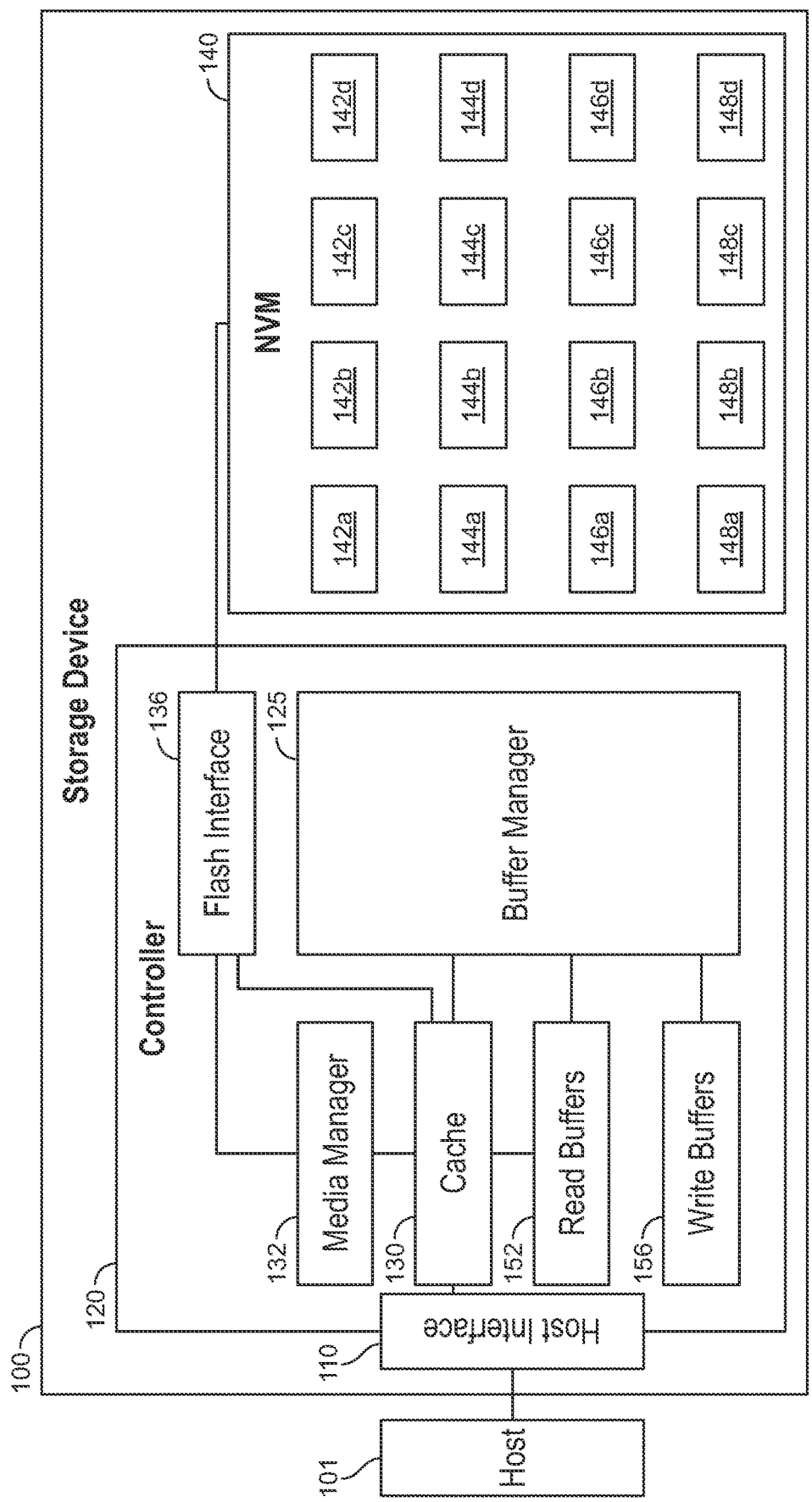
FIG. 1 shows a block diagram of an example storage device, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the figures, systems and methods for managing data storage. In some arrangements, the multi-tenant storage architecture described herein provide various improvements in terms of performance, scalability, and efficiency. In some arrangements, tenant isolation is maintained across virtual devices (VDs), Quality of Service (QOS) domains, and placement IDs or open superblock IDs, ensuring that a large number of commands in one tenant group do not adversely affect the latency of commands in other groups. The multi-tenant storage architecture features a minimal memory footprint, managing multiple VDs, QoS domains, and open superblocks with limited memory resources. This multi-tenant storage architecture is scalable, allowing for expansion from a single VD or QoS domain to a vast number of each, limited only by the NAND type and configuration.

In some systems, SEF devices encounter and display problems in maintaining tenant isolation between write commands associated with different VDs, QoS domains within a VD, and placement IDs (or open superblocks) within a QoS domain, all within limited memory resources and dynamically changing workloads. Current approaches have limitations in supporting multiple VDs and open superblocks due to the fixed memory size of arrays and limited memory in embedded systems. Consequently, the number of VDs and open superblocks a device can support is restricted by the size of fast memory (SRAM/DTCM) in the SEF Device SoC. Additionally, current designs do not provide tenant isolation for commands belonging to different QoS Domains, failing to meet a crucial requirement of SEF devices. To solve this problem, a new architecture is proposed that employs in-place linked lists and a multi-stage round robin scheduler to maintain tenant isolation across different VDs, QoS domains, and placement IDs or open superblocks. This approach reduces memory footprint, enables scalability, and provides predictable latency across multiple tenants, while ensuring flexibility and portability across various system-on-chip (SoC) configurations. The new architecture overcomes the limitations of the current methods and enhances the overall performance of SEF devices in dynamic workloads.

Additionally, the multi-tenant storage architecture is portable across multiple System-on-Chip (SoC) platforms, regardless of available SRAM, providing a high degree of flexibility. In some arrangements, QoS-based isolation is achieved by segregating commands according to QoS domains and incorporating a QoS domain arbitrator in the Die Manager to maintain predictable latency. In particular, the multi-tenant storage architecture supports dynamic configurations, adapting to varying numbers of commands in dynamically changing workloads in Software-Enabled Flash (SEF) environments. Furthermore, the multi-tenant storage architecture described herein allows for encapsulation within the three-stage write disperser and porting to various end-to-end write command designs. The concept of using in-place linked lists and multi-stage round robin schedulers creates a design that can be applied to maintain tenant isolation in various types of SSD devices, such as multi-stream SSDs, IOD devices, and ZNS (Zone Namespace SSD) devices. Accordingly, this the multi-tenant storage architecture provides predictable latency across multiple tenants by utilizing a multi-stage round robin scheduling method, promoting fairness at each stage of tenant hierarchy.

In some systems, SEF devices encounter limitations with the number of VDs and the number of open superblocks or placement IDs they can support, as memory is constrained in embedded systems. In various arrangements, the number of open superblocks a device can handle is limited by the number of IPCs and write buffer pointer entries the SEF device SoC can support within its limited fast memory (SRAM/DTCM). Consequently, current approaches do not consider superblock WLSTR completeness for allocating write buffer pointers, leading to unnecessary allocation of limited SRAM memory for write buffer pointer entries that cannot be scheduled until the full sequence program (FSP) unit for the NAND is complete. This limitation hinders the device's ability to support a larger number of open superblocks. Moreover, the current approaches to achieve die parallelism consumes significant memory by dividing write commands into die units before checking for die WLSTR completeness and priority. This design choice necessitates the use of slower memory, such as DRAM, in the fast I/O path, consequently reducing write performance.

To address the limitations and problems, the multi-tenant storage architecture described herein overcomes the limitations of traditional SEF devices by addressing the challenge of maintaining tenant isolation between write commands belonging to different VDs, different Qos domains within a VD, and different open superblocks (or placement IDs) within QoS domains. This architecture does so with a limited number of IPCs (inter-processor communication) and a limited memory footprint, all while handling dynamically varying workloads and maintaining maximum write performance through optimal utilization and parallelization of NAND die bandwidth.

The systems and methods described herein use die group IDs to segregate superblocks based on die groups per QoS domain, thereby achieving NAND die parallelism during NAND programming and maximizing NAND bandwidth utilization for optimal write throughput. Additionally, the architecture employs a superblock wordline string (WL-STR) completeness identifier and a priority scheduler to determine the next superblock to program in the die group for the QoS domain, avoiding the need to maintain a subset of write command context on a per-die basis for all open superblocks in the backend module. In some arrangements, after selecting the superblock ID to program next per QoS domain, the systems and methods can use a weighted round robin scheduler as a QoS domain arbitrator to select the superblock ID to program in a die group among the QoS domains, preventing the noisy neighbor issue across QoS domains. By utilizing die group ID segregators, superblock completeness identifiers, priority schedulers, and QoS arbitrators, the architecture reduces the number of write command IPCs to 1 per die and the write pointer list to 1 WLSTR per die. This architecture also reduces the number of write sub-command contexts to be maintained on a per-die basis to 1 WLSTR per die at a time, significantly decreasing the memory footprint required in fast memory (SRAM/DTCM).

To assist in illustrating the present implementations, FIG. 1 shows a block diagram of a system including a storage device 100 coupled to a host 101 according to some implementations. In some examples, the host 101 can be a user device operated by a user. The host 101 may include an Operating System (OS), which is configured to provide a filesystem and applications that use the filesystem. The filesystem communicates with the storage device 100 (e.g., a controller 110 of the storage device 100) over a suitable wired or wireless communication link or network to manage storage of data in the storage device 100.

In that regard, the filesystem of the host 101 sends data to and receives data from the storage device 100 using a suitable host interface 110. The host interface 110 allows the software (e.g., the filesystem) of the host 101 to communicate with the storage device 100 (e.g., the controller 110). While the host interface 110 is conceptually shown as a block between the host 101 and the storage device 100, the host interface 110 can include one or more controllers, one or more namespaces, ports, transport mechanism, and connectivity thereof. To send and receive data, the software or filesystem of the host 101 communicates with the storage device 100 using a storage data transfer protocol running on the host interface 110. Examples of the protocol include but is not limited to, Non-Volatile Memory Express (NVMe) protocols. The host interface 110 includes hardware (e.g., controllers) implemented on the host 101, the storage device 100 (e.g., the controller 110), or another device operatively coupled to the host 101 and/or the storage device 100 via one or more suitable networks. The host interface 110 and the storage protocol running thereon also includes software and/or firmware executed on the hardware.

In some examples, the storage device 100 is located in a datacenter (not shown for brevity). The datacenter may include one or more platforms, each of which supports one or more storage devices (such as but not limited to, the storage device 100). In some implementations, the storage devices within a platform are connected to a Top of Rack (TOR) switch and can communicate with each other via the TOR switch or another suitable intra-platform communication mechanism. In some implementations, at least one router may facilitate communications among the storage devices in different platforms, racks, or cabinets via a suitable networking fabric. Examples of the storage device 100 include non-volatile devices such as but are not limited to, a Solid State Drive (SSD), a Non-Volatile Dual In-line Memory Module (NVDIMM), a Universal Flash Storage (UFS), a Secure Digital (SD) device, and so on.

The storage device 100 includes at least a controller 110 and a Non-Volatile Memory (NVM) 140. Other components of the storage device 100 are not shown for brevity. The NVM 140 includes NAND flash memory devices. Each of the NAND flash memory devices includes one or more of the NAND flash dies 142*a*-142*d*, 144*a*-144*d*, 146*a*-146*d*, and 148*a*-148*d*, which are NVM capable of retaining data without power. Thus, the NAND flash memory devices refer to multiple NAND flash memory devices or dies within the NVM 140. The NVM 140 can therefore be referred to a memory array of dies as shown. Each of the dies 142*a*-142*d*, 144*a*-144*d*, 146*a*-146*d*, and 148*a*-148*d* has one or more planes. Each plane has multiple blocks, and each block has multiple pages.

The dies 142*a*-142*d*, 144*a*-144*d*, 146*a*-146*d*, and 148*a*-148*d* can be arranged in one or more memory communication channels connected to the controller 120. For example, dies 142*a*-*d* can be configured on one memory channel, dies 144*a*-*d* on another, and so on. While the 16 dies 142*a*-142*d*, 144*a*-144*d*, 146*a*-146*d*, and 148*a*-148*d* are shown in FIG. 1, the NVM 140 can include any suitable number of NVM dies that are arranged in one or more channels in communication with the controller 120.

While the dies 142*a*-142*d*, 144*a*-144*d*, 146*a*-146*d*, and 148*a*-148*d* are shown as an example implementation of the NVM 140, other examples of NVM technologies for implementing the NVM 140 include but are not limited to, Magnetic Random Access Memory (MRAM), Phase Change Memory (PCM), Ferro-Electric RAM (FeRAM), Resistive RAM (ReRAM), and so on. The buffer mechanisms described herein can be likewise implemented on memory systems using such memory technologies and other suitable memory technologies. Examples of the controller 110 include but are not limited to, an SSD controller (e.g., a client SSD controller, a datacenter SSD controller, an enterprise SSD controller, and so on), a UFS controller, or an SD controller, and so on.

The controller 110 can combine raw data storage in the dies 142*a*-142*d*, 144*a*-144*d*, 146*a*-146*d*, and 148*a*-148*d* such that those dies 142*a*-142*d*, 144*a*-144*d*. 146*a*-146*d*, and 148*a*-148*d* function as a single storage. The controller 110 can include processors, microcontrollers, central processing units (CPUs), a cache 130, buffers (e.g., buffers 152 and 156), error correction systems, data encryption systems, a media manager 132, a flash interface 136, and so on. Such functions can be implemented in hardware, software, and firmware or any combination thereof. In some arrangements, the software/firmware of the controller 110 can be stored in the NVM 140 or in any other suitable computer readable storage medium.

The controller 110 includes suitable processing and memory capabilities for executing functions described herein, among other functions. The controller 110 manages various features for the NVM 140, including but not limited to, I/O handling, reading, writing/programming, erasing, monitoring, logging, wear error handling, leveling, data protection (encryption/decryption), and the like. Thus, the controller 110 provides visibility to the dies 142a-142d, 144a-144d, 146a-146d, and 148a-148d. Each of the cache 130, the read buffers 152, and the write buffers 156 is a local memory of the controller 110. In some examples, each of the cache 130, the read buffers 152, and the write buffers 156 includes one or more volatile storages. In some examples, each of the cache 130, the read buffers 152, and the write buffers 156 is a non-volatile persistent storage. Examples of each of the cache 130, the read buffers 152, and the write buffers 156 include but are not limited to, RAM, DRAM, Static RAM (SRAM), MRAM, PCM, and so on.

The read buffers 152 store data read from the NVM 140 in response to a read command from the host 101. The controller 120 can transfer the data from the read buffers 152 to the host 101 via the host interface 110. In some examples, data for each range of logical addresses is stored in one of the read buffers 152. After data is transferred to the host 101, each of the read buffers 152 can exist for a period of time before being used to cache data for another range of logical addresses. During that period of time, in response to receiving another read command for the same range of logical addresses, a hit on the read buffer has occurred, and the controller 120 can transfer the same data from that read buffer to the host 101, without having to read from the NVM 140. Arrangements disclosed herein relate to dynamically managing the read buffers 152, as disclosed in further detail herein.

The write buffers 156 store data received from the host 101 (via the host interface 110). The controller 120 can write the data stored in the write buffers 156 to the NVM 140 (e.g., to the dies 142a-142d, 144a-144d, 146a-146d, and 148a-148d). The buffer manager 125 include suitable hardware (e.g., one or more CPUs), software, and/or firmware configured for managing the cache 130, the read buffers 152 and the write buffers 156. In some examples, the buffer manager 125 is implemented using dedicated hardware (e.g., dedicated processors, CPUs, and memories).

The media manager 132 manages the reliability of the NAND across the lifetime of the SEF device by executing several NAND management algorithms such as wear leveling and read disturb management algorithms. The media manager can also periodically check the health of the device by executing several schemes such as Patrol Read, 1$^{st}$ Read and Third Read and relocates the data to a new block if the data in the old block loses its reliability due to too many concentrated reads or writes. The media manager 132 can close an open block through NULL padding if it remains open for too long time thereby making it error prone.

The flash interface 136 (e.g., a Flash Interface Layer (FIL)) processes incoming flash commands in a command queue, schedules those commands in an optimal fashion for the destination physical memory die for the command. In some examples, the controller 120 (e.g., the host interface 110) receives a read command from the host 101 and forwards the read command to the cache 130. The cache 130 sends the range of logical addresses to the buffer manager 125. The buffer manager 125 determines whether the range of logical addresses overlaps with a range of logical addresses corresponding to one of the read buffers 152 or the write buffers 156 (hit on a buffer). In response to determining whether a hit on one of the write buffers 156 has occurred, the buffer manager 125 reports the hit result back to the cache 130. The buffer manager 125 manages the free list and the in-use list as described herein.

Figure 2:
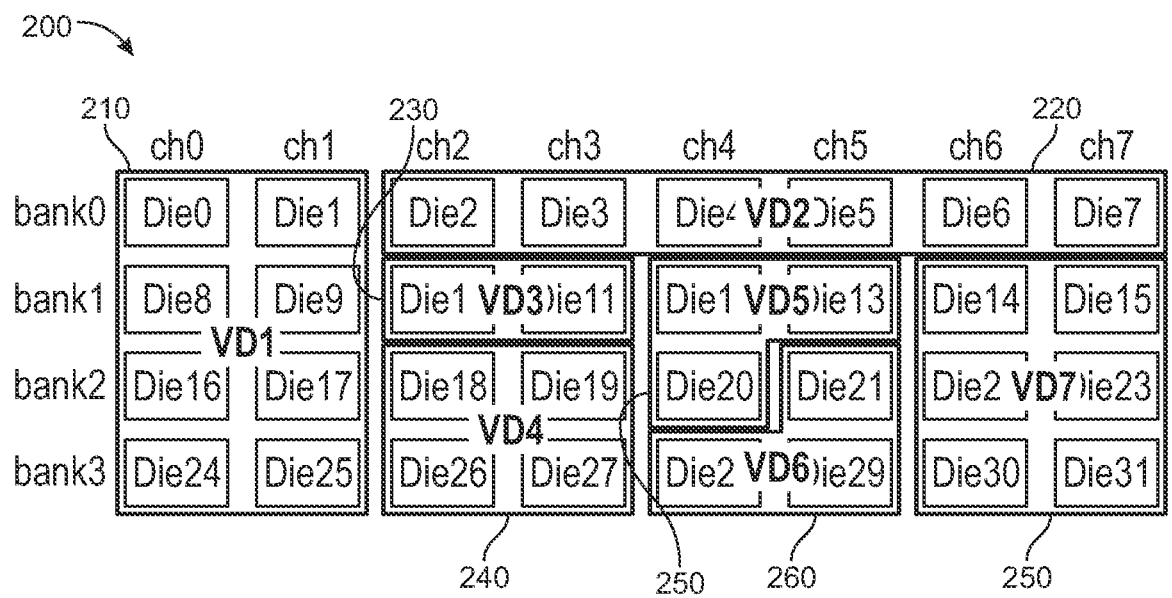
FIG. 2 depicts a software-enabled flash (SEF) including virtual devices (VDs), according to some arrangements.

Referring now to FIG. 2, a software-enabled flash (SEF) 200 including virtual devices (VDs), according to some arrangements. Each VD (e.g., VD1 210, VD2, 220, VD3 230, VD4 240, VD5 250, VD6 260, and VD7 270) can be a software abstraction that represents a configurable execution unit composed of one or more dies. A die is a NAND flash media unit. These dies can be combined to create a VD, and the SEF can maintain tenant isolation across multiple VDs. Further, the NAND dies can be used to store data in a non-volatile fashion. As shown in FIG. 2, an SEF supports the configuration of a certain number of VDs, depending on the total number of dies available in the Stock Keeping Unit (SKU). The SKU represents a specific product variation, which can include different combinations of dies, features, and capabilities.

In some arrangements, the configuration of a VD (i.e., virtual device) is a one-time process that takes place during device initialization at the first boot. This configuration is carried out by the host system, which determines the number of dies assigned to each VD. The number of dies in a VD can range from a single die to the total number of dies present in the SKU (e.g., VD1 210, VD2, 220, VD3 230, VD4 240, VD5 250, VD6 260, and VD7 270). Virtual domains can be created by segregating the dies into different VDs. Each virtual domain can have one or more dies, and the number of virtual domains can vary based on the dies' allocation. For example, a single die can be designated as one virtual domain, or a combination of 8 dies (e.g., VD1 210) can be grouped together to form another virtual domain. Since this configuration is performed by the host system at the time of device initialization, it ensures that the VD is optimally configured for its intended purpose. Accordingly, a VD is a flexible, software-configurable execution unit that is composed of one or more dies. The configuration process, which can be performed by the host at the time of device initialization, can adapt the number of dies in a VD, ranging from one to the total number of dies available in the SKU.

Figure 3:
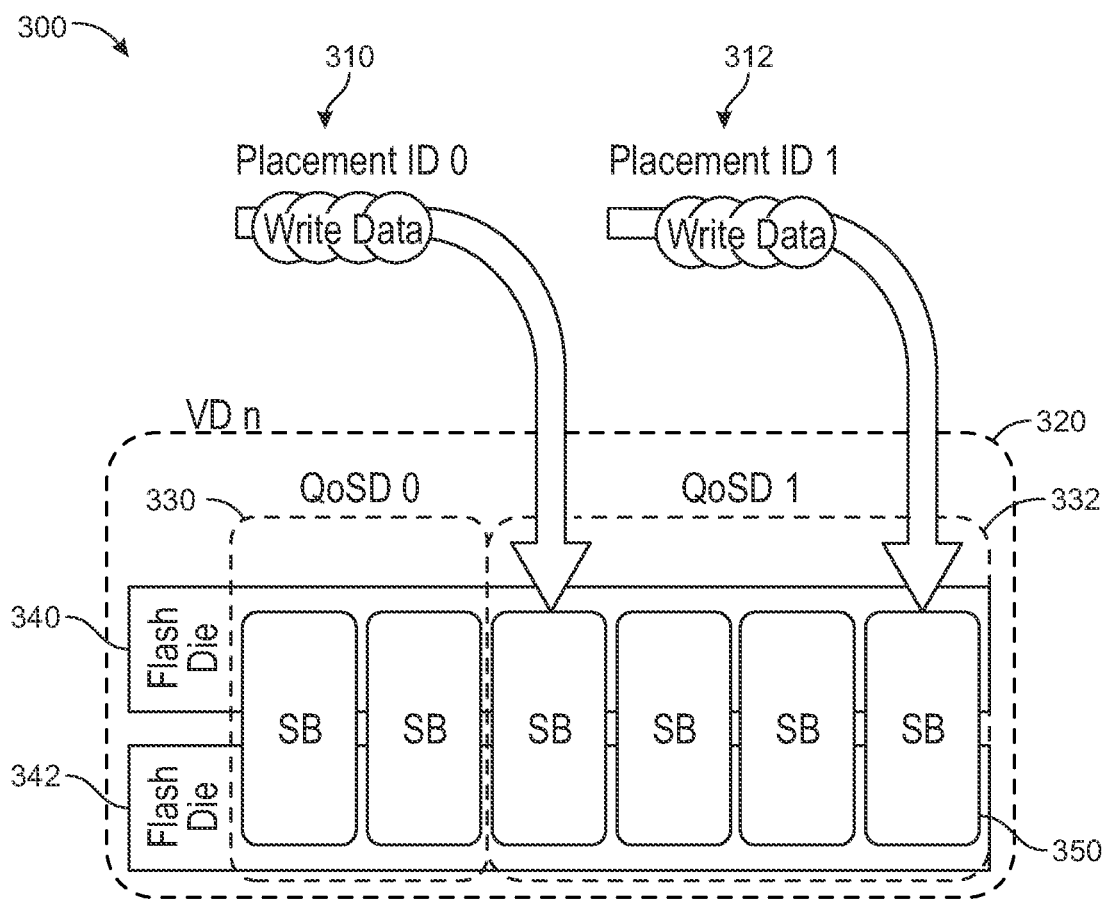
FIG. 3 depicts a VD device architecture including a plurality of QoS domains, according to some arrangements.

Referring now to FIG. 3, a VD device architecture 300 including a plurality of QoS domains, according to some arrangements. As shown, a VD 320 can include a plurality of QoS domains (e.g., 330 and 332). By implementing QoS domains 330 and 332, the SEF 200 can maintain predictable latency across the QoS domains inside the VD 320. In some arrangements, to maintain isolation between different QoS domains, data from separate domains are never mixed within an open superblock (e.g., 350, 6 superblocks are shown). In one aspect, a superblock is made from multiplane physical blocks across all the dies in a VD (i.e., selecting a multiplane physical block across all the dies in a VD).

In some arrangements, the SEF device can be responsible for maintaining tenant isolation between these different QoS domains. In some arrangements, each VD is divided into several QoS domains. Hardware-level isolation is maintained for each VD, while software-level isolation is implemented for the QoS domains within each VD. For example, FIG. 3 includes a VD 320 with two flash dies 340 and 342. Within this VD, there are multiple superblocks 350, with each QoS domain (e.g., either QoSD 0 330 or QoSD 1 332) containing multiple superblocks 350. In this example, the two superblocks with their respective QoS domain 330 provide an additional layer of isolation and within VD 320.

In some arrangements, each QoS domain 332 and 332 contains several Placement IDs (e.g., placement ID 310 and 312) or Superblock IDs, which represent individual storage allocations within the domain. In some arrangements, to ensure data isolation, data from different Placement IDs may not be mixed. As a result, each Placement ID's data (e.g., 310 and 312) can be stored in separate superblocks 350. Accordingly, a QoS domain (E.g., 330 and 332) is a software abstraction that provides fine-grained control over resources within a VD. By diving the VDs into QoS domains, the SEF drive can maintain scalable isolation and predictable latency across QoS domains. In some arrangements, hardware-level isolation is maintained for each VD, while software-level isolation is implemented for the QoS domains within each VD. Each QoS domain contains several Placement IDs or Superblock IDs (e.g., 310 and 312), which represent individual storage allocations within the domain, ensuring and isolation.

In some arrangements, when a superblock (e.g., 350) is full, the Placement ID can point to another superblock 350 for additional storage. This allocation is sometimes determined by the host system, while in other implementations, it can be determined by the SEF device itself. In general, placement IDs can be used in each QoS domain for issuing I/O commands in the SEF device. By using unique Placement IDs for each data type, the SEF device can ensure that data with different IDs are stored in separate open superblocks. This prevents the mixing of different types of data and helps maintain the desired quality of service for various tasks and applications running on the device. In some arrangements, the host system may issue a Nameless Write command with a Placement ID or Superblock ID to store data in the SEF device. This command allows the host to write data without specifying a particular location in the device, as the Placement ID or Superblock ID helps the device determine where the data should be stored. Thus, this can maintain hardware-level isolation within VDs and software-level isolation among QoS domains. By segregating data according to Placement IDs (e.g., 310 and 312) and storing them in separate superblocks (e.g., 350), the system can achieve a higher level of performance and while maintaining strict isolation between different types of data.

In some arrangements, an atomic data unit (ADU) is a combination of user data and associated metadata that is written or read atomically. For example, the entire unit is processed as a single operation, ensuring data consistency and integrity. In some arrangements, an ADU offset of a command can refer to the starting ADU in a superblock ID to which a command is to be read or written. By specifying the ADU offset, the system can determine where to access the required data within the superblock. In some arrangements, each VD can be divided into a number of die groups, each with a unique Die Group ID (as shown with reference to FIG. 2). A die group is a set of dies that a superblock consists of. The Die Group ID ranges from a minimum value (e.g., 0) to a maximum value determined by the total number of dies in a VD divided by the number of dies in a superblock, minus one. For example, Die0, Die1, Die8, and Die9 can form one die group, while Die16, Die17, Die24, and Die25 could form another die group. This segregation of dies into groups helps maintain parallelism within the VD, improving overall system performance.

In some arrangements, a wordline String (WLSTR) represents a minimum number of pages for one Full Sequence Program (FSP) unit in a NAND flash memory. In Triple-Level Cell (TLC) NAND, it includes lower, middle, and upper pages. These pages may be written simultaneously in TLC NAND. In some arrangements, a Superblock WLSTR represents one wordline string (WLSTR) across all the dies in the superblock. It ensures that data is written consistently across all dies within the superblock. In some arrangements, a die manager is a sub-module in the SEF backend responsible for managing individual dies within the SEF unit. In one aspect, there can be one die manager for each die, ensuring precise control and coordination of the dies. In some arrangements, a write divider is a component that divides write or read commands into flash access units. In some arrangements, a virtual block represents one multi-plane block in a NAND die. For example, in a 4-plane NAND, it consists of 4 physical blocks in 4 planes. This abstraction allows for more efficient data management and organization within the NAND die. Accordingly, these concepts and components described above work together to provide efficient data management, parallelism, and tenant isolation and predictable latency among the VDs. By utilizing ADUs, die groups, WLSTRs, and other elements, the system can ensure predictable latency and optimize overall performance.

Figure 4:
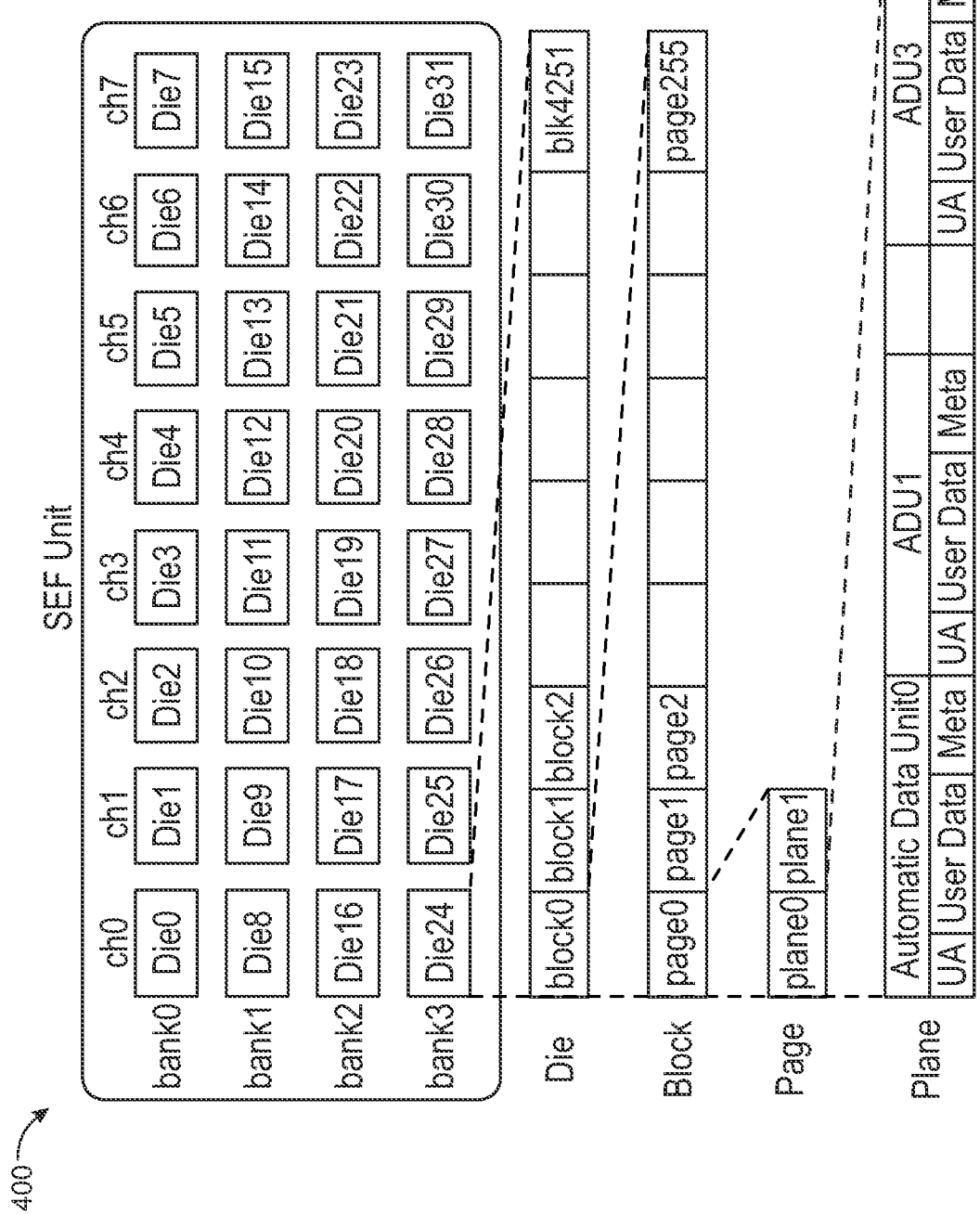
FIG. 4 depicts an SEF unit including a hierarchical organization and data storage structure, according to some arrangements.

Referring to now FIG. 4, an SEF unit 400 including a hierarchical organization and data storage structure, according to some arrangements. The SEF unit 400 (sometimes referred to herein as an "SEF system") includes multiple dies, each of which contains numerous blocks. Each block, in turn, includes multiple pages, and each page has multiple planes. This hierarchical structure allows for efficient data storage and management within the SEF unit 400. In the shown configuration, a single plane represents a virtual plane, which can include, but is not limited to, user data, metadata, and user addresses. Metadata is additional information about the data, such as timestamps or file attributes, while user addresses are pointers that indicate where the actual user data is stored within the SEF unit 400. For example, one plane may contain four ADUs. An ADU is the minimum unit of data that can be read or written atomically within the SEF unit 400. By ensuring that each ADU is processed as a single operation, the system maintains data consistency and integrity.

In general, the hierarchical structure of the SET unit 400 can represent the entire storage device, including multiple dies. Each die can be an individual integrated circuit within the SEF unit, containing numerous blocks. A block can be a data storage unit within a die, composed of multiple pages. A page can be a storage unit within a block, encompassing several planes. A plane can be a virtual layer within a page, responsible for storing user data, metadata, and user addresses. Lastly, an ADU represents the smallest data unit that can be read or written atomically within a plane. This hierarchical organization allows the SEF unit 400 to efficiently manage and store data across various levels. Utilizing virtual planes and ADUs, the SEF unit 400 can maintain data integrity and consistency while optimizing storage usage and performance.

Figure 5:
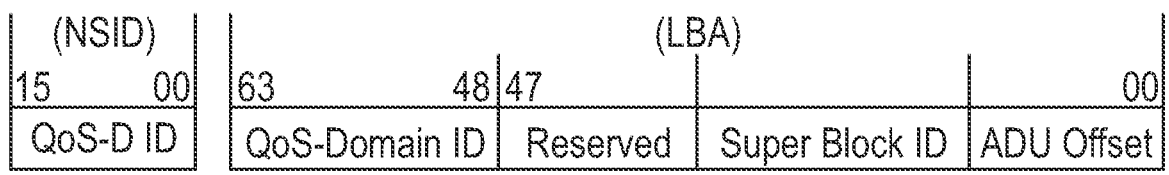
FIG. 5 depicts a flash address provided in an SEF device, according to some arrangements.

Referring now to FIG. 5, a flash address 500 provided in an SEF device is shown, according to some arrangements. As shown, the flash address 500 contains the media address, which includes the QoS domain ID, the superblock ID, and the ADU offset within that superblock. In some arrangements, in an SEF device, the host is responsible for managing the physical-to-logical address mapping, which allows it to directly control data placement and optimize storage utilization based on its knowledge of the underlying storage architecture. The media address provided by the host encompasses the following components: (1) QoS domain ID—this identifier is used to segregate and prioritize commands based on their respective QoS domains; (2) superblock ID—this identifier allows the storage system to manage data placement and operations at the superblock level; and (3) ADU offset—this is the specific offset within the superblock where the data will be written or read.

Figure 6:
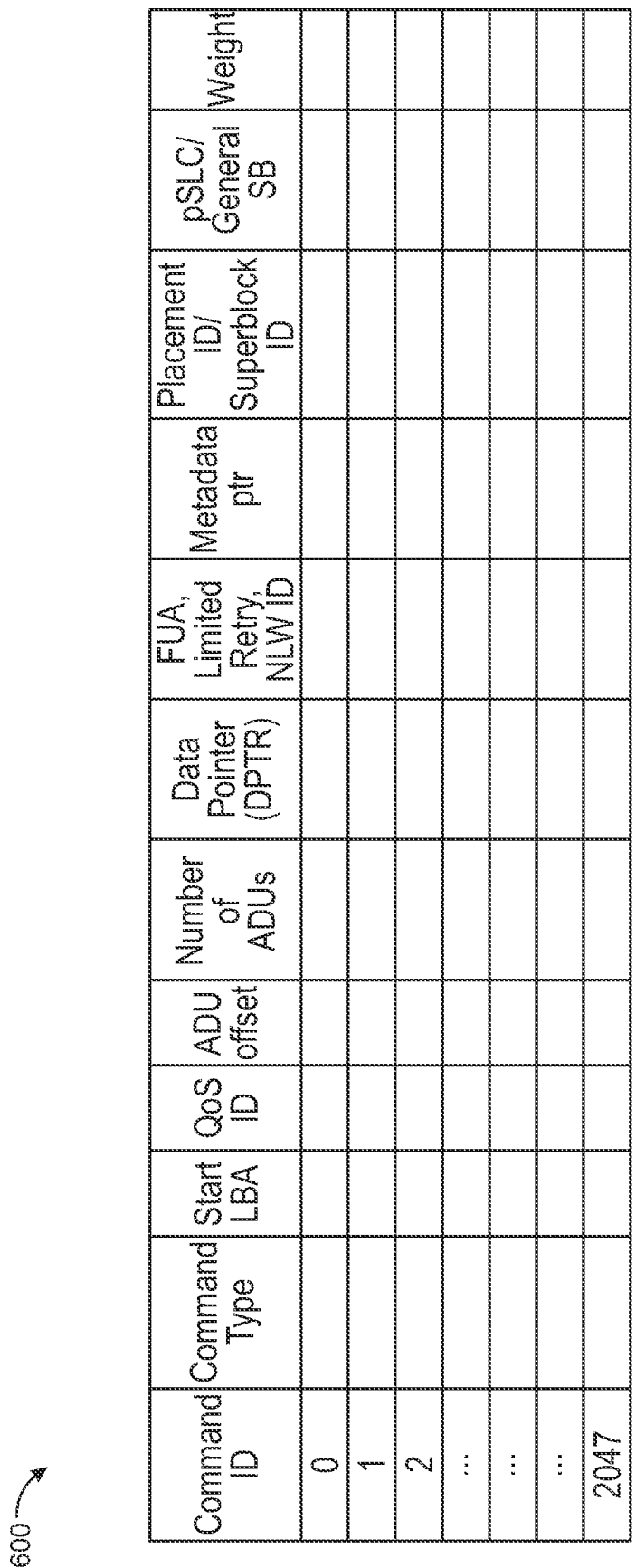
FIG. 6 depicts a command table of SEF firmware, according to some arrangements.

Referring now to FIG. 6, a command table 600 of SEF firmware, according to some arrangements. The command table 600 can be within an SEF host command manager layer and can be maintained and updated by a command manager (e.g., command manager 2002 of FIG. 20). In some arrangements, the SEF host command manager layer can include a host command manager (e.g., command manager 2002), a write disperser (e.g., 3-stage write disperser 2010), and a write divider (e.g., write divider 2020). The host command manager can receive commands from the host system and organizes them in the command table 600. The command table 600 can contains several fields to store information about each command.

For example, the command table 600 can include, but is not limited to, command IDs—a unique identifier for each command in the table, allowing for easy tracking and management of individual commands; a command type-specifies the type of command, such as read, write, or erase, informing the system how to process the command; a start Logical Block Address (LBA)—indicates the starting block address where the command should be executed; a Quality of Service (QoS) ID—identifies the QoS domain associated with the command, ensuring that commands are processed according to their designated quality of service levels; an ADU Offset-specifies the starting ADU in a superblock ID to which a command is to be read or written, allowing the system to access the required data within the superblock; a number of ADUs—indicates the total number of ADUs involved in the command, helping the system allocate and manage the necessary resources for command execution; a Data Pointer (DPTR)—points to the location of the user data associated with the command, ensuring efficient access and management of the data within the SEF unit; a Force Unit Access (FUA) Limited Retry Nameless Write (NLW) ID—field is used for specific command types that require additional parameters or flags, such as forced access or limited retries during the execution of a nameless write command; a metadata pointer—points to the location of the metadata associated with the command, ensuring efficient access and management of metadata within the SEF unit; placement ID/superblock ID—identifies the placement or superblock associated with the command, allowing the system to locate and manage the appropriate storage location within the SEF unit; a weight—indicates the priority or importance of the command, helping the system manage and execute commands based on their designated priorities; and other parameters-additional fields for any other information or parameters required for specific command types or system configurations. Accordingly, FIG. 6 illustrates the command table 600 and its various fields within the SEF host command manager layer. By organizing commands and their associated information in a structured manner, the SEF firmware provides an infrastructure to maintain tenant isolation and predictable latency.

Referring now to FIG. 7, a write pointer table 700 utilized in managing write operations is shown, according to some arrangements. As shown, the write pointer table 700 consists of several elements, such as flash address, internal program buffer AU (Allocation Unit) offset within the superblock, write command ID, and ADU number. In one aspects, the write pointer table 700 can maintain this information for each ADU in the system. In the context of a 4-plane TLC (Triple-Level Cell) NAND block, the write pointer table 700 holds the descriptors for each of the 48 ADUs involved in programming the NAND block. These descriptors provide information about which buffer is being used for programming and the specific NAND address being programmed.

Referring now to FIGS. 8-20 generally, an SEF device can have from 1 to N number of Virtual Devices (VDs), where N is the number of NAND flash dies in an SEF device. Each VD can have from 1 to Q number of QoS domains, as configured by the host. Additionally, each QoS domain can have 1 to P number of placement IDs, where P is (number of superblocks in the QoS domain−1). In many SEF devices, a challenge is maintaining tenant isolation between write commands belonging to different VDs, different QoS domains within a VD, and different placement IDs (or open superblocks) within a QoS domain with limited memory resources in a dynamically varying workload. In particular, in many systems to maintain parallelism includes having separate write FIFO queues for each VD, arranged in the form of an array. Similarly, to separate commands belonging to each superblock ID or placement ID, separate FIFO array queues are used for each placement ID or superblock ID. This strategy has a significant limitation regarding the number of VDs and the number of open superblocks that an SEF device can support, as arrays have fixed memory size and memory is limited in embedded systems. As a result, the number of VDs and the number of open superblocks that the device can support is limited by the size of fast memory (SRAM/DTCM) in the SEF device SoC.

To address this problem, the systems and methods described herein optimize tenant isolation and resource management in SEF devices by implementing a data structure and algorithm that improves efficiency of available memory resources while maintaining tenant isolation and parallelism. In general, the systems and methods provide a dynamic memory allocation system that adapts to the number of VDs, QoS domains, and placement IDs in real-time (or near real-time), adjusting memory allocation based on the current workload and system configuration. This dynamic memory allocation system can increase the number of VDs and open superblocks that the SEF device can support, while also reducing memory overhead. In some arrangements, the systems and methods incorporate a command prioritization algorithm that provides efficient processing of commands based on their respective VD, QoS domain, and placement ID (or superblock ID), while minimizing resource contention and maintaining tenant isolation among the VDs and QoS domains.

Referring now to FIG. 8, a command sequence in a command table 800 of VDs, QoS domains, and placement IDs within an SEF device, according to some arrangements. In some arrangements, a plurality of in-place linked lists can be created and maintained for command sequences, thereby enabling efficient use of available memory resources while maintaining tenant isolation and parallelism. In one aspect, separate in-place linked lists can be maintained for each VD of the SEF device in the command sequence list, each QoS domain per VD, and each placement ID (or open superblock ID) per QoS domain. In some arrangements, the memory requirement at each level of segregation is calculated as the Number of commands times (×) 2 bytes (for command index of next command in the sequence)+(size of head pointer+ size of tail pointer) times (×) number of entities. Upon command reception, the host command manager (e.g., 2002) takes the command from the submission queue and places it in the tail index of the command table. The host command manager then puts the command entry in the tail of the in-place linked list used to maintain the command sequence. The host command manager then pops the next entry from the free list, enlists it as the next index of the current tail, and advances the current tail to the next free entry. The next pointer of the current tail is initialized to NULL.

Command sequences in the command table 800 can be maintained as a list of next pointers. The head pointer 802 and tail pointer 804 can maintained per command table for the consumer (VD level disperser) and producer (command manager) module, respectively. In some arrangements, the in-place linked list structure allows for dynamic memory allocation that adapts to the number of VDs, QoS domains, and Placement IDs in real-time (or near real-time), adjusting memory allocation based on the current workload and system configuration. This next indices implementation (e.g., pointing to the next command in each VD, QoS domain, or superblock) increases the number of VDs and open superblocks that the SEF device can support while reducing memory overhead. Additionally, the command prioritization algorithm provides efficient command processing by considering the respective VD, QoS domain, and placement ID of each command. This algorithm minimizes (or reduces) resource contention and maintains tenant isolation while providing superior performance in various workload scenarios.

As shown, the command table 800 is organized using head and tail pointers along with next pointers for each command ID. For example, consider the command ID 1, which has a next pointer pointing to command ID 2. This maintains the command sequence by establishing a link between successive commands. The command table 800 is thus maintained as a list of next pointers, where each command ID points to the next command in the sequence. At command ID 2047, if there is no subsequent command, the next pointer is set to null, indicating the end of the list (e.g., tail 804). In a scenario where command ID 5 is completed, the next pointer at command ID 5 would point to command ID 7, skipping command ID 6. This skip in the sequence may occur due to the varying processing times of read and write commands, leading to out-of-order completion of commands in different VDs.

It should be understood that the in-place linked list adapts to these gaps and out-of-order completions by utilizing the next pointers to maintain the queue. This flexible structure allows the command sequence to be efficiently maintained despite varying processing times and workload conditions. Accordingly, the linked list structure efficiently adapts to changes in the command sequence and provides that the correct order of commands is maintained while minimizing memory overhead and resource contention. This approach to maintaining command sequences in SEF devices offers superior performance and flexibility compared to fixed-size array structures.

As used herein, a "VD level disperser" refers to a functional block that segregates or partitions the write commands based on the VD to which they belong. As used herein, a "QoS level disperser" refers to a functional block that segregates or partitions the write commands in a VD based on the QoS Domain to which they belong. As used herein, a "superblock level disperser" refers to a functional block that segregates the writes commands in a QoS Domain with respect to the superblock IDs to which they belong.

It should be understood that each of the dispersers can be implemented as firmware blocks within a SEF Solid State Drive (SSD) controller. For example, the dispersers can be implemented in various ways, including software, hardware, or a combination of both. When implemented in software, the dispersers can be executed by a processor in the SEF SSD controller. In a hardware implementation, the dispersers can be designed as dedicated hardware blocks or as part of a larger Application-Specific Integrated Circuit (ASIC) or Field-Programmable Gate Array (FPGA). In some cases, a combination of software and hardware implementations may be used. This hybrid implementation can provide the flexibility and case of development associated with software implementations while still leveraging the performance and efficiency benefits of hardware-based solutions.

As used herein, a "virtual device" refers to a logical partition of the SEF device that is associated with a particular tenant or application. As used herein, a "QoS domain" refers to a subset of a virtual domain that represents a particular QoS level. As used herein, a "write divider" refers to a storage system component that divides incoming write commands into smaller unites, call die units, which can be programmed to a NAND flash memory. As used herein, "tenant isolation" refers to the ability to maintain separation and independent of data and commands belonging to different tenants (e.g., users, applications) thereby maintaining deterministic latency of the commands belongs to different tenants by avoiding noisy neighbor issue.

Referring now to FIG. 9, a command table 900 implemented by a VD level disperser employing in-place linked lists to segregate commands belonging to different VDs, according to some arrangements. Accordingly, the in-place linked list architecture dynamically handles varying workloads while maintaining tenant isolation and efficiently managing command segregation. In some arrangements, when the command sequence list transitions from empty to non-empty, the VD level disperser can be activated. The VD level disperser can segregate commands per VD by maintaining an in-place linked list for VD level segregation. This structure ensures that each VD's commands are separated and processed independently.

As shown, each VD has its own head and tail pointers (e.g., VD1 with head 902 and tail 904, and VD2 with head 912 and tail 914), with the next pointer pointing to the subsequent command in the linked list belonging to the same VD. This arrangement allows for the commands within the same VD to be processed in a first-in, first-out (FIFO) manner, moving from the head to the tail. Consequently, there may be no need for a previous pointer in the linked list, improving the overall structure. In some arrangements, the VD level disperser retrieves the command from the head of the command list, examines the associated VD, and places its index as the next pointer of the current tail for the corresponding VD. The tail of the VD is then advanced to the next command index, ensuring that the commands are processed in the correct order.

In general, the use of separate head and tail indices for each VD allows for individual VD processing in a dynamically varying workload. This flexibility ensures that the system can adapt to changes in workload composition while maintaining efficient resource utilization and tenant isolation. By employing in-place linked lists with separate head and tail pointers for each VD, the VD level disperser can efficiently manage command segregation and maintain tenant isolation in a wide range of workload scenarios.

As illustrated in FIG. 9, the in-place linked list structure maintains separate head and tail pointers for each virtual device (VD) to manage command segregation and ensure tenant isolation. For VD1, the command sequence starts at command ID 1 (VD1 head 902) and follows the next pointers to maintain the sequence. Command ID 2 points to 3, 3 points to 4, 4 points to 5, 5 points to 7, 7 points to 8, 8 points to 9, and 9 points to null (VD1 tail 904). This illustrates the command sequence for VD1. For VD2, the command sequence begins at command ID 6 (VD2 head 912) and proceeds through the next pointers. Command ID 6 points to 10, 10 points to 12, 12 points to 2047, and 2047 points to null (VD2 tail 914). This demonstrates the command sequence for VD2. In these examples, VD1 and VD2 each have their separate head and tail pointers, with next pointers connecting commands within each VD. This structure maintains segregation and ensures that the command sequences for each VD remain independent of each other.

Additionally, the in-place linked list approach offers significant advantages in handling varying workloads. For instance, even if a workload consists entirely of VD1 commands or has a mix of VD1 and VD2 commands in different proportions, the memory requirement remains constant. This allows the system to adapt to changing workload conditions without demanding a large amount of memory. Thus, by utilizing in-place linked lists with separate head and tail pointers for each VD, the system can effectively maintain tenant isolation and manage command segregation in dynamically varying workloads, resulting in improved performance and resource utilization and avoids neighbor issues among VDs.

In some arrangements, memory requirements and VD parallelism using in-place linked list can be maintained efficiently, as demonstrated by the following examples. In one example, a SEF device supporting 2048 commands and 256 VDs. Using an in-place linked list, the memory requirement for the command manager would be 2K times (×) 2 bytes=4 KB. To maintain the 256 VDs, the total memory size would be calculated as follows: 2048*2B+(2 bytes head+2 bytes tail)*256=4 KB+1 KB=5 KB. This memory allocation allows the SEF device to maintain VD parallelism with a significantly smaller memory footprint compared to other designs. After segregating the commands at the VD level, a similar procedure can be employed to divide them into QoS levels. Each VD can have multiple QoS domains, and the QoS level disperser of each VD uses another in-place linked list of next pointers to maintain tenant isolation at the QoS domain level.

In another example, each VD has 256 QoS domains. To maintain tenant isolation at this level, each QoS domain within a VD has its own head and tail pointers. An event is triggered whenever the number of commands in a VD transitions from 0 to non-zero and is reset when there are no commands in the VD. The event handler checks the events and processes each VD in a round robin fashion, ensuring fairness during processing. When scheduled, the QoS level disperser of each VD retrieves the command index from the head of the VD list, checks the QoS domain ID, and places it as the next pointer of the current tail of the corresponding QoS domain list. The current tail of the QoS domain list is then advanced to the new command index being inserted into the list. Since commands within the QoS domains are pushed to and retrieved from the in-place linked list in the same order as they are received, there is no need for a previous pointer for the commands in each QoS domain. Instead, only the next pointer is used because the process occurs sequentially. For this example, the memory requirement for the in-place list of QoS level disperser would be (2K*2B)+256*(2 bytes head+2 bytes tail)=5 KB. As shown in these examples, they illustrate how the use of in-place linked lists for maintaining tenant isolation and VD parallelism can significantly reduce memory requirements while still delivering efficient performance in SEF devices.

Figure 10:
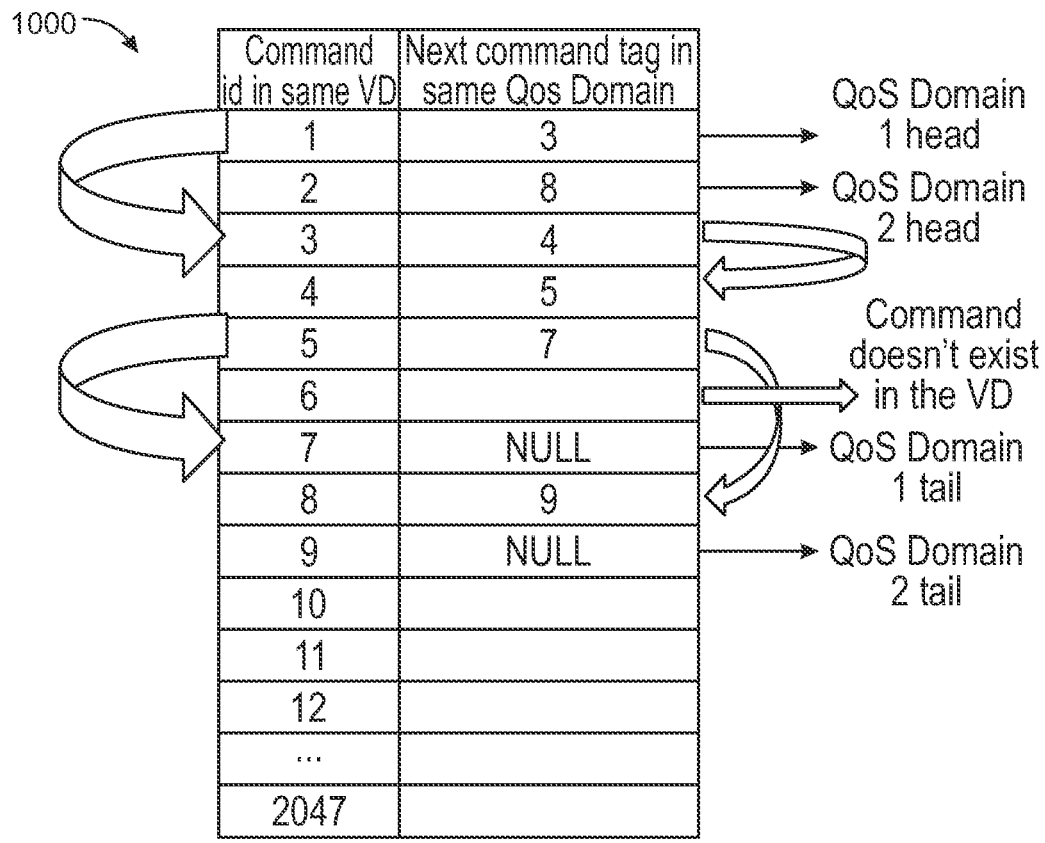
FIG. 10 depicts a command table implemented by a QoS domain level disperser employing in-place linked lists to segregate commands belonging to different QoS domains, according to some arrangements.

Referring now to FIG. 10, a command table 1000 implemented by a QoS level disperser employing in-place linked lists to segregate commands belonging to different QoS domains, according to some arrangements. In one aspect, the tenant isolation per QoS domain in each VD is illustrated using an in-place linked list table to segregate the commands into multiple QoS domains, each with its own head and tail pointers. The segregation ensures that if there is excessive traffic in one queue, it won't affect the performance and latency of other QoS domains within the same VD.

In this example, consider a SEF device supporting 2048 commands across multiple VDs and QoS domains. The in-place linked list table 1000 (sometimes referred to as "command table 1000") is used to manage the commands belonging to different QoS domains. The table size can be calculated as 2048*2 bytes=4 kilobytes. In addition, there would be memory allocated for head and tail pointers for each QoS domain. For each QoS domain, the in-place linked list table maintains separate head and tail pointers, indicating the start and end of the command sequence, respectively. When a new command is added to a specific QoS domain, it is appended to the tail of the corresponding in-place linked list. In some arrangements, the tail pointer is then updated to point to the new command, ensuring that commands within the QoS domain are processed in the order they are received. The use of separate head and tail pointers for each QoS domain allows for efficient and independent processing of commands within each domain. This design ensures that heavy traffic in one QoS domain does not negatively impact the processing of commands in other QoS domains, thus maintaining tenant isolation at the QoS level.

Additionally, the in-place linked list table 1000 enables dynamic adaptation to varying workloads, as it allows the SEF device to perform command processing as needed. This adaptability can be important for maintaining consistent performance across all QoS domains, even when faced with fluctuating workloads. Accordingly, the use of an in-place linked list table 1000, as depicted in FIG. 10, provides an efficient and effective solution for maintaining tenant isolation per QoS domain in each VD. By employing separate head and tail pointers for each QoS domain and efficiently managing memory allocation, this ensures improved performance for SEF devices under dynamically varying workloads.

Figure 11:
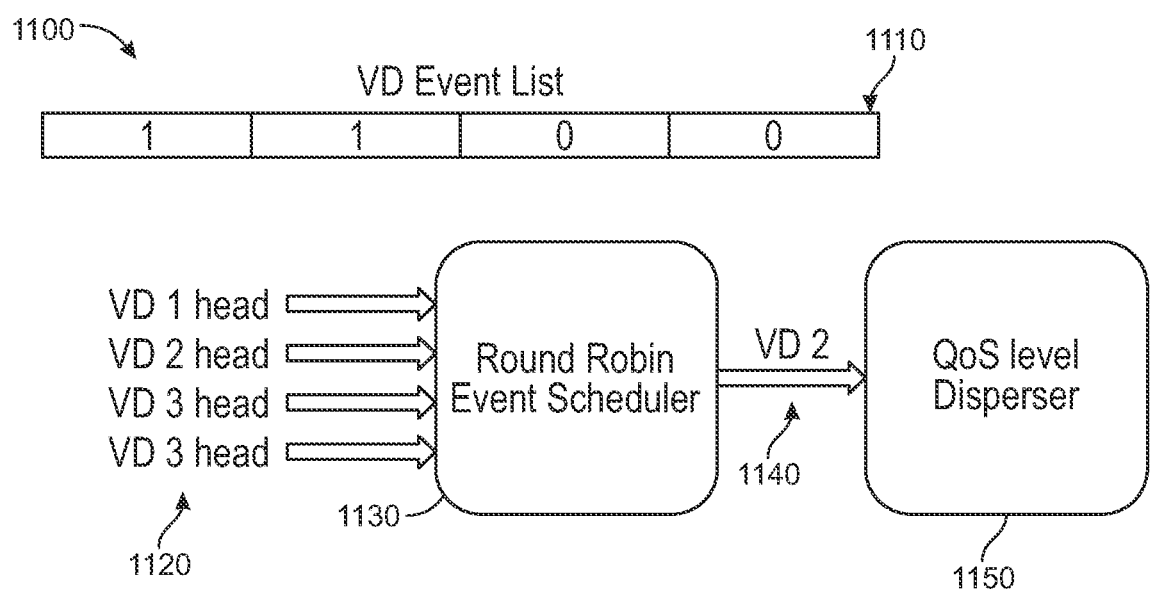
FIG. 11 depicts a round robin event scheduler architecture is shown, according to some arrangements.

Referring now to FIG. 11, a round robin event scheduler architecture 1100 is shown, according to some arrangements. In some arrangements, in order to maintain fairness among VDs and ensure equal processing opportunities, each VD list will be processed in a round robin fashion by the QoS level disperser 1150. This helps prevent any single VD from monopolizing system resources and provides that all VDs receive fair treatment in terms of processing. For example, an VD event list 1110 can be 1100. The round robin event scheduler 1130 (sometimes referred to as a "round robin scheduler") schedules VD2 1140 from VD heads 1120, and then sends it to the QoS level disperser 1150. As shown, when VD2 1140 is selected, it proceeds to the QoS level disperser 1150 for processing. The round robin event scheduler 1130 is triggered for every non-empty VD event list 1110 to schedule QoS level dispersion. In the example provided, the first and second spaces in the VD event list are non-empty, whereas the last two spaces are empty.

Referring to the round robin scheduling in more detail. In some arrangements, the round robin scheduling processes each VD list in a cyclic order (or in another type of order that ensures equal opportunity for processing), ensuring that each VD receives equal opportunity for processing. By cycling through the VDs in a predetermined order, the scheduler guarantees that all VDs are treated fairly, and no VD is left waiting for an extended period. This round robin scheduling provides fairness by providing resources proportional to the weights assigned to each VD, balancing the processing requirements of different VDs.

In some arrangements, dynamic resource allocation can be implemented by the round robin scheduler to monitor the workload and resource utilization of each VD in real-time, adjusting the allocation of resources based on the current demand. By continuously adapting to the changing needs of the VDs, dynamic resource allocation ensures fairness and prevents resource starvation. In some arrangements, each VD can have multiple QoS domains. Thus, VDs are given equal priority and processed in a round robin fashion to maintain predictable latency of IO commands. In some arrangements, load balancing distributes the workload across multiple processing units or storage devices, ensuring that no single component becomes a bottleneck. By spreading the workload evenly, load balancing contributes to fairness among VDs and improves overall system performance. By implementing a combination of these strategies, a system can maintain fairness among VDs, ensuring that each VD receives an equal opportunity for processing and preventing resource monopolization. This fairness contributes to a more efficient and reliable system, capable of handling a diverse range of workloads and requirements.

Figures 12, 13:
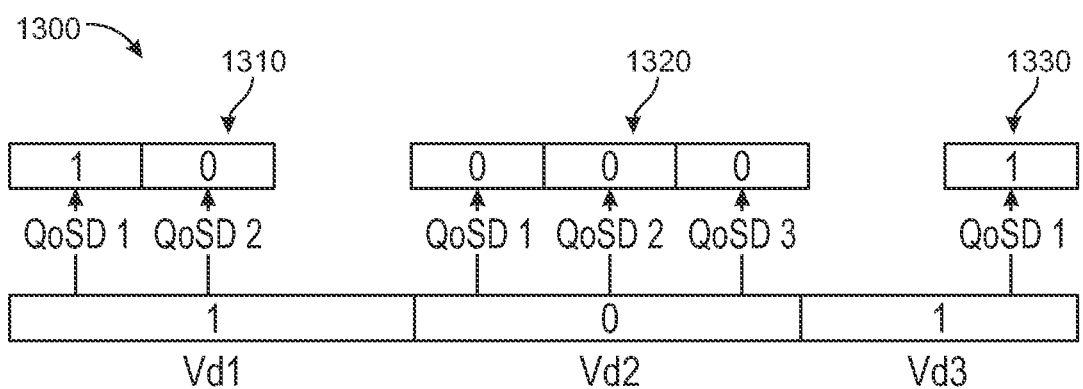
FIG. 12 depicts a command table implemented by a superblock level disperser employing in-place linked lists to segregate commands belonging to different placement IDs or superblock IDs, according to some arrangements.
FIG. 13 depicts an event scheduling architecture for superblock level dispersion is shown, according to some arrangements.

Referring now to FIG. 12, a command table 1200 implemented by a superblock level disperser employing in-place linked lists to segregate commands belonging to different placement IDs or superblock IDs, according to some arrangements. As shown, multiple superblock IDs or placement IDs can be segregated within each QoS domain. This segregation, or isolation, allows for better organization and control of commands and resources associated with each superblock ID, ensuring efficient processing and allocation of resources within a QoS domain. Expanding on FIG. 12, the illustration demonstrates how multiple superblock IDs or placement IDs can be effectively segregated within each QoS domain, ensuring that commands and resources associated with different superblock IDs are isolated and organized in a structured manner. This method provides better control over command processing and resource allocation for each superblock ID within a QoS domain, leading to more efficient system performance and maintain isolation and fairness among commands belonging to different placement IDs.

For example, a QoS domain with multiple superblock IDs or placement IDs. The segregation process employs an in-place linked list to manage these IDs, allowing for efficient allocation of resources and command processing. By using separate head and tail pointers for each superblock ID, the system can maintain an organized structure for each ID, ensuring that commands belonging to different superblock IDs are processed independently, without interfering with each other. This organized structure also enables faster identification and retrieval of commands associated with specific superblock IDs when needed. In some arrangements, this segregation is beneficial when dealing with large-scale workloads, as it improves the management of commands and resources, leading to improved system performance and reduced memory requirements. Moreover, this segregation implementation at the superblock level allows for greater flexibility when handling dynamically varying workloads, as it can adapt to changes in command distribution and resource allocation among different superblock IDs within a QoS domain. By maintaining a structured organization of superblock IDs within each QoS domain, the system can effectively manage and process commands, ensuring optimal utilization of resources and maintaining high levels of performance. Furthermore, by maintaining a structured organization of superblock IDs within each QoS domain, the system can maintain isolation and avoid noisy neighbor issues across commands belonging to different placement IDs.

In another example, when there is 256 open superblocks per QoS domain, the total memory needed can be calculated as follows: $(2K*2B)+256*(2 \text{ bytes head}+2 \text{ bytes tail})=4$ KB+1 KB=5 KB. This calculation accounts for the memory required for the in-place linked list table and the separate head and tail pointers for each open superblock. Accordingly, the superblock level dispenser can segregate the commands in the command table belonging to the same QoS domain with respect to their superblock ID, as illustrated in FIG. 12. By utilizing separate head and tail pointers for each Superblock ID, the system efficiently maintains tenant isolation and ensures fair processing of commands across the superblocks belonging to different VDs and QoS domains.

Referring now to FIG. 13, an event scheduling architecture 1300 for superblock level dispersion is shown, according to some arrangements. To achieve the superlevel dispersion, an event scheduler is employed, which sets an event when the number of commands in a QoS domain goes from 0 to non-zero and resets the event when the number of pending commands in a QoS domain becomes 0. This process enables the event scheduler to maintain fairness among QoS domains by monitoring and adjusting command allocation dynamically. To further enhance task fairness across VDs, an event list per VD (e.g., event list 1310, 1320, and 1330) for the superblock level disperser task operated per QoS domain is created. In some arrangements, this event list is set by performing an OR operation on the new command events of each QoS domain within the VD. In other words, the event list 1310 at VD 1 is the result of the OR operation between the events at QoS 1 and QoS 2, assuming that VD1 contains only two QoS domains.

In each VD, there may be one or more QoS domains. As shown in the example, VD1 has two QoS domains. QoS domain 1 contains commands, as indicated by the number 1, while Qos domain 2 does not have any commands, as indicated by the number 0. By monitoring and managing the events and tasks associated with each QoS domain within a VD, the system implementing the event scheduling architecture 1300 provides fairness among the QoS domains and processes commands while maintaining resource allocation balance amongst the VDs and QoS domains.

Figure 14:
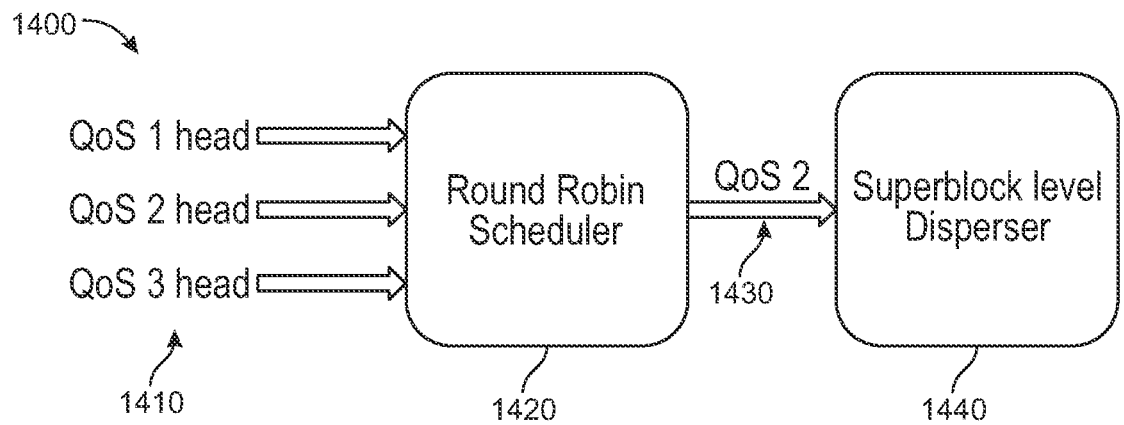
FIG. 14 depicts a round robin event scheduler architecture is shown, according to some arrangements.

Referring now to FIG. 14, a round robin event scheduler architecture 1400 is shown, according to some arrangements. The round robin event scheduler architecture 1400 uses a round robin scheduler 1420 to maintain fairness among QoS domains (e.g., QOS X heads 1410) within each VD. The round robin scheduler 1420 ensures that each QoS domain within a VD is given equal opportunity to access the superblock level disperser 1440, balancing the workload distribution and avoiding any particular QoS domain from monopolizing system resources. In this example, QoS domain 2 (e.g., 1430) has been selected by the round robin scheduler 1420, and as a result, the superblock level disperser 1440 is triggered. The event scheduler initiates the round robin scheduler when any event in any QoS domains of the VD is set to schedule superblock level dispersion.

With regards to isolation for each open superblock belonging to the same QoS domain, each QoS domain can have multiple placement IDs or superblock IDs. Data belonging to different placement IDs can be placed in separate open superblocks. This separation can ensure tenant isolation at the superblock level within a QoS domain. The superblock level dispenser 1440 can segregate the commands belonging to different superblock IDs by utilizing an in-place linked list of next pointers. This implementation maintains tenant isolation for data belonging to different placement IDs or superblock IDs in a QoS domain. Since commands in the same superblock are processed in the FIFO order, previous pointers may not be maintained for commands in the same superblocks.

Figure 15:
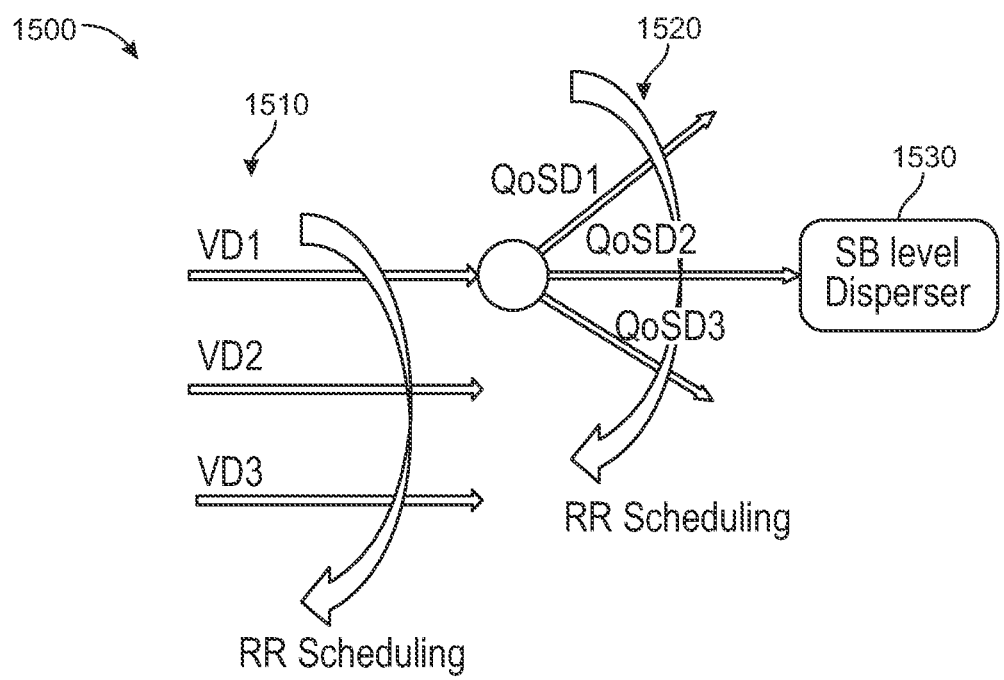
FIG. 15 depicts a two-stage round robin scheduler of VDs and QoS domains, according to some arrangements.

Referring now to FIG. 15, a two-stage round robin scheduler 1500 of VDs and QoS domains, according to some arrangements. As shown, each VD contains various QoS domains. To provide fairness and balanced resource allocation among both VDs and QoS domains, a two-stage Round Robin scheduler is implemented. The use of a two-stage round robin scheduler 1500 is implemented based on the hierarchical tenant structure. In this example, the first stage 1510 of the round robin scheduler 1500 targets selecting VDs, while the second stage 1520 targets QoS domains within the chosen VD. By implementing this two-stage round robin scheduler 1500, the system can maintain task fairness at both VD and QoS domain levels, ensuring an equitable distribution of resources and balanced workload management.

In the context of the hierarchical tenant structure, the round robin scheduler 1500 is implemented as a two-stage process. A first stage 1510 can be VD selection and the second stage 1520 can be QoS domain selection and provided to the superblock (SB) level disperser 1530. In some arrangements, the round robin scheduler 1500 is activated by the event scheduler when any event in any QoS domains of the VD is set to schedule superblock level dispersion. The event scheduler is responsible for monitoring command activity and initiating the round robin scheduler 1500 when there is a change in the number of commands or when new commands are added.

Figure 16:
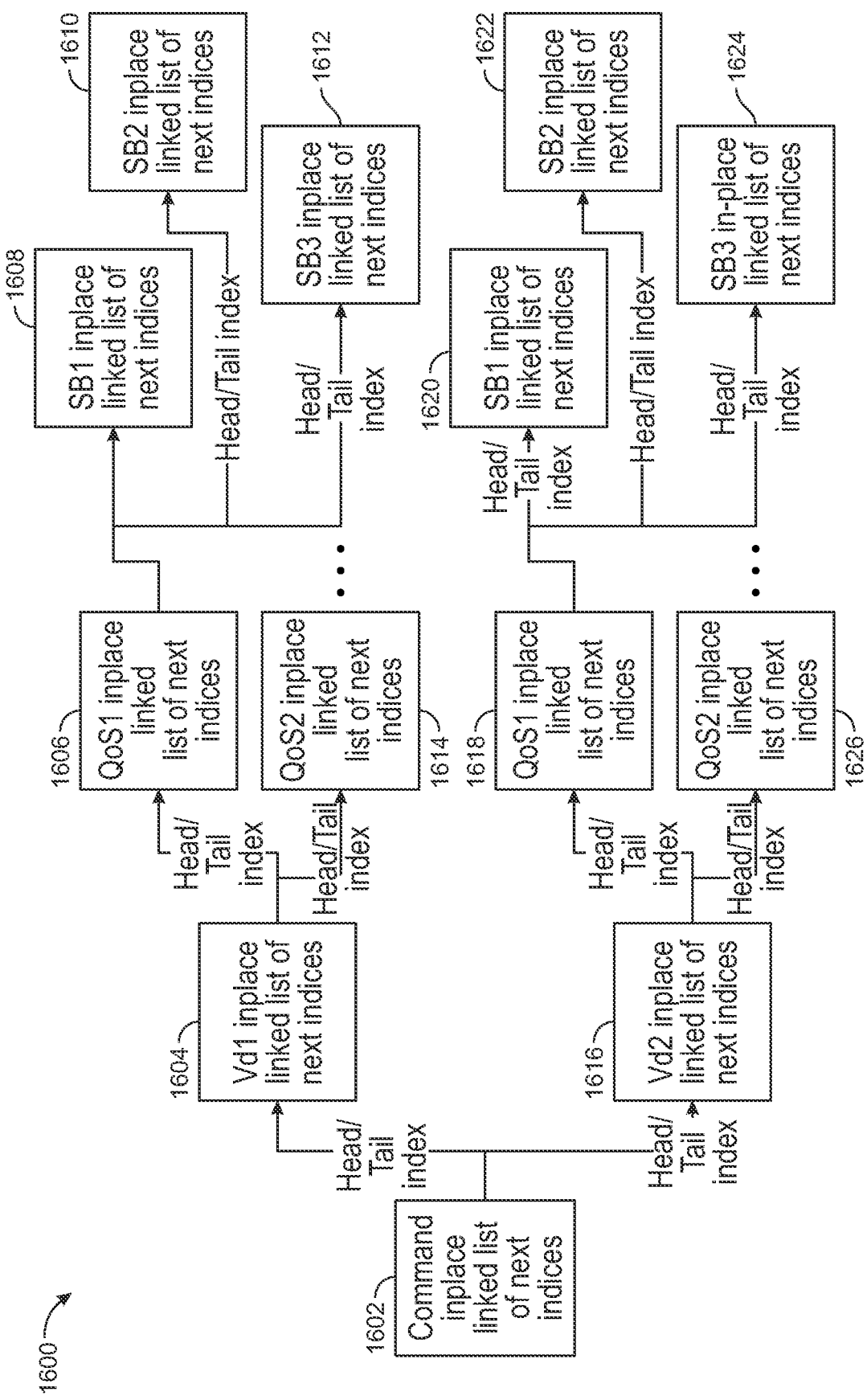
FIG. 16 depicts a linked list architecture, according to some arrangements.

Referring now to FIG. 16, a linked list architecture 1600 is shown, according to some arrangements. As shown, FIG. 16 depicts how the command in-place linked list of next indices (1602) can be segregated by the VD level disperser into separate VDs, such as VD1 (1604) and VD2 (1616). This hierarchical organization allows for improved command management and tenant isolation. Following the segregation at the VD level, the QoS domain level disperser further segregates each VD into various QoS domains, establishing multiple levels of tenant isolation. For instance, VD1 is divided into QoS1 (1606) and QoS2 (1614), while VD2 is split into QoS1 (1618) and QoS2 (1626). Subsequently, the superblock level disperser segregates each QoS domain based on superblock identifiers or placement identifiers. This results in the creation of distinct superblock groups within each QoS domain. For example, within QoS1 of VD1, we have SB1 (1608), SB2 (1610), and SB3 (1612); similarly, within QoS1 of VD2, we observe SB1 (1620), SB2 (1622), and SB3 (1624). Accordingly, the multi-level organization facilitates efficient command management and data prioritization in the NAND flash storage system. This structure provides tenant isolation at various levels, allowing for concurrent processing of commands while maintaining fairness and data prioritization across VDs, QoS domains, and superblocks.

Figure 17:
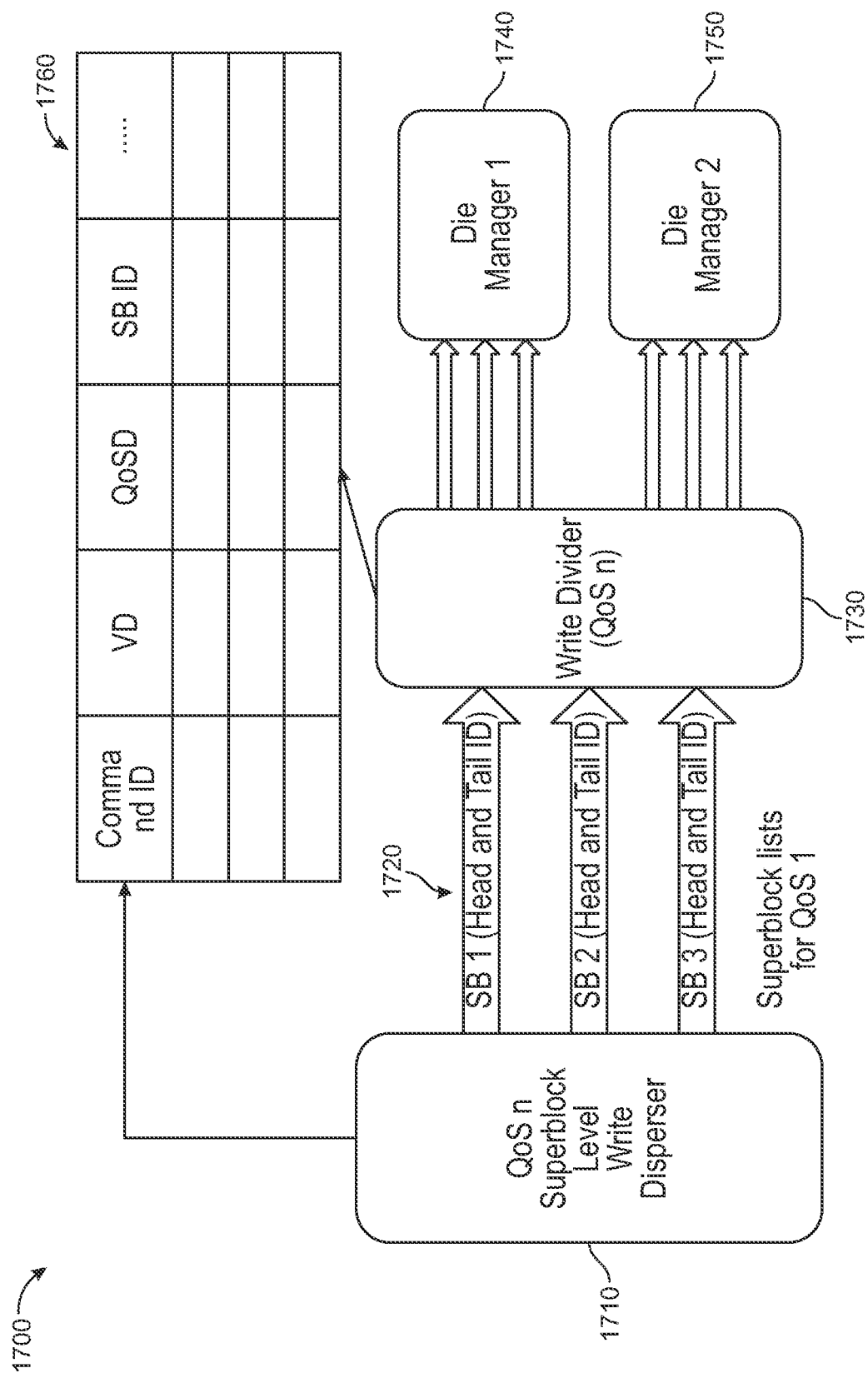
FIG. 17 depicts a method of distributing write commands from the write dispenser to the write divider is shown, according to some arrangements.

Referring now to FIG. 17, a method 1700 of distributing write commands from the write dispenser 1710 to the write divider 1730 is shown, according to some arrangements. After the QoS domain and superblock level disperser have segregated the commands, separate head and tail pointers 1720 are established for each superblock (e.g., SB1, SB2, SB3) within a specific QoS domain (e.g., QoS1 domain). The write divider 1730 for each QoS domain is responsible for processing the commands within each superblock using a round robin approach. It then divides the commands into NAND flash units and sends them to their respective die managers 1740 and 1750. As shown, FIG. 17 demonstrates how command IDs from the command table 1760 can be divided into multiple dies for processing.

Figure 18:
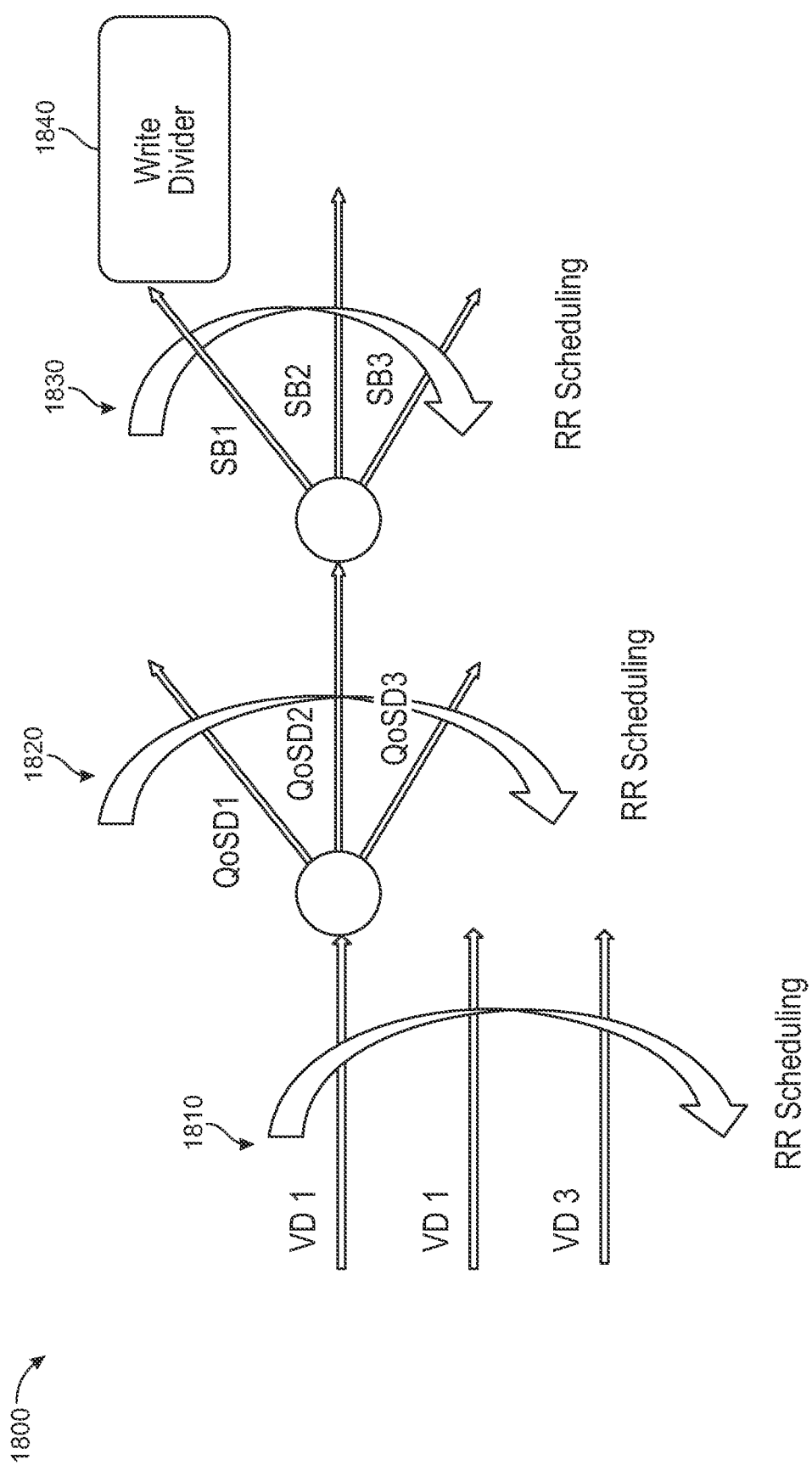
FIG. 18 depicts a three-stage round robin scheduler is shown, according to some arrangements.

Referring now to FIG. 18, a three-stage round robin scheduler 1800 is shown, according to some arrangements. The three-stage round robin scheduler 1800 maintains task fairness among VDs, QoS domains, and open superblocks. After the VD level disperser 1810, QoS level disperser 1820, and superblock level disperser 1830 have processed the commands, the write divider selects an open Superblock to work on. The three-stage round robin scheduler 1800 assists in this selection process, ensuring that each open superblock has an equal opportunity to be processed.

The first stage (VD level disperser 1810) of the three-stage round robin scheduler 1800 is dedicated to selecting VDs. This stage ensures that each VD has equal access to the system resources and that no single VD can dominate or monopolize the resources. By fairly allocating processing time and resources to each VD, the system can prevent high traffic in one VD to cause significant latency in another VD and thus, improves the maintaining of tenant isolation and prevents noisy neighbor issues.

The second stage (QOS level disperser 1820) of the scheduler 1800 focuses on QoS domains within the selected VD. Each QoS domain represents different service levels or tenants within the VD, and it is important to ensure that they receive equal processing time and resource allocation. The round robin approach cycles through each QoS domain within the VD, providing fair access to system resources and preventing any single QoS domain from dominating the resources or causing performance issues in another QoS domain.

The third and final stage (superblock level disperser 1830) of the scheduler deals with open superblocks within the selected QoS domain. Open superblocks contain commands that need to be executed, and it is important to ensure that they are processed fairly and efficiently. By using a round robin scheduling process, the system ensures that open superblocks within a QoS domain have an equal chance of being processed, preventing any single open superblock from monopolizing system resources and causing performance issues in another QoS domains.

The three-stage round robin scheduler 1800 provides many benefits over other systems and implementations. For example, fairness, the three-stage round robin scheduler 1800 ensures that each component within the hierarchical structure—VDs, QoS domains, and open superblocks—receives equal access to system resources and processing time. This prevents resource monopolization and maintains a balanced workload distribution. In another example, efficiency, by dividing the scheduling process into three distinct stages, the scheduler can better manage resource allocation and processing time, optimizing the overall performance of the storage system. In yet another example, scalability, the three-stage round robin scheduler 1800 can handle varying workloads and sizes of VDs, QoS domains, and open superblocks. As the storage system scales, the scheduler can maintain fairness and efficiency across all the tenants. In yet another example, flexibility, the three-stage round robin scheduler 1800 can adapt to changes in workload distribution or system configuration, maintaining optimal performance and resource allocation across the different tenants in the multi-tenant hierarchical storage system. Accordingly, the three-stage round robin scheduler 1800 maintains fairness, efficiency, and improves performance across multiple levels of a hierarchical storage system. It provides that VDs, QoS domains, and open superblocks receive equal access to system resources and processing time, preventing resource monopolization and optimizing the storage system's overall performance.

Figure 19:
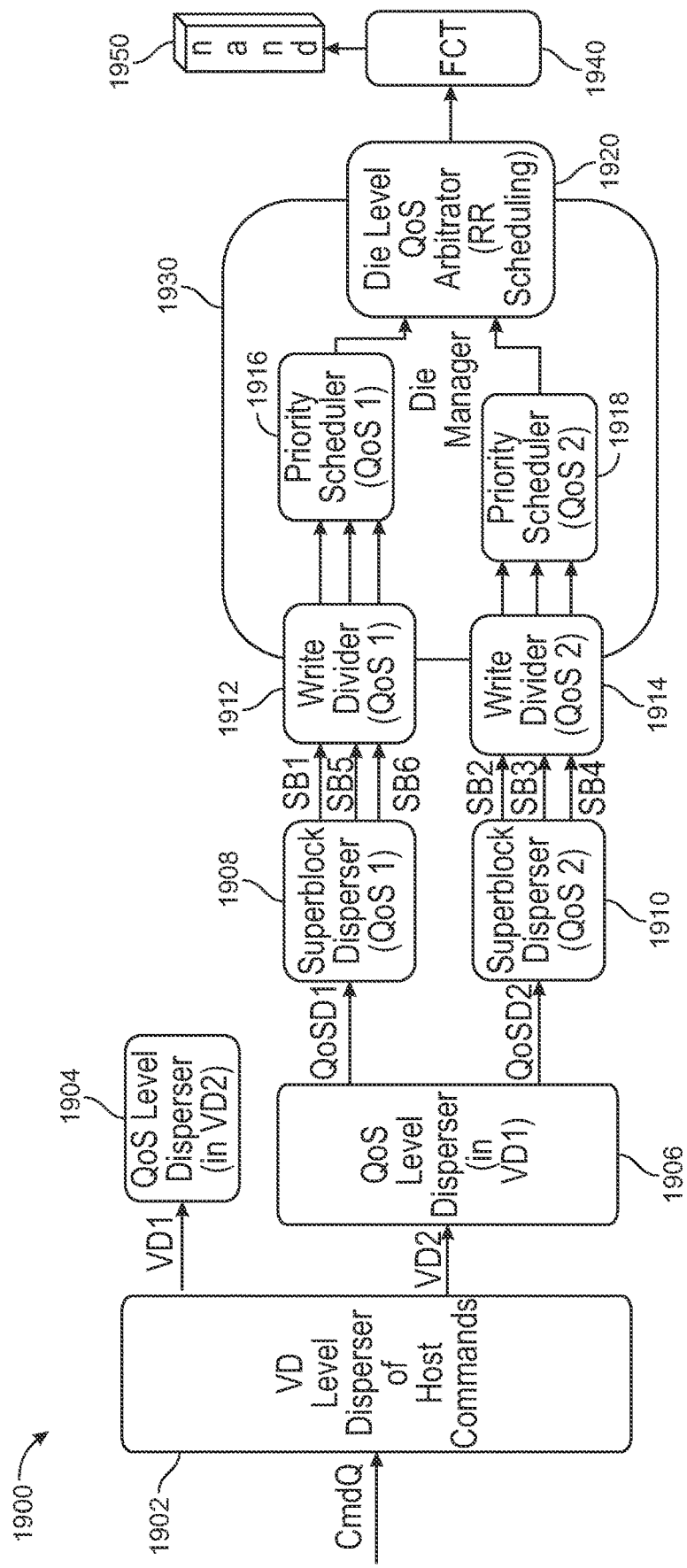
FIG. 19 depicts a QoS arbitrator to select the next QoS domain to be programmed in the die, according to some arrangement.

Referring now to FIG. 19, a QoS arbitrator 1920 is implemented to select the next QoS domain to be programmed in the die, according to some arrangement. The QoS arbitrator 1920 illustrates the multi-level dispersion and prioritization process 1900 that takes place before the QoS arbitrator 1920 makes a decision. The multi-level dispersion and prioritization process 1900 provides predictable latency across QoS domains, enabling fair and efficient resource allocation.

At block 1902, VD level disperser is implemented. The process starts with the VD level disperser, which takes Command Queue (CmdQ) as input and segregates the commands into different VDs—in this case, VD1 and VD2. This initial stage ensures that commands are separated according to their corresponding VDs. At block 1904 and 1906, a QoS level disperser is implemented. The next stage involves the QoS level disperser. For example, it accepts VD2 as input and further segregates the commands into different QoS domains—QoSD1 and QoSD2. This stage ensures tenant isolation by allocating commands to their respective QoS domains. At blocks 1908 and 1910, a superblock level disperser is implemented. The superblock level disperser is the third stage of the process, which takes a QoS domain (e.g., QoSD1) as input and segregates the commands into different superblocks-SB1, SB5, and SB6. This stage further isolates commands within a QoS domain based on their superblock IDs (or placement IDs).

In some arrangements, die manager 1930 receives input from the write dividers 1912 and 1914, priority schedules the input using priority schedulers 1916 and 1918, and inputs the output of the priority schedulers 1916 and 1918 to the QoS arbitrator 1920. In more detail, at blocks 1912 and 1914, a write divider is implemented. In the fourth stage, the write divider 1912 takes the superblocks (e.g., SB1, SB5, and SB6) as input and divides the write commands in the superblocks into multiple die units and sends the units to the individual die manager. At blocks 1916 and 1918, a priority scheduler is implemented. The priority scheduler is next, determining the priority among the selected QoS domain's superblocks-either SB1, SB5, or SB6. This stage further refines the selection process by prioritizing the superblocks within the chosen QoS domain.

At block 1920, a die level QoS arbitrator is implemented. Finally, the die level QoS arbitrator 1920 receives input from the priority scheduler(s) and selects one block to be flushed and programmed into the NAND 1950. By making this final decision, the QoS Arbitrator ensures that system resources are allocated fairly and efficiently across QoS domains, providing predictable latency. The FCT (e.g., flash controller) performs as a hardware accelerator responsible for managing NAND operations. It communicates with NAND memory and ensures smooth execution of various NAND functions, such as reading, writing, and erasing data. By issuing specific NAND commands, the FCT 1940 controls the NAND memory, allowing for seamless data transfer and management. In some arrangements, the write dividers 1912 and die manager 1930 can be implemented differently. Various alternative implementations are described below with reference to FIGS. 23-35. Regardless of the specific implementation, the objective is to ensure fair resource allocation and predictable latency across VDs and QoS domains, and optimizing the overall performance of the storage system.

Figure 20:
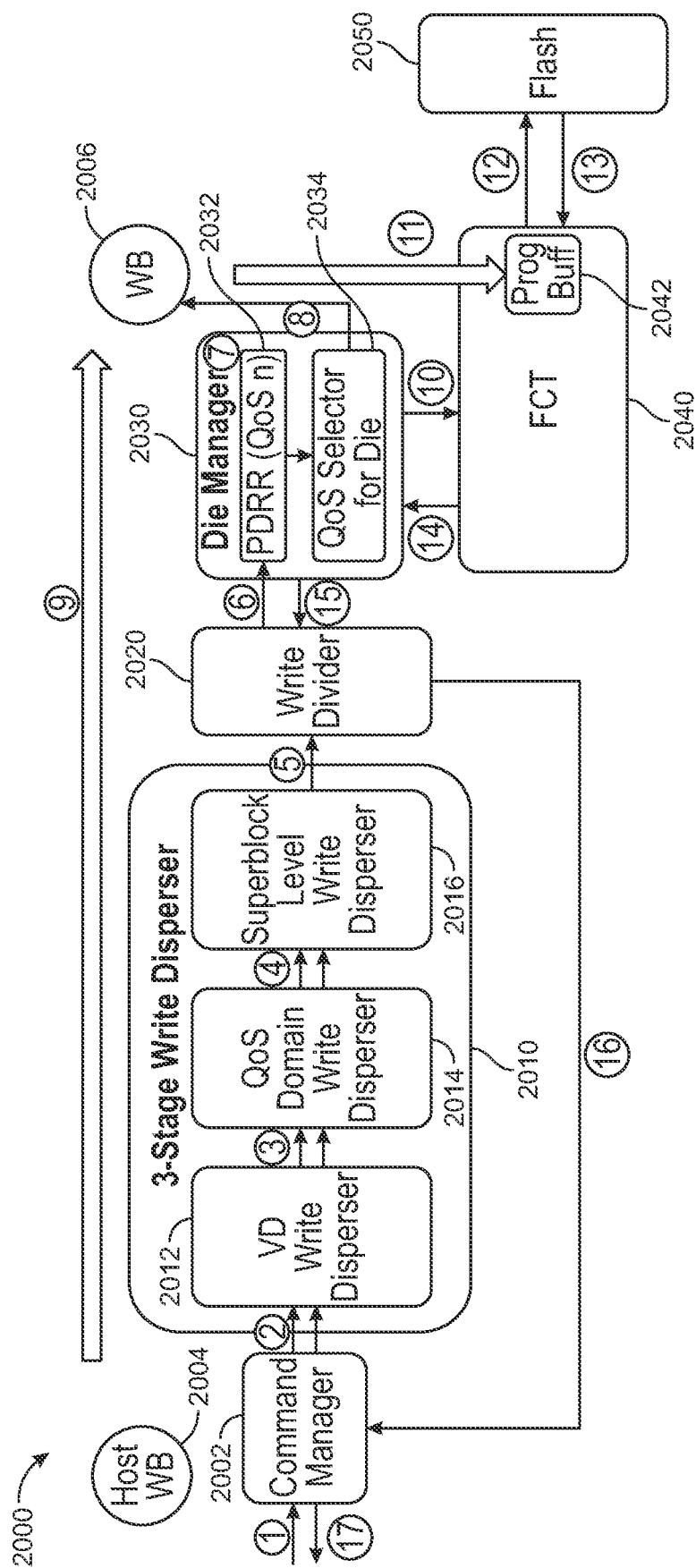
FIG. 20 depicts a data storage management architecture, according to some arrangements.

Referring now to FIG. 20, a data storage management architecture 2000 is shown, according to some arrangements. As described above, a plurality in-place linked lists can be implemented for maintaining tenant isolation among write commands belonging to different VDs in an SEF device, different QoS domains within a VD, and different placement IDs (or open superblocks) within a QoS domain. The in-place linked list implementation facilitates a DRAM-less design by enabling all tables and queues to be maintained within fast memory (such as SRAM or DTCM). This is achieved by reducing the size of the queues at each level of hierarchical tenant segregation. If an array-type structure were used, it would require a significant amount of memory, especially considering that one VD may have 2000 commands while another may have none. In contrast, with the in-place linked list implementation, 2000 commands and next pointers can address all VDs, from 1 to 256, within a 4 KB memory. As a result, the design can be housed in SRAM, supporting a DRAM-less design.

By employing a multi-stage scheduler, fairness can be maintained across the hierarchical structure of tenancy. While single-stage schedulers are commonly used, the multi-stage scheduler of the present disclosure addresses the unique challenges associated with maintaining fairness among the hierarchical tenant structure. This approach enables concurrent processing of commands, providing tenant isolation and data prioritization across VDs, QoS domains, and superblocks, ultimately improving the overall performance of the NAND flash storage system.

At command stage 1, the command manager 2002 accepts host commands and places them in the command table. The command manager 2002 manages the command sequence as an in-place list of next indices. Write commands are then sent to the VD disperser 2012. This stage initiates the process of maintaining tenant isolation.

At command stage 2, the VD level disperser 2012 is the first level in the multi-level dispersion and prioritization process 2010. In particular, the VD level disperser 2012 segregates write commands based on VDs using in-place lists and sends the head pointer for each VD to its corresponding QoS domain dispenser 2014. In some arrangements, the VD level disperser 2012 segregate the incoming commands in the command queue (CmdQ) based on their corresponding virtual devices (VDs). The VD level disperser 2012 receives CmdQs and monitors the queue for any new commands that need to be processed. When a new command is detected, the VD level disperser examines the command's metadata to determine which VD it belongs to. The VD level disperser 2012 utilizes an in-place linked list to separate and maintain the commands for each VD. This linked list is used to efficiently store and manage the commands while minimizing memory overhead. For each VD, the VD level disperser 2012 maintains separate head and tail pointers. The head pointer points to the first command in the linked list for a particular VD, while the tail pointer points to the last command in the list. As new commands are added to the VD-specific linked list, the tail pointer is updated to point to the new command, ensuring proper order and organization of the commands within each VD. By separating the incoming commands based on their respective VDs, the VD level disperser 2012 ensures proper isolation between different virtual devices. It should be appreciated that the multiple arrow of command stages 2, 3, and 4 represent that there may be multiple open superblocks in multiple domains undergoing multilevel dispersion in a multilevel round robin fashion.

At command stage 3, the QOS level disperser 2014 is the second level in the multi-level dispersion and prioritization process 2010. In particular, the QoS level disperser 2014 segregate the commands already separated by virtual devices (VDs) based on their corresponding QoS domains. In each VD, the QoS domain disperser 2014 segregates write commands based on QoS domains using in-place lists and sends its head pointer to its own superblock level dispenser 2016. The QoS level disperser 2014 receives commands that have been already segregated by the VD level disperser. These commands are organized in VD-specific linked lists. For each command in the VD-specific linked list, the QoS level disperser 2014 examines the command's metadata to determine its associated QoS domain. Similar to the VD level disperser 2012, the QoS level disperser 2014 uses an in-place linked list to separate and maintain the commands for each QoS domain. For each QoS domain within a VD, the QoS level disperser 2014 maintains separate head and tail pointers. The head pointer points to the first command in the linked list for a particular QoS domain, while the tail pointer points to the last command in the list. As new commands are added to the QoS domain-specific linked lists, the tail pointer is updated to point to the new command. The QoS level disperser 2014 processes the commands in a round robin fashion to ensure fairness among the different QoS domains. By segregating the commands based on their respective QoS domains, the QoS level disperser ensures proper isolation between different tenants and maintains the desired quality of service for each tenant.

At command stage 4, the superblock level disperser 2016 is the third stage in the multi-level dispersion and prioritization process, following the VD level disperser and QoS level disperser. In particular, the superblock level disperser 2016 to segregate the commands that have already been separated by virtual devices (VDs) and Quality of Service (QOS) domains based on their associated superblock IDs or placement IDs. The superblock level disperser 2016 receives commands that have been segregated by the QoS level disperser. These commands are organized into QoS domain-specific linked lists. For each command in the QoS domain-specific linked list, the superblock level disperser 2016 examines the command's metadata to determine its associated superblock ID or placement ID. Similar to the previous levels, the superblock level disperser 2016 uses an in-place linked list to separate and maintain the commands for each superblock ID. This linked list helps efficiently store and manage the commands while minimizing memory overhead. For each superblock ID within a QoS domain, the superblock level disperser 2016 maintains separate head and tail pointers. The head pointer points to the first command in the linked list for a particular superblock ID, while the tail pointer points to the last command in the list. As new commands are added to the superblock ID-specific linked lists, the tail pointer is updated to point to the new command. The superblock level disperser 2016 processes the commands in a round robin fashion to ensure fairness among the different superblock IDs.

At command stage 5, the write divider 2020 divides the commands that have already been separated by VDs, QoS domains, and superblock IDs into NAND flash units, ensuring that the workload is distributed fairly across the storage system. The write divider 2020 receives input from the superblock level disperser 2016 in the form of superblock ID-specific linked lists. Each list contains commands associated with a particular superblock ID within a QoS domain. For each command in the superblock ID-specific linked list, the write divider 2020 further divides the command into smaller units that correspond to individual NAND flash dies in the storage system. This step ensures that the commands are distributed evenly across the available storage dies, optimizing resource utilization and system performance and ensuring predictable latency among Virtual Devices and QoS domains. To maintain fairness among the different superblock IDs within each QoS domain, the write divider 2020 processes the commands in a round robin fashion. This scheduling method provides that each superblock ID is given equal opportunity for processing and prevents any single superblock ID from monopolizing system resources.

At command stage 6, once the commands have been divided into NAND flash units, the write divider 2020 sends these units to the die manager 2030. The die manager 2030 can manage the actual programming of the data into the NAND flash dies and coordinating with the rest of the storage system. By dividing the commands into NAND flash units and processing them in a round robin fashion, the write divider 2020 optimizes resource utilization and helps achieve predictable latency across different VDs, QoS domains and superblock IDs.

At command stage 7, the die manager 2030 selects the superblock to program next in each QoS domain based on priority and WLSTR completeness. The QoS domain arbitrator then arbitrates between commands in different QoS domains to maintain predictable latency for each QoS domain. At this stage, the commands are sent to the PDRR priority (the priority scheduler), which selects the most appropriate superblock to send to the QoS selector for the die. The QoS selector then selects the appropriate QoS domain. The priority scheduler operates after the write divider 2020, which has already separated and divided commands by VDs, QoS domains, superblock IDs, and NAND flash units. The priority scheduler's determines the order in which commands from different superblock IDs in a particular QoS Domain should be executed.

In some arrangements, the priority scheduler of die manager 2030 receives the divided NAND flash units from the write divider 2020, which contains commands from various QoS domains and superblock IDs. The priority scheduler belonging to a particular QoS domain can select the write command to program next based on the priority of the write command. Once the priority scheduler has determined the appropriate order of command execution, it forwards this information to the die level QoS arbitrator (QOS selector for die), which selects the write program to program next based on the priority of the QoS Domain.

The die level QoS arbitrator selects the write command to program next into the NAND flash dies based on a round robin scheduling algorithm so as to maintain predictable latency across QoS Domains. It ensures that commands are executed in accordance with their assigned QoS domain priorities while maintaining fairness among all QoS domains. The die level QoS arbitrator receives the prioritized command order from the priority scheduler, which has already sorted the commands based on their command priorities. The die level QoS arbitrator selects the next QoS domain for programming based on the priority order received from the priority scheduler. The die level QoS arbitrator issues an FSP program command to the NAND flash, instructing it to store the data associated with the selected QoS domain. Accordingly, the priority scheduler and die level QoS arbitrator work together to provide that commands are executed based on their QoS domain priorities, while maintaining fairness and predictable latency across different QoS domains. This contributes to the efficient and robust management of commands and resources in a multi-tenant storage environment.

At command stage 8, the die manager 2030 allocates an internal write buffer 2006 and populates the source and destination addresses in the write pointer list (i.e., allocates the buffer). At command stage 9, the die manager 2030 triggers the frontend DMA to transfer the host data to the internal write buffer 2006 (i.e., issues the DMA).

At command stage 10, the die manager 2030 prepares the descriptors to program the write data to the NAND and sends it to the FCT controller 2040 (i.e., forms the descriptors). At command stage 11, write data is transferred to FCT program buffers 2042, padded with ECC bytes and header to form the NAND codewords (i.e., pulls it to the program buffer 2042). At command stage 12, the NAND codewords are transferred to the NAND page registers and programmed to the NAND 2050 (i.e., then writes it to the NAND). At command stage 13, the NAND program completion is sensed by the FCT module 2040, and FCT program buffers are deallocated (i.e., programs). At command stage 14, the FCT module 2040 sends write command completion to the die manager 2030, and write pointer entries in the write pointer list are freed up (i.e., program completion is sent to the die manager 2030). At command stage 15, the die manager 2030 frees up the internal write buffer (e.g., pointers and list descriptors) and sends the write completion to the write divider 2020. At command stage 16, the write divider 2020 updates the superblock information and sends completion to the command manager 2002 (i.e., write divider 2020 does its own housekeeping). At command stage 17, the command manager 2002 sends command completion to the host and frees up the slot in the command table (i.e., sends completion to the host and frees up the slot). Additional details and additional arrangements related to command stages 5-17 are described in detail with reference FIGS. 21-34 and 36.

Referring broadly to FIGS. 21-34 and 36, the FIGS. pertain to providing consistent latency among a number of tenants while utilizing a minimal number of inter-processor communication connections and minimizing memory footprint. In solid state flash devices, it can be challenging to maintain tenant isolation between write commands belonging to different VDs, different QoS domains within a VD, and different open superblocks within a QoS domain. In various arrangements, this can be done to ensure maximum write performance through efficient utilization and parallelization of NAND die bandwidth in a dynamically varying workload, and with limited inter-processor communication and memory footprint. FIGS. 21-34 disclose systems and methods for efficient tenant isolation, NAND die parallelism, and write performance in a solid state flash device. In some arrangements, the die group ID segregator is responsible for segregating superblocks based on die groups per QoS domain, enabling NAND die parallelism during NAND programming and maximizing the utilization of NAND bandwidth for maximum write throughput. By allocating superblocks to different die groups within a QoS domain, this disclosure provides optimal use of available NAND dies and reduces contention among write commands. It should be understood that various aspects of FIGS. 10-22 and 35 can be used to implement the methods and systems of FIGS. 21-34 and 36, or vice versa. For example, the dispersers of FIGS. 10-22 and 35 can be implemented in write disperser 3410 of FIG. 34. In another example, command stages 5-15 of FIG. 20 can be substitutional implemented by the systems and methods of command stages 3-16 of FIG. 34.

Still referring to FIGS. 21-34 and 36 generally, a superblock wordline string (WLSTR) completeness identifier and priority scheduler can worth together to determine the next superblock to program in a die group for a QoS domain. In some arrangements, this selection process avoids maintaining a subset of write command contexts for all open superblocks in the backend module, thus reducing memory requirements and complexity. In some arrangements, the WLSTR completeness identifier selects the superblocks when have completed their WLSTR and submits them to the priority scheduler. The priority scheduler selects the complete WLSTR superblocks based on priorities, ensuring that the appropriate superblock is programmed next. In some arrangements, a weighted round robin QoS domain arbitrator can then select the superblock ID to program in a die group amongst QoS domains. This selection process helps prevent the noisy neighbor issue across QoS domains, providing that no single QoS domain monopolizes the available NAND die bandwidth. In one aspect, the weighted round robin scheduler takes into account the priorities of different QoS domains, making sure that high-priority domains are served before low-priority ones.

Still referring to FIGS. 21-34 and 36 generally, the systems and methods for reducing write command inter-processor communications (IPCs) and write pointer lists reduces the number of write command IPCs to one per die and the write pointer list to one WLSTR per die. By doing so, the disclosure reduces the memory footprint required in fast memory, such as SRAM or DTCM. This design simplification allows for faster access to write pointer tables and write sub-command contexts, improving write performance and enabling a DRAM-less design in the solid state flash device. In some arrangements, the 3-stage round robin task scheduler can maintain CPU processing time-sharing fairness amongst different VDs, die groups, and QoS domains. In one aspect, this scheduling process can provide predictable latency among VDs and QoS domains while achieving maximum (or near maximum) die parallelism for optimal write performance. The three stages of the scheduling process involve allocating CPU time fairly to VDs, die groups, and QoS domains, thus balancing the overall system workload and maintaining performance consistency.

Figure 21:
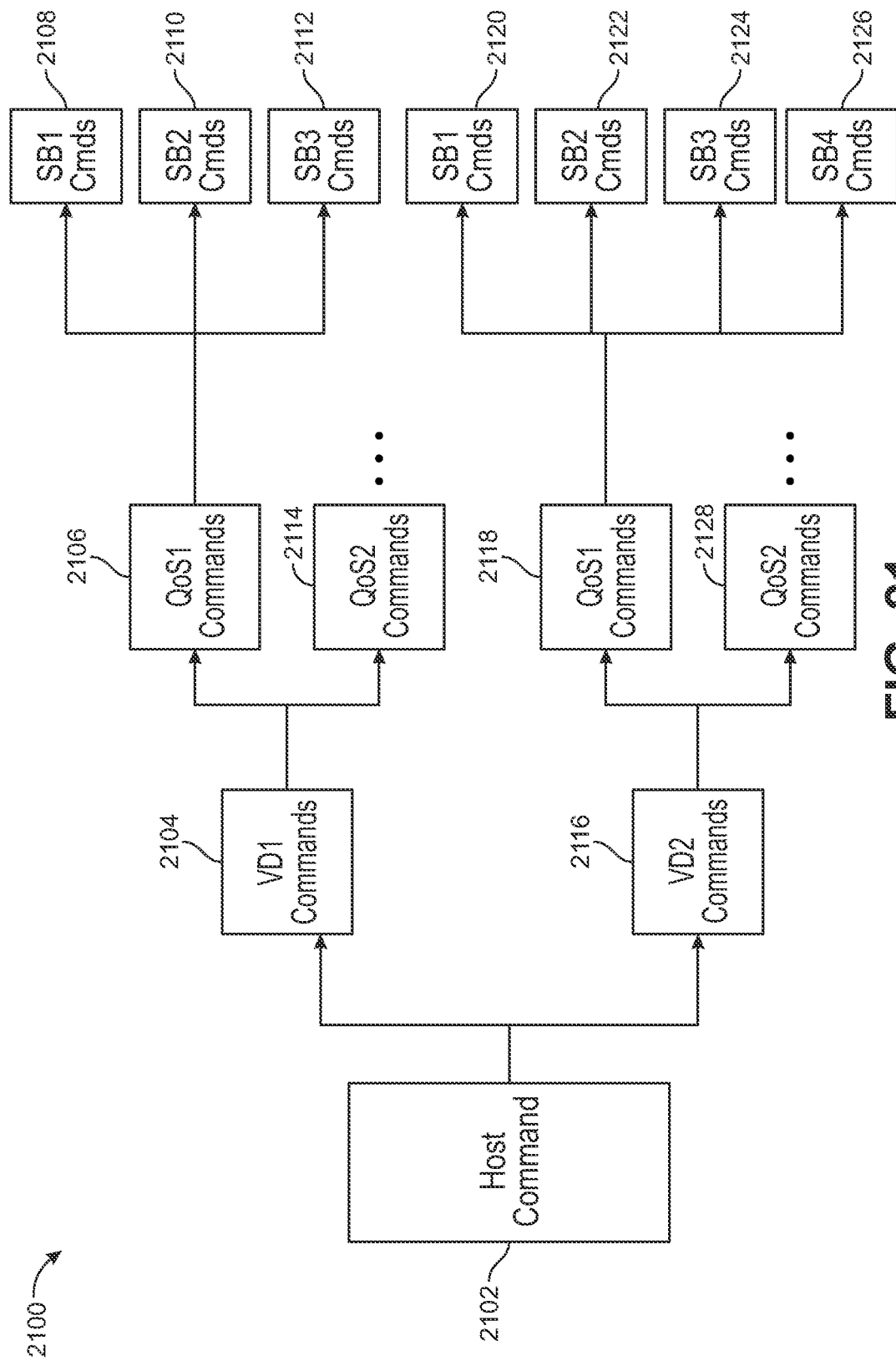
FIG. 21 depicts a segregation architecture 2100, according to some arrangements.

Referring now to FIG. 21, a segregation architecture 2100 is shown, according to some arrangements. As shown, FIG. 21 depicts how the host command 2102 can be segregated into VD commands (2104 and 2216), which can be further segregated into QoS domain commands (2106, 2114, 2118, 2128), which can be yet further segregated into superblock commands (2108, 2110, 2112, 2120, 2122, 2124, 2126). In one aspect, the segregation architecture 2100 can be implemented with a large number of Virtual Devices (VDs), QoS domains, and placement IDs while maintaining predictable latency, maximizing write throughput, and minimizing the number of inter-processor communication (IPC) connections and memory footprint. To achieve this segregation architecture 2100, the system can separate commands per QoS domain within each VD. The segregation architecture 2100 segregates the commands not only per VD but also per QoS domain within each VD, ensuring tenant isolation among different QoS domains in each VD. Following the separation of commands per QoS domain, the segregation architecture 2100 segregates the open superblocks per QoS domain, allowing for a free flow of data per open superblock.

Figure 22:
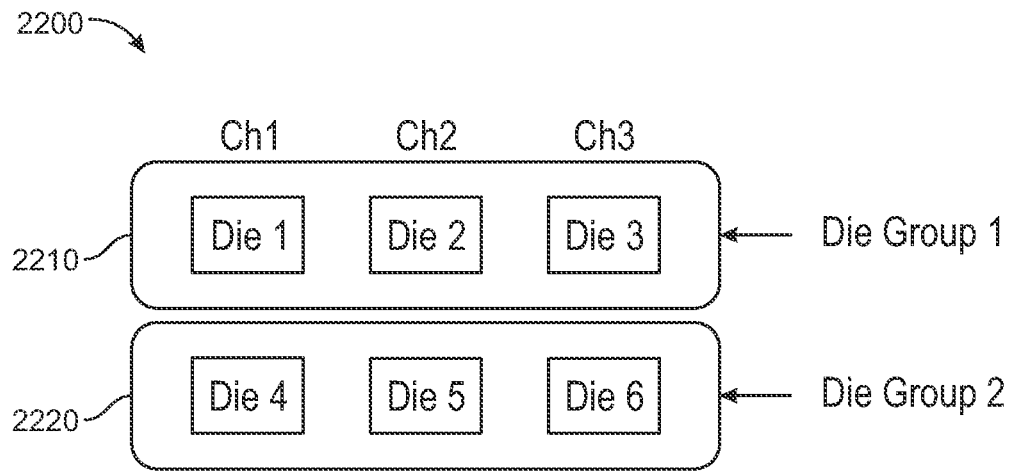
FIG. 22 depicts die groups segregated by die group identifier (ID), according to some arrangements.

Referring now to FIG. 22, die groups segregated by die group identifier (ID) is shown, according to some arrangements. A die group segregator (e.g., die group segregator 2330 of FIG. 23) can, after the superblocks per QoS domains are segregated, classify the superblock IDs based on the die group they belong to. In one aspect, after segregating the QoS domains, each VD and QoS domain with separate die groups can be further divided or segregated into die group IDs (e.g., die group 2210, and die group 2220).

In some arrangements, superblock IDs can be spread across multiple die groups, and a die group can may only program one superblock at a time. Using a die group segregator per QoS domain the system can determine which superblock ID to program next in the QoS domain. In some arrangements, superblocks are formed from the die groups, and superblock IDs are assigned to the superblocks after the die groups are configured in a VD using the set number of dies set feature command. This command in the SEF device determines the number of dies and die groups it will have. The superblock ID to die group ID mapping can be static and does not dynamically change during I/O command handling, thus ensuring consistent and efficient management of resources. In some arrangements, once a superblock is allocated, it can remain unchanged during I/O time. The superblock ID to drive mapping can also be static and not dynamically change during I/O command handling. In one aspect, superblocks can be constructed from each die group, and once constructed, they can remain fixed until the die groups are re-configured. The systems and methods disclosed herein can use this static mapping to manage superblocks and maintain optimal performance.

Figure 23:
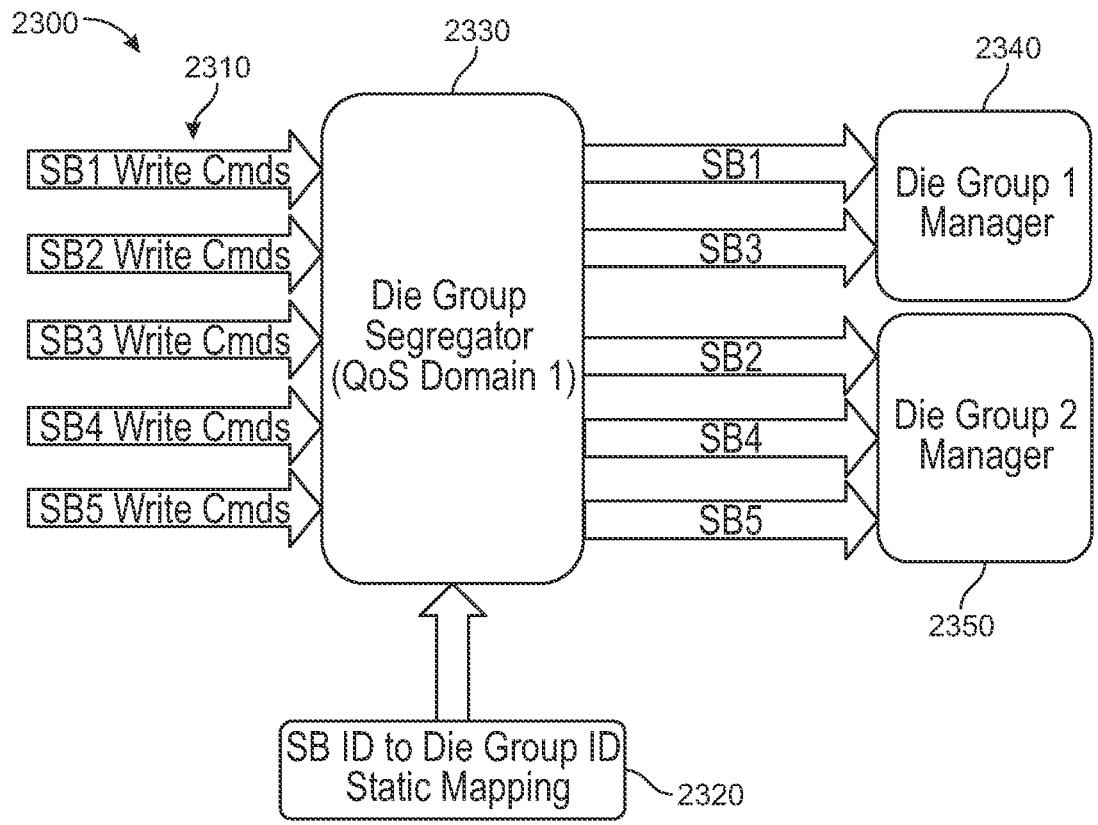
FIG. 23 depicts a die group segregator for handling write commands, according to some arrangements.

Referring now to FIG. 23, a die group segregator 2330 for handling write commands is shown, according to some arrangements. In one aspect, once the superblock level segregation is complete, the die group ID 2320 is utilized to segregate the superblocks 2310 into their respective die groups, which are then inputted into the die group manager 2340 or 2350. As illustrated in the segregation architecture 2300 of FIG. 23, two superblocks (e.g., SB1 and SB3) are segregated to the die group 1 manager (2340), and three superblocks (e.g., SB2, SB4, SB5) are segregated to the die group 2 manager (2350). This allocation also follows the static mapping, providing consistent resource management.

As new commands continuously arrive for each open superblock in a QoS domain, the die group segregator 2330 can segregate them based on the die group ID 2340 using the static mapping between superblock ID and die group ID. This segregation process provides that each die group receives the appropriate commands and superblocks, thereby maintaining optimal performance and system efficiency. Thus, the die group segregator 2330, in combination with the previously discussed segregation techniques, provides an implementation of managing superblock IDs and die group IDs for a large number of VDs, QoS domains, and placement IDs. By efficiently segregating superblocks based on die group IDs and QoS domains, the segregation architecture 2300 maximizes NAND die parallelism and enhances overall system performance.

Figures 24, 25:
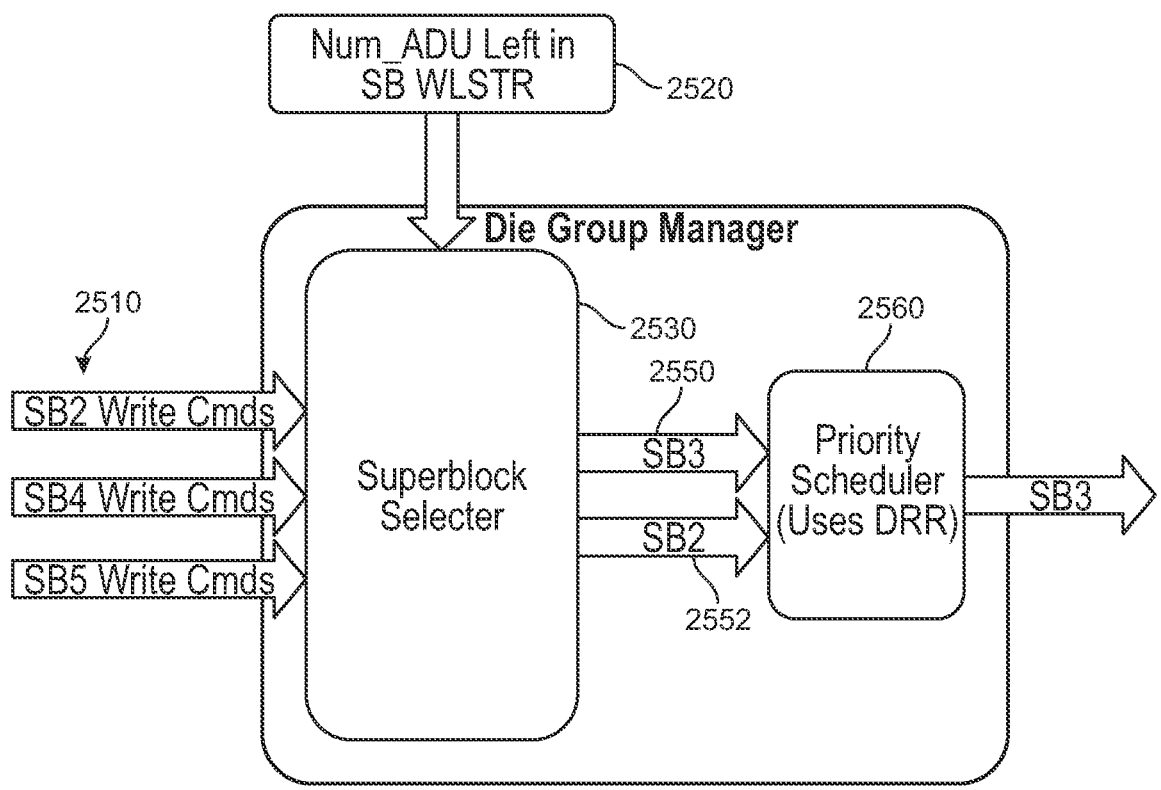
FIG. 24 depicts a static mapping between superblock ID and die group ID, according to some arrangements.
FIG. 25 depicts a die group manager for selecting and writing, according to some arrangements

Referring now to FIG. 24, a static mapping between superblock ID and die group ID is shown, according to some arrangements. As shown, assuming that there are two die groups and 2,000 superblocks in the VD, this static mapping provides that superblocks are consistently and efficiently allocated to their corresponding die groups, enhancing overall system performance and resource management. In one aspect, the superblocks are constructed based on their die group ID. In this example, the superblocks are evenly distributed between the two die groups. In particular, each die group will be responsible for managing and programming its set of superblocks, maintaining optimal performance and NAND die parallelism. In some arrangements, the static mapping between superblock ID and die group ID enables the system to effectively handle the large number of superblocks in the VD without causing any confusion or misallocation of resources. This consistent mapping ensures that new commands arriving for each open superblock in a QoS domain are segregated and allocated to the appropriate die group, further improving system performance.

Referring now to FIG. 25, a die group manager 2500 for selecting and writing is shown, according to some arrangements. In one aspect, since there are a limited number of inter processing communication (IPC) channels that can process in a first-in-first-out (FIFO) manner and that can be supported from the write divider in the frontend to the die manager per die in the backend and a limited number of write pointer lists that can be supported in the device, it can be important to employ a die group manager 2500 to decide which superblock ID to program next in the QoS domain.

The die group manager 2500 can utilize two sub-systems to select the superblock ID to be programmed next in the QoS domain. The first sub-system is the superblock selector 2530, which can be configured to select superblock IDs with a sufficient number of pending write ADUs to complete a superblock WLSTR 2520 (i.e., a WLSTR across all the dies in the superblock). To enable this criterion, the superblock manager in the superblock WLSTR identifier keeps track of the current ADU offset in the current superblock WLSTR. i.e., the number of ADUs pending to complete the current superblock WLSTR. In some arrangements, superblocks 2510 with enough pending ADUs to complete a WLSTR are selected by the superblock selector 2530 (e.g., selected superblocks 2550 and 2552).

In some arrangements, superblock selector 2530 can examine each superblock's (2530) status, specifically focusing at least two parameters (but are not limited to): the pending ADUs to be written in the current superblock WLSTR and the current ADU offset in the WLSTR. By analyzing this information, the superblock selector 2530 is able to determine which superblocks have sufficient pending ADUs to fill up the remaining ADUs in the current WLSTR. The selection criteria for the superblock selector 2530 ensure that only superblock IDs with enough pending ADUs to complete the current superblock WLSTR are selected. Once the superblock selector 2530 has identified the appropriate superblocks with complete WLSTRs, this information is passed on to the priority scheduler 2560. The priority scheduler 2560 then takes the selected superblocks and prioritizes them based on their cumulative weight, ensuring fairness among the different Placement IDs and ultimately leading to better overall system performance.

The second sub-system is the priority scheduler 2560, which can be configured to choose the superblock WLSTR with the highest cumulative weight. If multiple write commands exist within a superblock WLSTR, the total weight of all ADUs in the write commands within the WLSTR can be used as the weight of the superblock WLSTR. In one aspect, the priority scheduler 2560 employs a round robin algorithm or model to determine the next superblock with a complete WLSTR to program next in the QoS domain, ensuring fairness among different placement IDs in the QoS domains.

In some arrangements, the weights of the ADUs within each WLSTR can be associated with the individual write commands within a WLSTR of a superblock. In one aspect, the weights of the ADUs can be used to prioritize the processing of write commands based on their importance or urgency. The priority scheduler 2560 can use these weights to select the superblock to program next in the die group for the QoS domain. For example, when there are three write commands within a WLSTR of a superblock, write command A can have a weight of 5 (e.g., high priority), write command B can have a weight of 3 (e.g., medium priority), and write command C can have a weight of 1 (e.g., low priority). In this example, the priority scheduler 2560 provides a cumulative weights of each write ADUs in the superblock WLSTR to determine the weight of the superblock WLSTR. The superblock with the lowest weight (i.e., the highest priority) can be selected to program next in the die group for the QoS domain. Accordingly, the weights of the ADUs help to balance the processing of write commands and ensure that higher-priority tasks are executed before lower-priority ones.

In some arrangements, upon receiving the list of suitable superblocks with complete WLSTRs from the superblock selector 2530, the priority scheduler 2560 evaluates the total weights of the ADUs within each WLSTR (e.g., SB2 2550 and SB3 2552). If there are write commands with different weights belonging to the same WLSTR, the cumulative weight of all the ADUs in the WLSTR is used for the selection process. To achieve fairness among the placement IDs and maintain a balanced distribution of resources, the priority scheduler 2560 employs a round robin (DRR) algorithm. This algorithm takes into account the cumulative weights of the ADUs in each WLSTR and allocates resources accordingly. By using the DRR method, the priority scheduler 2560 ensures that each superblock WLSTR receives a fair share of resources, preventing any one superblock from monopolizing the system. Additionally, by considering the cumulative weights of the ADUs within each WLSTR and employing a fair resource allocation algorithm like DRR, the priority scheduler 2560 contributes to maintaining high levels of efficiency and performance within the system.

Figures 26, 27:
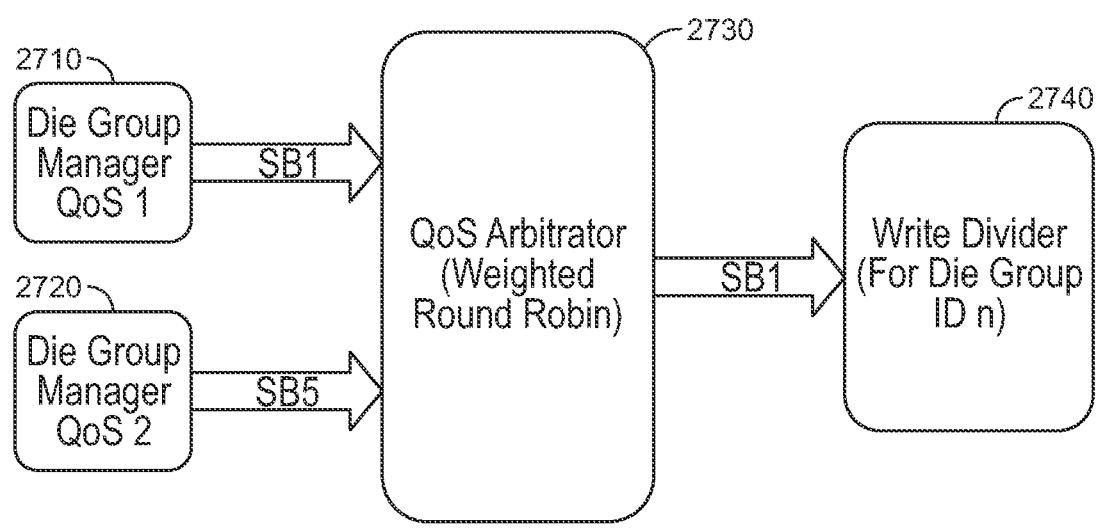
FIG. 26 depicts a superblock WLSTR with multiple write command ADUs and their priorities, according to some arrangements.
FIG. 27 depicts a QoS arbitrator for arbitrating superblocks to program, according to some arrangements.

Referring now to FIG. 26, a superblock WLSTR 2600 with multiple write command ADUs and their priorities is shown, according to some arrangements. In one aspect, within a single WLSTR (i.e., word line string), there can be multiple write commands, and each command may have a different priority or weight associated with it. In some arrangements, to account for these varying priorities, the cumulative weight of the superblock WLSTR is calculated by summing the product of the weight of each command and the number of ADUs within that command.

In the illustrated example, the superblock WLSTR 2600 consists of three write commands (w1, w2, and w3). Write command w1 has a weight of P1 and includes 2 ADUs, while w2 has a weight of P2 and consists of 3 ADUs. Finally, w3 has a weight of P3 and includes only one ADU. The cumulative weight of the superblock WLSTR 2600 can be computed as follows: Weight of the superblock WLSTR= (weight of w1*num_of_ADUs_in_w1)+(weight of w2*num_of_ADUs_in_w2)+(weight of w3*num_of_ADUs_in_w3) (e.g., where all the 3 writes falls on the same superblock WLSTR at ADU offset 0, 2 and 5 respectively).

By calculating the cumulative weight of the superblock WLSTR 2600 in this manner, the priority scheduler 2560 can effectively prioritize the programming of superblock WLSTRs based on their overall significance to the system. This approach helps ensure fair resource allocation and enhances overall system performance by considering the varying priorities of different write commands and the number of ADUs within each command.

Referring now to FIG. 27, a QoS arbitrator 2730 for arbitrating superblocks to program is shown, according to some arrangements. In one aspect, a QoS domain arbitrator 2700 can be implemented where after determining the superblock to program per QoS domain (e.g., die group manager 2710 and 2720), the QoS arbitrator 2730 can employ a weighted round robin scheduler to decide which superblock to program next in the die group. This decision takes into account the different weights assigned to each QoS domain, which can be derived from a namespace management command that includes the weight of the QoS domain for the QoS Arbitrator 2730. In some arrangements, the QoS Arbitrator 2730 provides fairness and tenant isolation between QoS domains, preventing heavy traffic in one domain from negatively impacting the latency of commands with equal priority in another domain sharing the same die group. This provides predictable latency across QoS domains, maintaining optimal system performance.

In some arrangements, the QoS domain weights are associated with different QoS domains, which represent different levels of service requirements for the system. In one aspect, QoS domain weights can be used by the QoS arbitrator 2730 to schedule the next QoS domain to program to the die group using a weighted round robin scheduling algorithm. For example, when there are two QoS domains, QoS domain 1 can have a weight of 4 and QoS domain 2 can have a weight of 2. In this example, the QoS arbitrator 2730 can use these weights to schedule the next QoS domain to program to the die group using a weighted round robin scheduling algorithm. In this example, for every four write commands processed from QoS Domain 1, two write commands from QoS Domain 2 can be processed. This ensures that QoS Domain 1, with a higher weight, receives more resources and bandwidth compared to QoS Domain 2. Accordingly, this ensures equal fairness and tenant isolation between QoS domains and helps to maintain predictable latency across QoS domains.

In one aspect, by using the weight of each QoS domain in the weighted round robin scheduler, the QoS arbitrator 2730 can effectively schedule the next program for the die group ID. The weight of the QoS domain can be obtained from the host, providing the necessary information for the QoS arbitrator to make informed decisions. Unlike in FIG. 18, the round robin of FIG. 27 uses weights of the QoS Domains to schedule the next program, whereas FIG. 18 uses a multi-stage scheduling method. In some arrangements, the write divider 1740 receives the superblock to program from the QoS arbitrator 2730, providing that the most appropriate superblock is selected for programming, taking into account the unique requirements of each QoS domain.

Figure 28:
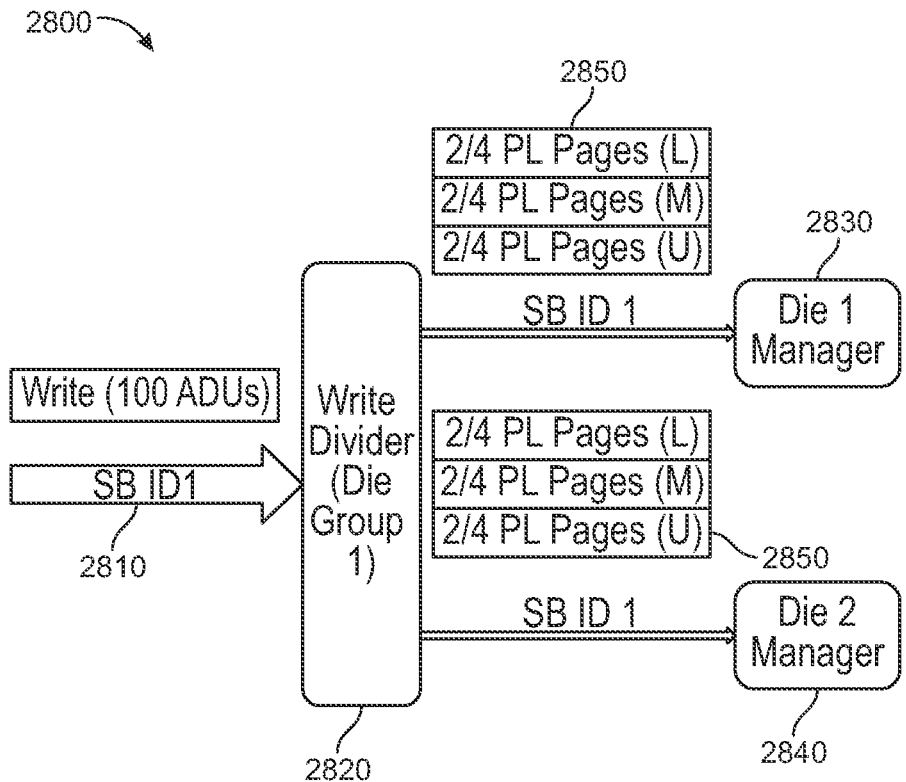
FIG. 28 depicts a write divider for dividing the write commands into NAND Flash access units for programming, according to some arrangements.

Referring now to FIG. 28, a write divider 2820 for programming the superblock in a specific die group is shown, according to some arrangements. In a write divider architecture 2800, after the QoS arbitrator 2730 selects the superblock to program next within the die group, the write divider 2820 for the die group ID divides the write commands in the superblock into die access units (DAUs). As illustrated in FIG. 28, there is only one write sub-command context 2850 in this example, with SB ID 1 (2810) being provided to the die managers 2830 and 2840 through IPC queues. In some arrangements, the SB ID 1 can be provided to both die managers since a superblock is made of multi-plane physical blocks from all the dies in a die group. This communication between the write divider 2820 and die managers (e.g., 2830, 2840) ensures that each die is programmed efficiently and effectively. In some arrangements, the write divider 2820 can allocate the write commands in the superblock to the appropriate die managers (e.g., 2830, 2840). In one aspects, the allocations can effectively manage and distribute the workload across the dies within the die group. This process helps maintain optimal performance and ensures that the dies are programmed in a balanced and efficient manner, contributing to overall system stability and performance.

Figure 29:
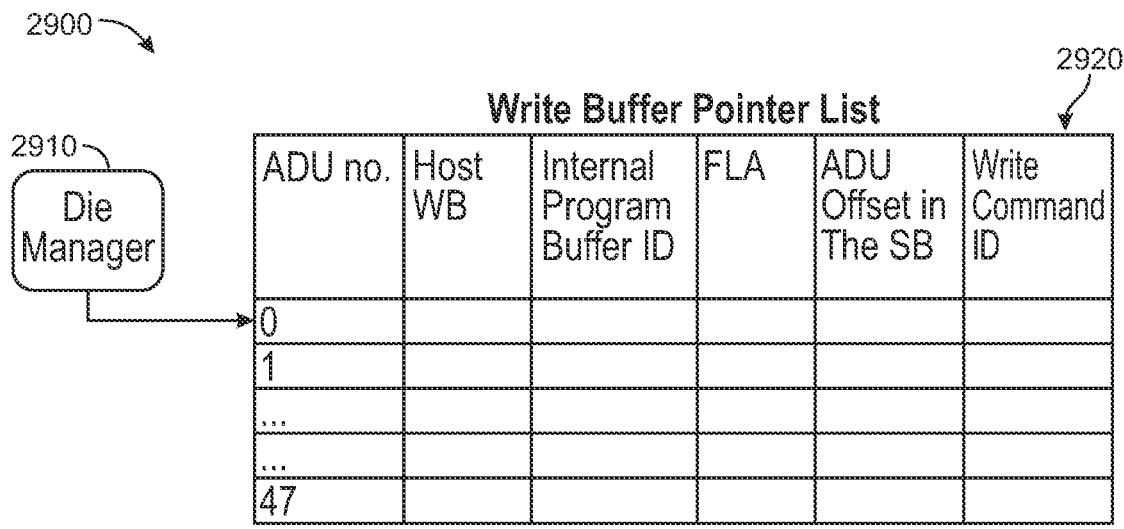
FIG. 29 depicts a die manager to allocate a write buffer pointer list, according to some arrangements.

Referring now to FIG. 29, a die manager 2910 to allocate a write buffer pointer list 2920 is shown, according to some arrangements. In one aspect, the die architecture 2900 implemented by die manager 2910 can allocate write pointer lists by assigning one write pointer list 2920 per die instead of per open multi-plane block per die. In particular, this provides the die manager 2910 for each die in the SEF backend to allocate write pointer entries from a free pool of write pointer entries maintained for the entire SEF device. Thus, the die manager 2910 can allocate enough write pointer entries to perform a full sequence program (FSP) to the NAND. To calculate the number of entries in the write pointer list 2920 needed for a FSP to the NAND die, the following formula can be used (but is not limited to): 4 planes*4 ADUs*3 (LMU)=48 entries.

By selecting the superblock ID to write to the die group, the total number of the write pointer list 2920 depends on the number of dies in the SEF unit and not the number of open superblocks in the SEF unit. In one aspects, this implementation eliminates the limitations on the number of open superblocks that can be served by the SEF unit due to the amount of fast memory available in the SEF device. For example, for a 4-plane TLC NAND, the size of the Write Pointer List for one FSP unit per die would be calculated as follows: 4 ADUs per plane*4 planes*3 pages (L, M, U)=48 ADUs. By implementing this allocation, the system can manage write pointer lists of all dies with minimum fast memory footprint and optimize the performance of the SEF unit.

Figure 30:
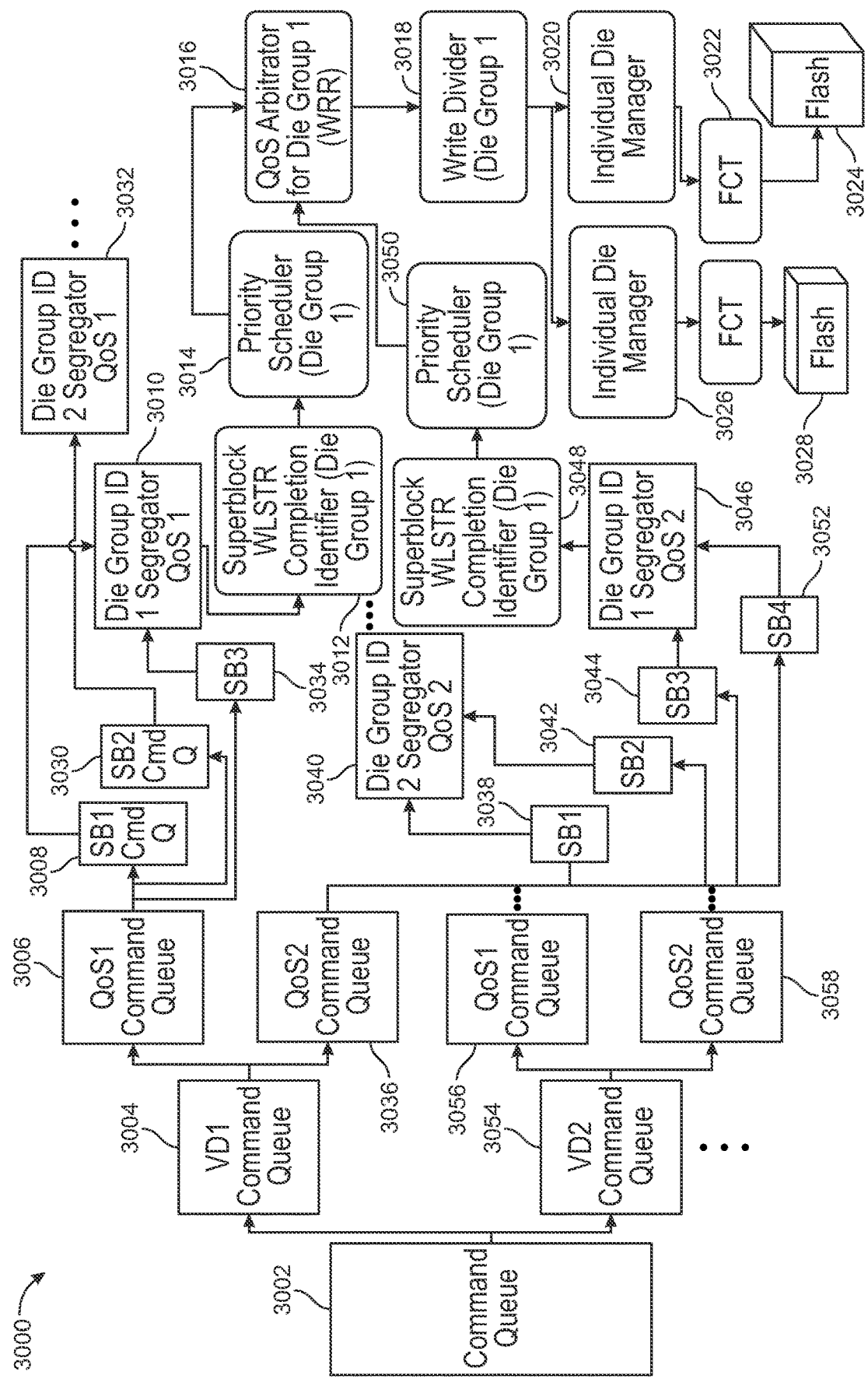
FIG. 30 depicts a block diagram of processing commands, according to some arrangements.

Referring now to FIG. 30, a block diagram of processing commands is shown, according to some arrangements. As shown, first, a command queue 3002 is divided (or segregated) into VDs (e.g., 3004 and 3054). The VDs can then be divided into QoS domains (e.g., 3006, 3036, 3056, 3058), with each QoS domain further divided into multiple superblocks (e.g., 3008, 3030, 3034, 3038, 3042, 3044, 3052). Subsequently, these superblocks can be aggregated as per the die groups they belongs to (e.g., 3010, 3032, 3040, 3046). For example, within block 3012 (and block 3048), the system selects which superblock WLSTR is complete. Next, at 3014 (and block 3050), the priority scheduler identifies the completed superblock WLSTR with the highest priority. Following this, the QoS arbitrator 3016 selects between the priority schedulers 3014 or 3050 based on a weighted round robin algorithm. Finally, the write divider 3018 divides the selected superblock into multiple dies for processing. Accordingly, this structured implementation allows the system to manage VDs and QoS domains efficiently by maintaining tenant isolation among different VDs and QoS domains and thus, ensuring predictable latency. The process optimizes performance by effectively distributing data among dies and balancing the workload among the various components of the system.

Figure 31:
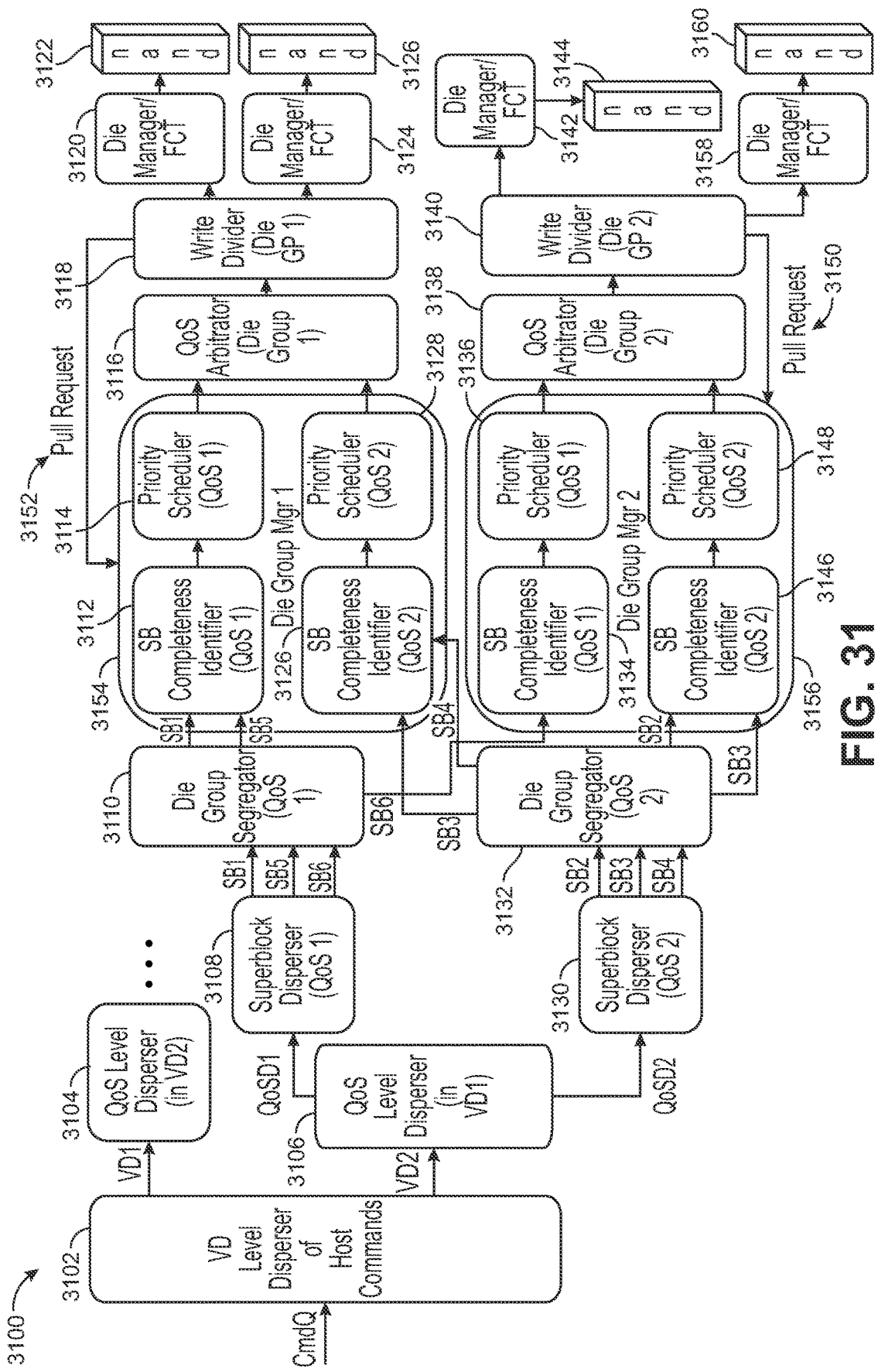
FIG. 31 depicts a processing architecture for processing commands, according to some arrangements.

Referring now to FIG. 31, a processing architecture 3100 for processing commands is shown, according to some arrangements. In one aspect, the VD level disperser 3102 divides the CmdQ into two VDs (e.g., vd1 and vd2). The QoS level disperser 3106 further segregates the VDs into QoS domains, QoSd1 and QoSd2 (the segregation by QoS level disperser 3104 is not shown). The superblock dispersers 3108 and 3130 then segregates the superblocks based on their superblock IDs. Next, the die group segregators 3110 and 3132 aggregates (or groups together, or segregating into die group ids) the superblocks based on the die group id. Within the same die group id, there are two QoS domains (e.g., QoS 1 and QoS 2). The superblock (SB) completeness identifiers 3134/3146 (and 3154/3126), along with the priority schedulers 3136 and 3148, perform their respective functions.

In some arrangements, the die manager 3154 can first identify superblocks with enough pending write ADUs to complete a superblock WLSTR (e.g., 3134/3146). The SB completeness identifiers can monitor the current ADU offset in the ongoing superblock WLSTR. i.e., the number of ADUs that are pending to be written to complete the current superblock WLSTR. By doing so, it ensures that superblocks with sufficient pending ADUs to complete a WLSTR are considered for further processing. Once the superblock completeness identifier 3134/3146 has identified the superblocks with complete WLSTRs, the priority scheduler 3136/3148 (and 3114/3128) can select the superblock WLSTR with the highest cumulative weight. The total weight of all ADUs in the write commands within a superblock WLSTR is used as the weight of the superblock WLSTR. The priority scheduler can use a round robin algorithm to determine the next superblock with a complete WLSTR to program in the QoS domain, achieving fairness among different placement ids in the QoS domains.

The die group manager 3156 outputs its selection to the QoS arbitrator 3138 and die group manager 2154 can output its selection to QoS arbitrator 3116. In one aspects, the selection which superblock to program next is based on a weighted round robin algorithm. After both the superblock completeness identifier and the priority scheduler have performed their respective functions, the die group manager outputs its selection to the QoS arbitrator 3116. In some arrangements, the QoS arbitrator 3116 can be responsible for arbitrating between different Qos domains. It can utilize a weighted round robin scheduler to choose which superblock to program next in the die group, taking into consideration the weight of each QoS domain. The weights of the QoS domains are obtained from the host through a namespace management command. This provides equal fairness and tenant isolation between QoS domains, providing predictable latency across QoS domains, and preventing a large traffic in one QoS domain from affecting the latency of commands of equal priority in another QoS domain falling on the same die group.

In some arrangements, the write dividers 3140 and 3118 then divide the selected superblock into die access units and outputs the result to the die managers 3142/3158 and 3120/3124, which programs the NAND 3144/2160 and NAND 3122, 3126, respectively. It should be understood that upon receiving a pull request (e.g., pull request 3152 and 3150), the die group manager (e.g., 3154 or 3156) is triggered to process the next write command for the die group. This approach provides that the system processes the most recent and relevant data based on the superblock id, WLSTR completeness, and priority of the write commands when the dies in the die group are available for programming. By parallelizing the write command flow using die group id, the system can achieve higher efficiency and better performance.

Figure 32:
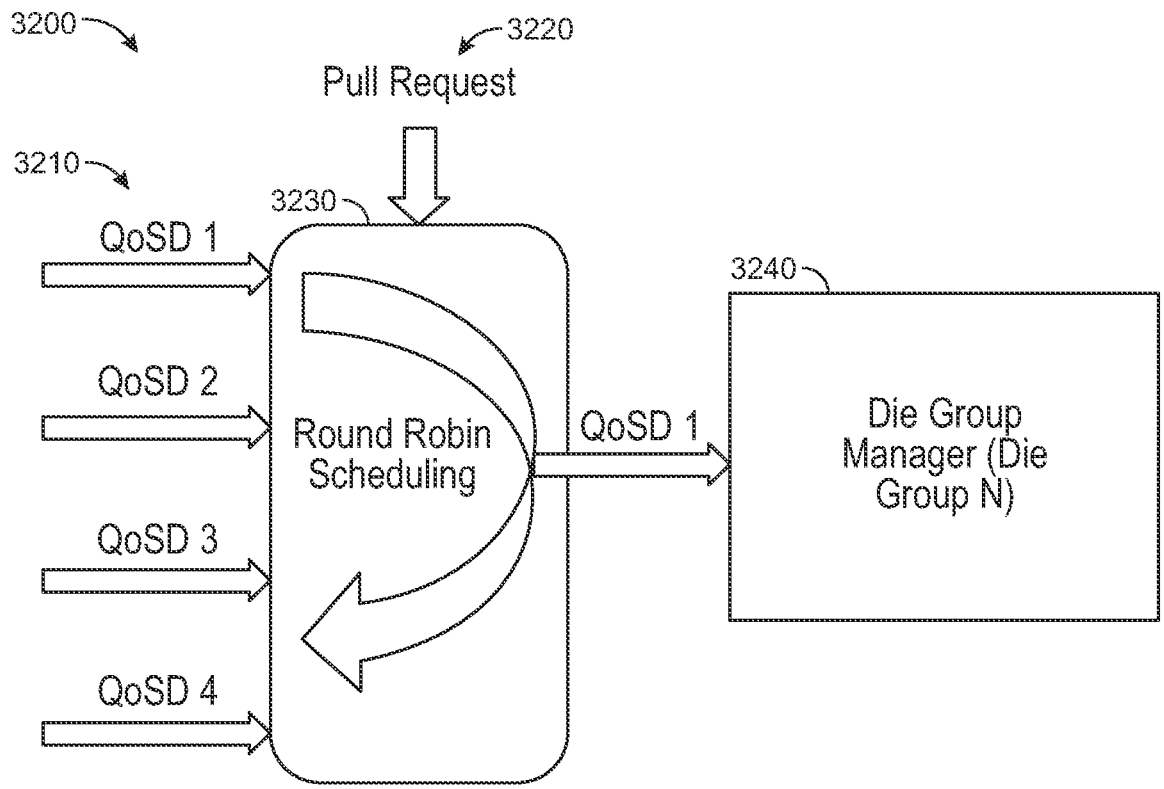
FIG. 32 depicts a die group manager incorporating round robin scheduling, according to some arrangements.

Referring now to FIG. 32, a die group manager 3240 incorporating round robin scheduling 3230 is shown, according to some arrangements. The round robin scheduling architecture 3200 can balance the workload and provides equal opportunities for each QoS domain to be processed. In one aspect, upon receiving a pull request 3220 from the write divider, the die group manager 3240 starts processing the QoS domains based on the round robin scheduling 3230. In this scheduling implementation, each QoS domain 3210 (e.g., QoSD 1, QoSD 2, QoSD 3, QoSD 4) is processed sequentially and cyclically, ensuring that no single QoS domain is favored or neglected.

In some arrangements, the die group manager 3240 can keep track of the current position in the sequence of QoS domains. When a pull request 3220 is received from the write divider, the die group manager 3240 selects the next QoS domain in the sequence for processing. Once the selected QoS domain is processed, the die group manager 3240 updates the current position in the sequence and prepares for the next pull request. When the last QoS domain in the sequence is processed, the die group manager 3240 loops back to the first QoS domain, and the process repeats. By using the round robin scheduling 3230, the die group manager 3240 provides that each Qos domain is treated fairly and has an equal chance of being processed, regardless of its position in the sequence. This approach prevents any potential bottleneck or performance issues caused by favoring specific QoS domains or neglecting others.

Figure 33:
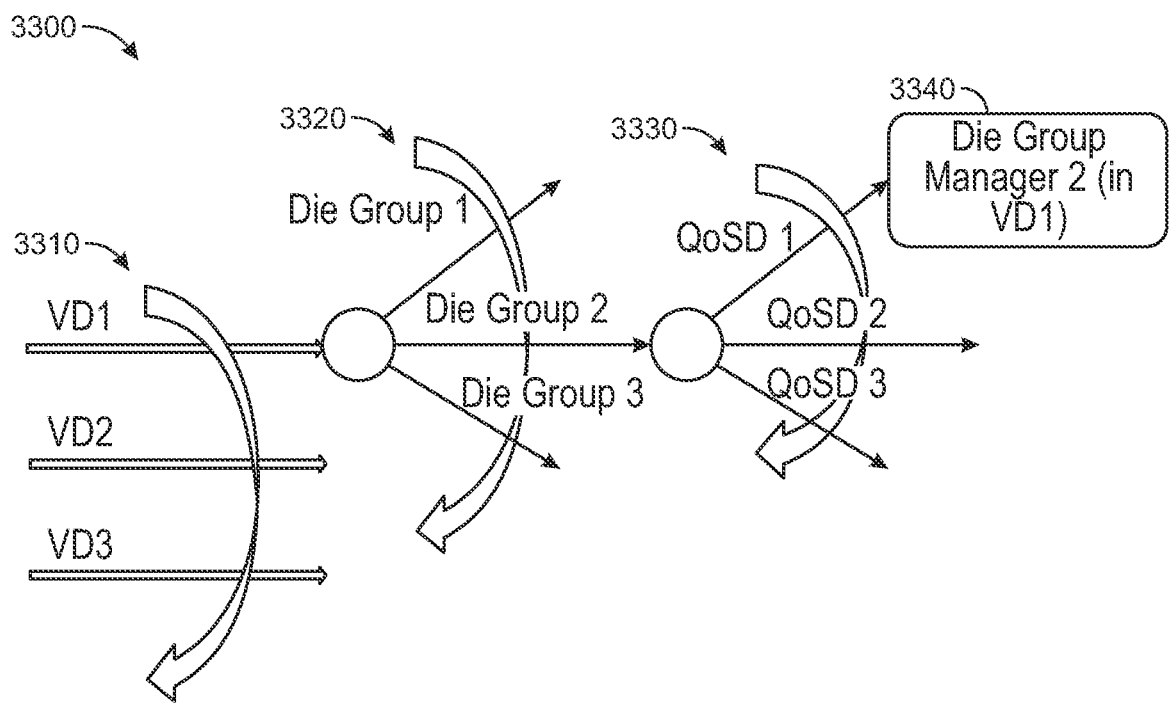
FIG. 33 depicts a three-stage round robin scheduler for maintaining task processing fairness, according to some arrangements.

Referring now to FIG. 33, a three-stage round robin scheduler 3300 for maintaining task processing fairness is shown, according to some arrangements. In one aspect, the three-stage round robin scheduler 3300 is designed to maintain task processing fairness among VDs, die groups, and QoS domains. The multi-stage approach can ensure that each level of the tenant hierarchy is treated fairly, promoting tenant isolation and optimal system performance.

At 3310, stage 1, the round robin scheduler 3310 periodically checks the VDs for pull request events in any of their die groups. By doing so, it ensures that no VD is left unattended, and all die groups are considered when processing requests. At 3320, at stage 2, the round robin scheduler schedules among pull requests in different die group IDs of a VD. This stage focuses on balancing the processing of requests across various die groups within the same VD, ensuring that all die groups are given equal opportunities for processing and preventing any potential bottlenecks. At 3330, at stage 3, the round robin scheduler schedules among QoS domains with pending writes in a die group ID. It takes into account the fairness between different QoS domains, ensuring that each domain has an equal chance of being processed. The selected QoS domain is then sent to the die group manager 3340 for further processing.

As shown, using the using a three-stage round robin scheduler 3300, the CPU time-sharing between VDs and QoS domains provides tenant isolation at each level of the tenant hierarchy. Additionally, using the using a three-stage round robin scheduler 3300, the CPU time-sharing between die groups enables maximum die performance by achieving NAND parallelism. Accordingly, the three-stage round robin scheduler 3300 manages and processes tasks among VDs, die groups, and QoS domains, providing fairness, tenant isolation, and optimal system performance.

Figure 34:
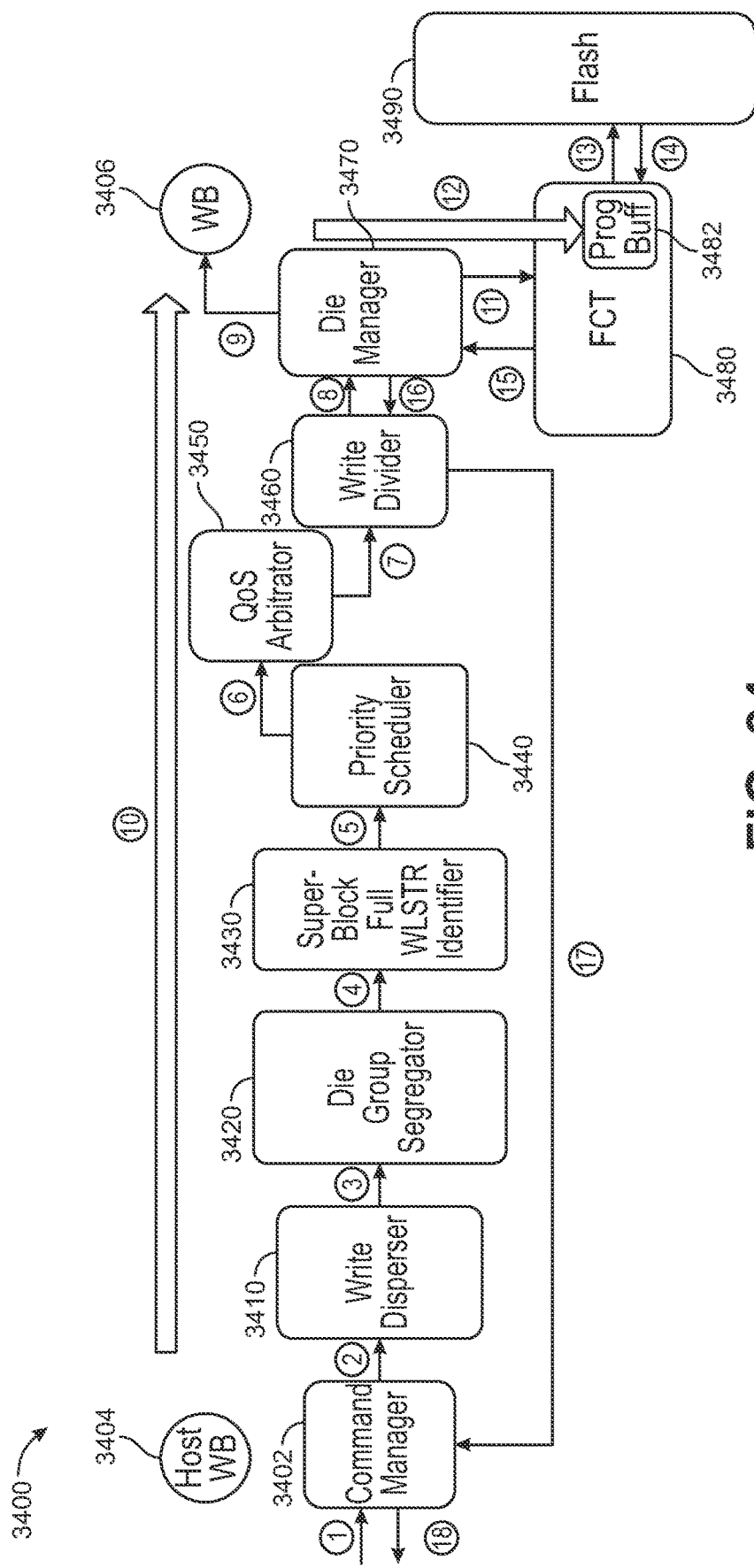
FIG. 34 depicts a data storage management architecture, according to some arrangements.

Referring now to FIG. 34, a data storage management architecture 3400 is shown, according to some arrangements. In general, the data storage management architecture 3400 related to processing write commands provides several advantages. By segregating superblocks using die group IDs, the data storage management architecture 3400 can maintain NAND die parallelism and maximizes utilization of die bandwidth. The data storage management architecture 3400 can efficiently manages various VDs, QoS domains, and superblock IDs with a minimum number of IPCs (e.g., 1 IPC per NAND die). This is achieved by using superblock WLSTR completeness identifiers and priority schedulers to select the superblock for programming next in the die group for the QoS domain. It should be understood that die group segregator 3420, and superblock full WLSTR identifier 3430 can be a single component (e.g., software, hardware, or combination) or separate components. For example, a die group system can include the die group segregator 3420 and the superblock full WLSTR identifier 3430. It should also be understood that the priority scheduler 3440, the QoS arbitrator 3450, the write divider 3460, and the die manager 3470 can be a single component (e.g., software, hardware, or combination) or separate components. For example, a command processing system can include the priority scheduler 3440, the QoS arbitrator 3450, the write divider 3460, and the die manager 3470.

The data storage management architecture 3400 also implements a QoS arbitrator to select the next QoS domain to program next in the die group among the several QoS domains competing for the same die group by weighted round robin scheduling scheme. This helps in maintaining QoS domain isolation by avoiding heavy traffic in one QoS domain causing significant latency in another QoS domain. By selecting one superblock WLSTR unit per die group, the data storage management architecture 3400 reduces the write pointer list to one per die, thereby minimizing the memory footprint required for optimal performance. In some arrangements, the data storage management architecture 3400 increases write throughput by segregating superblocks based on die group IDs and issuing the most appropriate superblock WLSTR on each die group, thereby parallelizing write command processing. Write performance is also increased because the new design with minimum memory footprint can use fast memory (SRAM or DTCM) for write pointer list and write sub-command contexts.

Since minimum memory footprint for write pointer table and write sub-command context can be placed in fast memory (SRAM or DTCM), the data storage management architecture 3400 facilitates a DRAM-less design for the SEF device, a desirable feature for SEF products to achieve higher read and write performance. The data storage management architecture 3400 is portable across multiple SoCs, irrespective of the amount of SRAM available in the SoC. In some arrangements, the data storage management architecture 3400 is scalable from one VD, one die group, and one QoS domain to a large number of VDs, die groups, QoS domains, and superblock IDs as permitted by the product SKU and NAND configurations. The data storage management architecture 3400 also implements a three-stage round robin task scheduling method to maintain CPU processing time-sharing fairness among different VDs, die groups, and QoS domains to maintain predictable latency among VDs and QoS domains and achieve maximum die parallelism.

Referring now to the stages described in the data storage management architecture 3400. At command stage 1, the command manager 3402 accepts incoming write commands and places them in the command table. The write commands are then forwarded to the write disperser 3410 for further processing.

At command stage 2, the write disperser 3410 takes the write commands and segregates them based on different criteria, such as virtual devices (VDs), QoS domains, and superblock ID/placement ID. This segregation ensures that the write commands are organized and ready for distribution to the appropriate die group segregators. The write disperser 3410 takes the incoming write commands and segregates them based on various criteria, such as virtual devices (VDs), Quality of Service (QOS) domains, and superblock ID/placement ID.

At command stage 3, the write disperser 3410 sends the segregated write commands to the die group segregator 3420. In some arrangements, the write disperser 3410 can include the VD level disperser, QoS level disperser, and superblock disperser, which are described in greater detail with reference to FIGS. 20-22. In some arrangements, the write disperser 3410 can include multiple dispersers to enhance the organization and processing of write commands. These dispersers may include the VD level disperser, QoS level disperser, and superblock disperser. As the write commands are processed by the VD level disperser, QoS level disperser, and superblock disperser, they are sent to the die group segregator 3420. The die group segregator 3420 further refines the organization and allocation of write commands by segregating them based on die group IDs.

At command stage 4, the die group segregator 3420 receives the write commands and further segregates (sometimes referred to as aggregates) them based on different die group IDs. The segregated superblock IDs are then sent to individual superblock full WLSTR identifiers 3430. In some arrangements, die group IDs represent unique identifiers for each die group within the storage system, which consist of multiple dies or storage units. In general, the die group segregator 3420 analyzes the die group IDs associated with each superblock and allocates them to their corresponding die groups. Once the write commands belonging to different open superblocks have been segregated based on die group IDs, the segregated superblock IDs are then sent to individual superblock full WLSTR identifiers 3430. The superblock full WLSTR identifiers 3430 can determine the completion status of word line strings within each superblock. By monitoring and identifying the completion status of WLSTRs, the superblock full WLSTR identifiers 3430 provides that write commands are allocated to superblocks with available space for programming.

At command stage 5, the superblock full WLSTR identifier 3430 identifies the superblocks that have completed one WLSTR and sends them to the priority scheduler 3440. The priority scheduler will then determine the next program based on the weights of the write command ADUs in the superblock WLSTR. The superblock full WLSTR identifier 3430 can identify the superblocks that have completed at least one WLSTR. Completion of a WLSTR can signify that the superblock has available space for new data to be programmed. Once the superblock full WLSTR identifier 3430 identifies such superblocks, it forwards the information to the priority scheduler 3440.

At command stage 6, the priority scheduler 3440 selects the most appropriate superblock in the QoS domain to schedule the write to the NAND. This selection can be based on a round robin scheme, which balances the processing of write commands across different superblocks. In some arrangements, the priority scheduler 3440 can determine which superblock should be programmed next, taking into account the weights of the write command ADUs within each superblock WLSTR. By considering the weights of the write command ADUs, the priority scheduler 3440 can make informed decisions about which superblocks to prioritize for programming.

In some arrangements, one method the priority scheduler 3440 can employ for determining a suitable superblock is the round robin scheme. This scheduling algorithm helps achieve a balance in processing write commands across different superblocks by taking into account the weights of ADUs within each WLSTR of the superblocks. In some arrangements, a round robin scheme can be implemented that maintains a deficit counter for each superblock. For example, the counter is incremented based on the weights of the ADUs associated with the write commands. During the scheduling process, the deficit round robin algorithm (or model) assesses the deficit counters of the superblocks in the QoS domain. It selects a superblock for scheduling when the deficit counter of that superblock is greater than or equal to the size of the corresponding write command ADU of the WLSTR.

In some arrangements, the round robin scheme could be implemented as, but is not limited to, (1) weighted round robin (WRR): assigning a weight to each queue or task and allocates resources proportionally to their weights; (2) weighted fair queuing (WFQ): allocating resources based on the weights assigned to tasks or queues, while also taking into account the current resource consumption of each task; (3) priority queuing (PQ): assigning priorities to tasks, and the scheduler selects the highest-priority task to execute next; (4) strict priority queuing (SPQ): assigning priorities to tasks or queues, but it schedules the highest-priority task or queue first, without any consideration for fairness or resource usage; (5) fair queuing (FQ): allocating resources fairly among all tasks or queues, regardless of their weights or priorities; (6) token bucket algorithm-generating tokens at a fixed rate and added to a "bucket," where each task or queue requires a certain number of tokens to execute, and when hen a task or queue has enough tokens, it can execute, and the tokens are removed from the bucket; (7) leaky bucket algorithm: controlling the rate at which tasks are executed by removing tokens at a fixed rate, and tasks or queues can execute if they have enough tokens remaining in the bucket.

At command stage 7, the QoS arbitrator 3450 schedules the next QoS domain to program to the die group using a weighted round robin scheduling algorithm based on the weight of the QoS domain. The QoS arbitrator 3450 determines which command to arbitrate between different QoS domains, ensuring equal fairness and tenant isolation between QoS domains, as well as maintaining predictable latency across QoS domains. In general, the QoS arbitrator 3450 can utilize weighted round robin scheduling algorithm (or model) that considers the weights assigned to each QoS domain. This provides that each QoS domain receives a fair share of resources and bandwidth, according to their assigned weights. By doing so, the QoS arbitrator maintains tenant isolation and helps prevent a heavy traffic load in one QoS domain from causing significant latency in another QoS domain. When the die group segregator (e.g., including the superblock full WLSTR identifier 3430 and priority scheduler 3440) can select the superblock within a QoS domain to be programmed next, based on factors like WLSTR completeness and priority of the write commands, it sends this information to the QoS arbitrator. The QoS arbitrator then schedules the appropriate QoS domain, which in turn determines which superblock within that QoS domain should be programmed next in the die group.

By coordinating with the die group manager and considering the weights assigned to each QoS domain, the QoS arbitrator 3450 provides that the storage system maintains a balance between processing commands fairly across all QoS domains and efficiently utilizing the die group resources. In some arrangements, the QoS arbitrator employs a weighted round robin algorithm for selecting a superblock to program in a die group amongst the QoS domains, said algorithm includes, but is not limited to, assigning the first QoS domain weight and the second QoS domain weight, maintaining a first maximum credit value and a first current credit value for the first QoS domain based on the first QoS domain weight and a second maximum credit value and a second current credit value for the second QoS domain based on the second QoS domain weight, selecting the first QoS domain or the second QoS domain based on at least on the first QoS domain weight, the second QoS domain weight, and an available credit of the first QoS domain and the second QoS domain, and decrementing the first current credit value based on the first QoS domain weight of the first QoS domain, thereby ensuring a fair distribution of scheduling opportunities amongst the QoS domains, proportional to their assigned weights.

In some arrangements, the weights of ADUs within each WLSTR determine the priority of write commands within the WLSTR, and wherein the first QoS domain weight of the first Qos domain includes a value indicative of the relative importance or priority of the first QoS domain, which is used in conjunction with the weighted round robin algorithm by the QoS arbitrator to schedule and arbitrate among different QoS domains competing for access to the die group, ensuring fair and efficient distribution of resources among the various QoS domains based on their respective priorities.

At command stage 8, the write divider 3460 takes the selected write commands and divides them into individual die units to be programmed. The write divider then sends the divided write commands to the die manager 3470 for further processing. In some arrangements, the write divider 3460 can divide the selected write commands into individual die units to be programmed. When the QoS arbitrator 3450 selects a QoS domain and schedules the write command associated with the selected superblock within that domain, the write command is then sent to the write divider 3460. Upon receiving the write command, the write divider 3460 analyzes the command to determine the die units to which the data needs to be written. This involves mapping the superblock to the corresponding die units and taking into account the NAND die architecture and organization. In some arrangements, the write divider can divide the write command into individual die-specific sub-commands. Each of these sub-commands corresponds to a portion of the write command that is to be programmed onto a specific die unit. By doing this, the write divider 3460 provides that the data is written in parallel across multiple dies, leading to a more efficient and faster write operation. Once the write command is divided, the write divider 3460 sends the individual die-specific sub-commands to the die manager 3470. The die manager 3740 then handles the allocation of internal write buffers, populating the source and destination addresses in the write pointer list, triggering the frontend DMA to transfer data, and preparing the descriptors for programming the write data to the NAND memory. In some arrangements, the write divider 3460 generates a pull request to the die group manager after dividing and issuing a write command to the individual die manager of the die group, the pull request triggering the die group manager to process the next write command for the die group, providing that the most up-to-date superblock based on sb WLSTR completeness and priority of the write commands in the sb WLSTR is processed when the dies in the die group are available for programming.

At command stage 9, the die manager 3470 compares the priority of the host write commands with other commands, such as nameless copy writes and housekeeping writes. Based on the priority comparison, the die manager selects the write command to program next. It then allocates internal write buffers and populates the source and destination addresses in the write pointer list. At command stage 10, the die manager 3470 triggers the frontend DMA (e.g., host WB 3404) to transfer the host data to the internal write buffer. At command stage 11, the die manager 3470 prepares the descriptors to program the write data to the NAND memory.

In one aspect, the die manager 3470 can (1) compare the priority of the host write commands with other commands and selecting the write command to program next, allocating internal write buffer, and populating the source and destination addresses in the write pointer list, (2) trigger a frontend DMA to transfer the host data to the internal write buffer, and (3) prepare descriptors to program the write data to the NAND memory.

At command stage 12, the write data is transferred from WB 3406 to the program buffers 3482 of the FCT 3480. The data is then padded with ECC bytes and a header to form the NAND codewords. At command stage 13, NAND codewords are transferred to the NAND page registers and programmed to the NAND memory (e.g., flash 3490). At command stage 14, once the NAND programming is complete, the FCT 3480 senses the completion and deallocates the FCT program buffer 3482. At command stage 15, the die manager 3470 receives the NAND program completion signal and frees up the write pointer entries in the write pointer list.

At command stage 16, the die manager 3470 also frees up the internal write buffer and sends a command completion signal to the write divider 3460. At command stage 17, the write divider 3460 updates the superblock information (such as current superblock WLSTR, current ADU offset in the superblock, and the number of remaining ADUs in the superblock). It then accumulates the command completion signals from all the die managers and sends the accumulated command completion to the command manager 3402. At command stage 18, the command manager 3402 sends the command completion signal to the host and frees up the corresponding slot in the command table. This marks the end of the write command process and ensures that the host receives confirmation of successful data transfer and storage.

Figure 35:
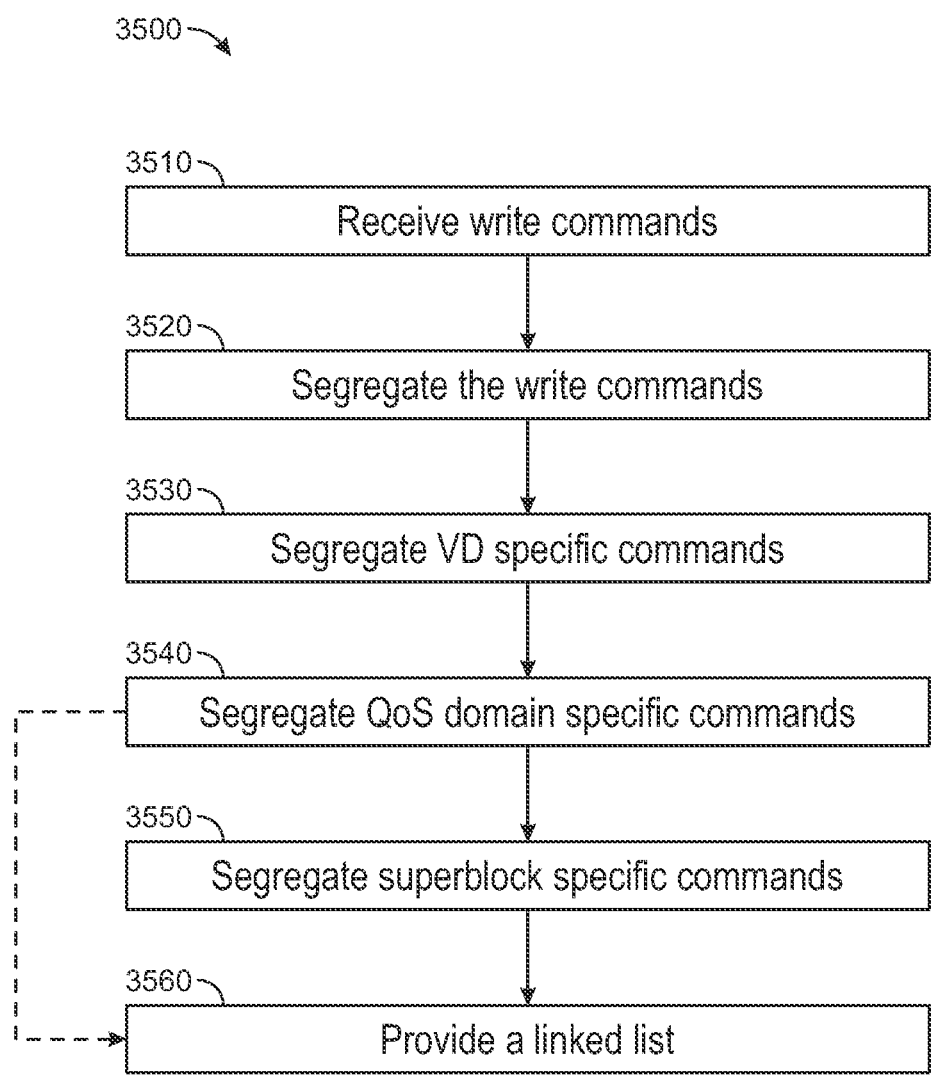
FIG. 35 depicts a flowchart for a method of managing data storage in a multi-tenant storage system, according to some arrangements.

Referring now to FIG. 35, is a flowchart for a method 3500 of managing data storage in a multi-tenant storage system, according to some arrangements. A multi-tenant storage system, such as data storage management architecture 2000, can be configured to perform method 3500. Further, any computing device or system described herein can be configured to perform method 3500.

In broad overview of method 3500, at block 3510, the multi-tenant storage system can receive write commands. At block 3520, the multi-tenant storage system can segregate the write commands. At block 3530, the multi-tenant storage system can segregate VD specific commands. At block 3540, the multi-tenant storage system can segregate QoS domain specific commands. At 3550, the multi-tenant storage system can segregate superblock specific commands. At block 3560, the multi-tenant storage system can provide a linked list identifier. In some embodiments, some or all operations of method 3500 may be performed by one or more systems of the data storage management architecture 2000 or other systems described herein. In various embodiments, each operation may be added, removed, or repeated. In some arrangements, blocks can be optionally executed by the one or more systems of the data storage management architecture 2000.

At block 3510, the multi-tenant storage system receives a plurality of new write commands associated with a plurality of virtual devices (VDs) and a plurality of Quality of Service (QOS) domains. For example, block 3510 includes processing incoming commands related to different tenants, each with its own VDs and QoS domains, which should be maintained in isolation. In some arrangements, the multi-tenant storage system may receive new write commands with different priorities or types, such as read or write requests, which require specific handling or resource allocation. In some arrangements, the system may also handle different types of storage media, such as SSDs, or hybrid storage, each with their respective performance characteristics and requirements.

At block 3520, the multi-tenant storage system segregates, using separate VD specific linked lists, the plurality of new write commands based on each of the plurality of new write commands respective virtual device (VD) identifiers. For example, block 3520 includes sorting the write commands according to their VD identifiers, creating separate linked lists for each VD to maintain tenant isolation at the VD level. In some arrangements, the VD-specific linked lists can be implemented using in-place linked lists to minimize memory footprint and improve overall performance. In some arrangements, the system can dynamically adjust the size of the linked lists based on the number of commands received or the specific requirements of the VDs.

At block 3530, the multi-tenant storage system segregates, using separate QoS domain specific linked lists, a plurality of VD specific commands of the VD specific linked lists based on each of the plurality of VD specific commands respective QoS domain identifiers. For example, block 3530 includes further refining the sorting process by organizing the write commands within their VDs into separate linked lists for each QoS domain, maintaining isolation between different QoS domains within each VD. In some arrangements, the QoS domain-specific linked lists can be further subdivided based on other parameters, such as the placement ID or superblock they belong to. In some arrangements, the QoS domain segregation may be combined with other scheduling algorithms to ensure optimal resource allocation and performance.

In some arrangements, a multi-stage round robin scheduler is implemented with a plurality of stages, each of the plurality of stages corresponding to a different level of tenant isolation of a plurality of tenant isolation levels, and wherein the multi-stage round robin scheduler includes a first stage for a VD level disperser, a second stage for a QoS level disperser, and a third stage for a superblock level disperser. In particular, the first stage segregates the write commands based on their respective VDs. The VD level disperser uses in-place linked lists to organize the commands, ensuring tenant isolation at the VD level while maintaining fairness among different VDs. The second stage further segregates the write commands based on their QoS domains within each VD. The QoS level disperser also utilizes in-place linked lists to manage the commands, enabling tenant isolation at the QoS domain level and ensuring fairness among various QoS domains in a VD. The third stage further segregates the write commands based on their superblock identifiers or placement identifiers within each QoS domain. The superblock level disperser makes use of in-place linked lists to organize the commands and maintain tenant isolation at the superblock level, providing fair treatment across different superblocks or placement identifiers in a QoS domain.

In some arrangements, the multi-stage round robin scheduler is triggered by an event scheduler when any event in any tenant isolation level of the plurality of tenant isolation levels is set, and in response to triggering, initiating a scheduling process for a corresponding disperser operation of at least one of the VD level disperser, the QoS level disperser, or the superblock level disperser. For example, the multi-stage round robin scheduler is event-driven and operates in conjunction with an event scheduler. The event scheduler monitors events occurring in any tenant isolation level among the plurality of tenant isolation levels. Events may include, for example, the arrival of new write commands, completion of ongoing write commands, or changes in the status of resources, such as available memory or buffer space. Upon triggering, the multi-stage round robin scheduler performs the disperser operation, ensuring tenant isolation and fairness among various tenants. For example, if a new write command arrives at the VD level, the scheduler triggers the VD level disperser to segregate the command based on its respective Virtual Device (VD). Similarly, events occurring at the QoS domain or superblock levels would prompt the scheduler to trigger the corresponding QoS level or superblock level dispersers. By using an event-driven approach, the multi-stage round robin scheduler can effectively respond to changes in the system's state and adapt the scheduling process accordingly. This provides efficient resource allocation, tenant isolation, and fairness across different tenant isolation levels, resulting in optimized performance and predictable latency for workloads belonging to various tenants.

When the event scheduler detects an event in any tenant isolation level, it triggers the multi-stage round robin scheduler to initiate the scheduling process for the corresponding disperser operation. The triggered disperser operation could be for the VD level disperser, the QoS level disperser, or the superblock level disperser, depending on the nature of the event and the tenant isolation level where the event occurred.

At block 3540, the multi-tenant storage system segregates, using separate superblock-specific linked lists, a plurality of QoS domain specific commands of the QoS domain specific linked lists based on each of the plurality of QoS domain specific commands respective superblock identifiers or placement identifiers. For example, block 3540 includes the further sorting within each QoS domain based on their superblock or placement identifiers, maintaining isolation at the superblock level within each QoS domain. In some arrangements, the superblock-specific linked lists can be sorted based on additional criteria, such as the age or priority of the commands, to improve the overall performance of the storage system.

At block 3550, the multi-tenant storage system segregates a plurality of superblock specific commands of the superblock-specific in-place linked lists. In one aspect, this is segregated using superblock level dispersion which provides that write commands belonging to different superblock IDs are processed separately to minimize interference and ensure predictable latency. In some arrangements, the superblock-specific commands are segregated based on the superblock ID or placement ID that they belong to, and are organized into separate superblock-specific linked lists. Each of these lists corresponds to a specific superblock ID or placement ID within one of the plurality of QoS domains, allowing for efficient management and allocation of resources.

In some arrangements, the segregation of superblock-specific commands also allows the multi-tenant storage system to optimize the allocation of physical NAND flash resources. For example, if a particular superblock is experiencing high write traffic, the system can allocate more physical NAND flash resources to that superblock to ensure optimal performance. Conversely, if a superblock is experiencing low write traffic, the system can allocate fewer physical NAND flash resources to that superblock, thereby optimizing the use of physical resources across the entire storage device.

In one example, with reference to blocks 3540-3550, assume there are three clients A, B, and C, each with two VDs and two QoS domains. Within each QoS domain, there are three superblocks with identifiers SB1, SB2, and SB3. In this example, client A sends a batch of write commands for VD1 in QoS domain 1, which are added to the VD1-QoS1 linked list. Client B sends a batch of write commands for VD2 in QoS domain 2, which are added to the VD2-QoS2 linked list. Client C sends a batch of write commands for VD2 in QoS domain 1, which are added to the VD2-QoS1 linked list. At block 3540, the system separates the commands into superblock-specific linked lists. The VD1-QoS1 list is divided into three linked lists for SB1, SB2, and SB3. The VD2-QoS2 list is also divided into three linked lists for SB1, SB2, and SB3. The VD2-QoS1 list is divided into three linked lists for SB1, SB2, and SB3. At block 3550, the system begins processing the commands in each superblock-specific linked list, starting with a highest priority list (e.g., implementing a multi-stage round robin scheduler to process the commands with reference to FIG. 18).

At block 3560, the multi-tenant storage system provides one or more superblock-specific linked list identifiers of the superblock-specific linked lists to a write divider. For example, block 3560 includes dividing the commands in NAND flash units. In some arrangements, the write divider can utilize a multi-stage round robin scheduler to ensure fair distribution of resources and maintain tenant isolation at different levels of the storage system hierarchy. In other arrangements, the write divider can be designed to adapt to various configurations or requirements, offering a flexible and scalable solution for managing multi-tenant storage systems.

In some arrangements, processing, using a round robin scheduler, a plurality of superblock commands of the superblock-specific linked lists based on distributing the plurality of superblock commands into NAND flash units and providing the distributed plurality of superblock commands to individual die managers.

In some arrangements, a plurality of VD specific in-place linked lists maintain tenant isolation at the VD level based on the VD level disperser organizing the plurality of VD specific commands in separate VD lists, each VD list corresponding to one of the plurality of VDs, wherein a plurality of QoS specific in-place linked lists maintain tenant isolation at the QoS domain level based on the QoS level disperser organizing the plurality of QoS domain specific commands in separate QoS lists, each QoS list corresponding to one of the plurality of VDs, and wherein a plurality of superblock specific in-place linked lists maintain tenant isolation at the superblock level based on the superblock level disperser organizing the plurality of superblock commands in separate superblock lists, each superblock list corresponding to a specific superblock identifier or placement identifier within one of the plurality of QoS domains. In particular, in some arrangements, the VD-specific in-place linked lists are designed to maintain tenant isolation at the VD level by using a VD level disperser that organizes the plurality of VD specific commands into separate VD lists. Each VD list corresponds to one of the plurality of VDs, ensuring that commands associated with different VDs are kept separate and their resources are fairly allocated.

Similarly, the QOS-specific in-place linked lists maintain tenant isolation at the QoS domain level by utilizing a QoS level disperser that organizes the plurality of QoS domain specific commands into separate QoS lists. Each QoS list corresponds to a distinct QoS domain within the VDs, allowing for fine-grained control over resource allocation and performance based on the specific requirements of each QoS domain. The superblock-specific in-place linked lists provide an additional layer of tenant isolation at the superblock level. The superblock level disperser organizes the plurality of superblock commands into separate superblock lists, with each superblock list corresponding to a specific superblock identifier or placement identifier within one of the plurality of QoS domains. This design allows for even more granular control over the scheduling and allocation of resources, ensuring that the storage system can accommodate a wide range of workloads and performance requirements. By implementing tenant isolation at multiple levels through the use of in-place linked lists, the storage system can achieve a high degree of flexibility and efficiency, while minimizing or reducing memory footprint and overhead. This multi-level approach to tenant isolation enables the storage system to effectively manage diverse workloads, maintain fairness among tenants, and deliver optimal performance across various VDs, QoS domains, and superblocks.

In some arrangements, wherein each of the plurality of VD specific commands, the plurality of QoS domain specific commands, and the plurality of superblock commands include the plurality of new write commands, and wherein each of the VD specific linked lists, the QoS domain specific linked lists, and the superblock-specific linked lists is an in-place linked list. In particular, the new write commands are classified and organized according to their respective VD, QoS domain, and superblock. In some arrangements, the in-place linked list maintains tenant isolation at a plurality of tenant isolations levels, the plurality of tenant isolations levels include at least a VD level, a QoS domain level, and a superblock level, and wherein the in-place linked list includes head and tails pointers for each tenant isolation level of the plurality of tenant isolations levels.

In some arrangements, the multi-stage round robin scheduler maintains (1) fairness among a plurality of VDs, a plurality of QoS domains, and superblock identifiers or the placement identifiers for processing based on adjusting a selection frequency associated with a workload and priority of each tenant isolation level of the plurality of tenant isolation levels, and (2) tenant isolation based on scheduling commands from different VDs, different QoS domains, and different superblock identifiers or different placement identifiers.

In some arrangements, the multi-tenant storage system first receives write commands associated with a plurality of virtual devices (VDs) and a plurality of Quality of Service (Qos) domains. These write commands can be segregated based on different parameters to ensure tenant isolation. Hence, at the next step, the write commands are segregated into a plurality of first segregated write commands for respective VDs. Further, the plurality of first segregated write commands are segregated into a plurality of second segregated write commands for respective QoS domains within each VD. This provides QoS based isolation and prioritization. Following this, the plurality of second segregated write commands are segregated into a plurality of third segregated write commands for superblock IDs within each QoS domain. This provides segregation to maintain tenant isolation across superblock IDs, which enables efficient use of the NAND flash memory. Finally, the plurality of third segregated write commands can be divided into NAND flash units based on NAND die WLSTRs. The division is important as it enables efficient use of the NAND flash memory and increases the lifespan of the flash memory. This entire process ensures tenant isolation, optimal use of NAND flash memory, and increases the performance and lifespan of the flash memory.

The segregated write commands are a way of organizing the incoming write commands into separate groups based on their associated VDs, QoS domains, and superblock IDs. The first segregation separates the write commands into groups based on their respective VDs. This allows for tenant isolation at the VD level, meaning that write commands associated with one VD will not affect the latency of commands associated with another VD. The second segregation separates the write commands further by organizing them into groups based on their associated QoS domains within each VD. This enables tenant isolation at the QoS domain level, ensuring that write commands associated with one QoS domain will not affect the latency of commands associated with another QoS domain within the same VD. The third segregation separates the write commands even further by organizing them into groups based on their associated superblock IDs within each QoS domain. This enables tenant isolation at the superblock level, ensuring that write commands associated with one superblock ID will not affect the latency of commands associated with another superblock ID within the same QoS domain.

In some arrangements, once the write commands have been segregated into these different groups, they are divided into NAND flash units based on NAND die WLSTRs. This ensures that the write commands are programmed onto the NAND flash in an efficient and optimized manner, maximizing storage utilization and performance while maintaining data integrity and consistency. Overall, this process of segregating and dividing write commands enables the multi-tenant storage system to efficiently manage and store data across multiple levels of the SEF device hierarchy, while maintaining tenant isolation and predictable latency for each tenant.

The process of dividing the third segregated write commands into NAND flash units based on NAND die WLSTRs involves organizing the write commands into groups that can be programmed in parallel onto specific NAND die WLSTRs. In other words, the write commands are divided into subsets that are assigned to specific NAND die WLSTRs in a way that optimizes the parallelism of the programming process. This organization provides that the SSD can operate at maximum efficiency, since the programming of each subset of commands onto a specific NAND die WLSTR can be performed in parallel with the programming of other subsets onto other NAND die WLSTRs. By dividing the write commands into subsets and assigning them to specific NAND die WLSTRs, the SSD is able to take advantage of the parallelism offered by its architecture and perform programming operations in an efficient and timely manner.

Figure 36:
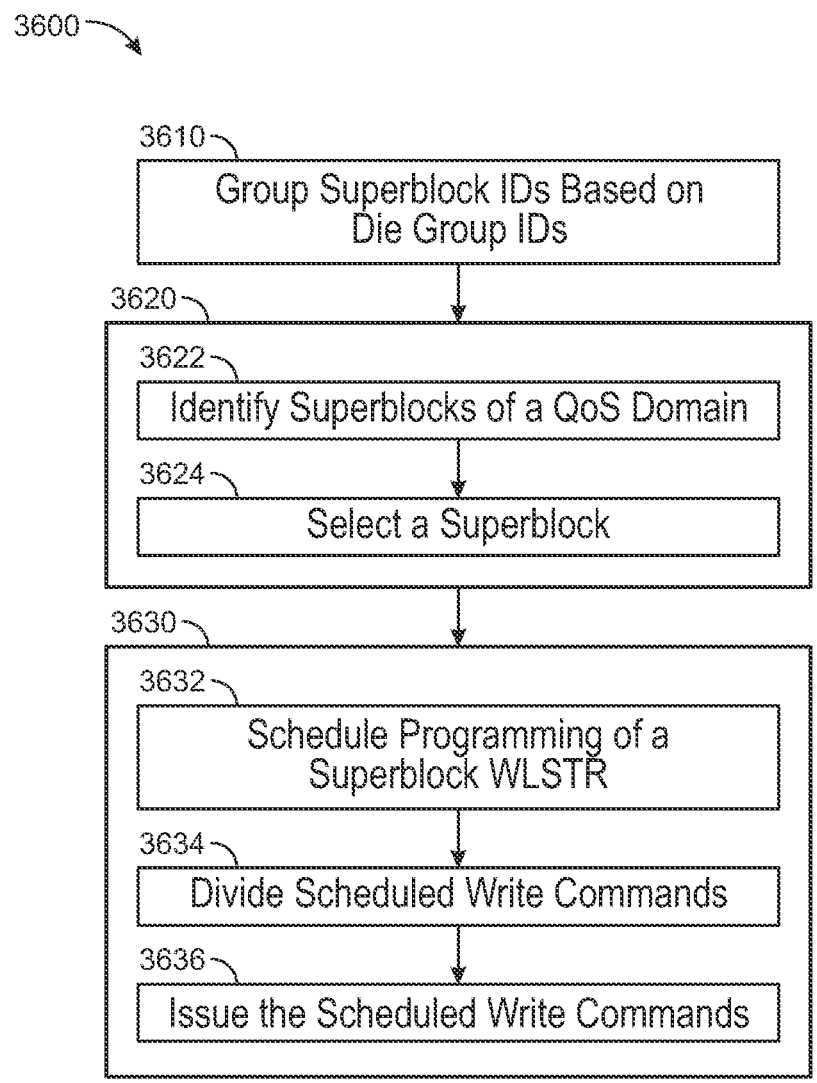
FIG. 36 depicts a flowchart for a method of managing data storage in a multi-tenant storage system, according to some arrangements.

Referring now to FIG. 36, is a flowchart for a method 3600 of managing data storage in a multi-tenant storage system, according to some arrangements. A multi-tenant storage system, such as data storage management architecture 3400, can be configured to perform method 3600. Further, any computing device or system described herein can be configured to perform method 3600.

In broad overview of method 3600, at block 3610, the multi-tenant storage system can group superblock IDs based on die group IDs. At block 3620, the multi-tenant storage system can identify superblocks of a QoS domain and select a superblock. At block 3630, the multi-tenant storage system schedule programming of a superblock WLSTR belonging a QoS domain, divide the scheduled write commands into NAND Flash units, and issue the scheduled write commands for programming. In some embodiments, some or all operations of method 3600 may be performed by one or more systems of the data storage management architecture 3400 or other systems described herein. In various embodiments, each operation may be added, removed, or repeated. In some arrangements, blocks can be optionally executed by the one or more systems of the data storage management architecture 3400.

At block 3610, the multi-tenant storage system can group (or segregate, or aggregate) a plurality of superblock IDs belonging to a QoS domain based on a plurality of die group IDs. The storage system may include NAND memory dies, where each die group ID corresponds to a group of dies that can be accessed simultaneously, enabling parallelism and optimized performance. In block 3610, the multi-tenant storage system assigns each superblock ID to a specific die group ID. Superblocks, which represent a collection of data blocks or storage units within the storage system, are then grouped based on their die group IDs. This grouping provides that data associated with different die groups are managed separately, enabling efficient storage management and reduced interference between concurrent operations on different die groups.

In some arrangements, the segregation process provides the storage system to maintain die parallelism, wherein simultaneous data access, read, and write operations can occur on multiple die groups within a VD. This parallelism contributes to the overall performance and efficiency of the storage system by maximizing the utilization of die bandwidth. Furthermore, by segregating superblock IDs based on die group IDs, the multi-tenant storage system can efficiently allocate resources and manage data access for different tenants or QoS domains. Each QoS domain may have specific requirements or priorities, and the segregation of superblocks based on die group IDs helps ensure that these requirements are met while maintaining tenant isolation and minimizing the impact of one tenant's activities on another.

In some arrangements, process of segregating write commands is based on various factors, including a plurality of virtual devices, a plurality of QoS domains, and the plurality of superblock IDs. The virtual devices can represent physical partitions of the NAND media, while the QoS domains correspond to groups of tenants or users within the virtual devices with specific performance requirements or priorities. The segregation of write commands helps to manage resource allocation and maintain tenant isolation effectively. In some arrangements, the plurality of die group IDs are used to segregate the plurality of superblock IDs by assigning a unique die group ID to each die group of a plurality of die groups and associating each of the plurality of superblock IDs with a respective die group ID of the plurality of die group IDs.

At block 3620, the multi-tenant storage system can identify one or more superblocks of the plurality of superblock IDs in a first Quality of Service (QOS) domain of a first die group ID of the plurality of die group IDs that have completed at least one wordline string (WLSTR) (e.g., block 3622), and select a first superblock of the one or more superblocks in the first QoS domain based on weights of atomic data unit (ADUs) within each WLSTR of the one or more superblocks (e.g., block 3624). In some arrangements, the multi-tenant storage system identifies one or more superblocks of the plurality of superblock IDs in a first Quality of Service (QOS) domain of a first die group ID of the plurality of die group IDs that have completed at least one wordline string (WLSTR) and selects a first superblock of the one or more superblocks in the first QoS domain based on weights of atomic data units (ADUs) within each WLSTR of the one or more superblocks.

In this stage, the multi-tenant storage system focuses on the management of data access and storage within a specific QoS domain, which represents a group of tenants with similar performance requirements, latency requirements or priorities. In some arrangements, the storage system first identifies superblocks that have completed at least one WLSTR within the first Qos domain. A wordline string (WLSTR) is the minimum programming unit in a NAND die. In TLC NAND a full sequence program unit consists of lower, middle and upper pages in a multi-plane block. A superblock WLSTR can be made of 1 WLSTR across all dies in the superblock. Once the storage system identifies the superblocks that have completed at least one superblock WLSTR in the first QoS domain, it proceeds to select a first superblock among them for the next operation. This selection is based on the weights of ADUs within each WLSTR of the identified superblocks. ADUs represent the individual data units within a WLSTR that are available for atomic read and write operations. The weights assigned to these ADUs may depend on various factors, such as the priority of the data.

In one aspect, selecting the first superblock for the programming operation is further based on a deficit round robin model. This model involves maintaining a deficit counter for each superblock of the one or more superblocks identified in the first QoS domain. Each deficit counter is incremented for each superblock based on the weights of ADUs within the corresponding WLSTR. In some arrangements, the deficit round robin model selects the first superblock for scheduling when the corresponding deficit counter of the first superblock is greater than or equal to the size of a corresponding write command ADU of the WLSTR. In some arrangements, the weights of ADUs within each WLSTR identifies a priority of write commands within each WLSTR, and wherein the first QoS domain weight of the first QoS domain comprises a value identifying a priority of the first QoS domain. Additional round robin models or algorithm are described above and can be implemented in combination with or separately from the deficit round robin model.

It should be understood that a write command ADU and the write command itself serve different purposes in the context of a storage system. A write command ADU is the unit of data to be written or read atomically to the storage system. For example, it can be the smallest addressable and transferable data unit within the system. The ADU carries the actual content or data that needs to be stored, such as user files or system metadata. A write command is an instruction issued to the storage system to perform a write operation. For example, it can contain information about the target location where the ADU should be written, as well as other relevant details needed for the system to execute the operation correctly. In some arrangements, the write command does not contain the actual data to be stored but rather directs the storage system on how and where to store the data represented by the ADU.

At block 3630, the multi-tenant storage system can schedule the first QoS domain with the first superblock or a second QoS domain with a second superblock to program to a die group associated with the first die group ID, wherein scheduling either the first QoS domain or the second QoS domain is based on a first QoS domain weight of the first QoS domain and a second QoS domain weight of the second QoS domain (e.g., block 3632), in response to scheduling the first QoS domain, segregate (or divides) a plurality of scheduled write commands of the first QoS domain into die units for programming (e.g., block 3634), and issue (or provide) the plurality of scheduled write commands to a die manager for the programming (e.g., 3636).

In some arrangements, the multi-tenant storage system schedules the first QoS domain with the first superblock or a second QoS domain with a second superblock to program to a die group associated with the first die group ID. This scheduling decision takes into account the priorities and requirements of different QoS domains within the multi-tenant storage system. In some arrangements, the scheduling process can be based on the first QoS domain weight of the first QoS domain and the second QoS domain weight of the second QoS domain, which represent the relative importance or priority assigned to each QoS domain within the storage system. The multi-tenant storage system can use a scheduling algorithm, such as a weighted round robin algorithm, to determine which QoS domain should be scheduled for the next programming operation. This algorithm considers the weights of the QoS domains and ensures that each domain receives a fair share of resources and processing time, while also maintaining tenant isolation and predictable latency across the QoS domains.

Upon scheduling the first QoS domain for programming, the storage system proceeds to segregate (or divide) a plurality of scheduled write commands of the first QoS domain into die units. This step involves dividing the write commands into smaller units that can be individually programmed to the memory dies within the die group associated with the first die group ID. Segregating the write commands into die units enables parallel programming operations, which can improve the overall performance and efficiency of the storage system.

Once the scheduled write commands have been segregated into die units, the storage system issues (or provides) these commands to a die manager responsible for overseeing the programming operations. The die manager coordinates the execution of the write commands in the die unit and ensures that the data is written to the appropriate memory locations within the die. Additionally, the scheduling of the first QoS domain or the second QoS domain is further based on a weighted round robin scheduling model and QoS domain weight. The weighted round robin scheduling model assigns different priorities to the QoS domains based on their weights and aims to maintain tenant isolation and predictable latency across the domains. Upon scheduling a QoS domain, the multi-tenant storage system includes segregating the plurality of scheduled write commands by dividing the first superblock to corresponding die units within the die group.

Implementing the weighted round robin scheduling model involves several steps to manage resource allocation and maintain tenant isolation across multiple QoS domains. The steps can include, but are not limited to: (1) assigning the first QoS domain weight and the second QoS domain weight: The model begins by assigning weights to the first and second QoS domains. These weights represent the relative importance or priority of each domain within the storage system and are used to determine the share of resources and processing time that each domain receives; (2)

maintaining a first maximum credit value and a first current credit value for the first QoS domain based on the first QoS domain weight and a second maximum credit value and a second current credit value for the second QoS domain based on the second QoS domain weight: maintaining a first maximum credit value and a first current credit value for the first QoS domain based on the first QoS domain weight provides that the system keeps track of the maximum and current credit values for the first QoS domain, which are determined by its assigned weight. Similarly, a second maximum credit value and a second current credit value are maintained for the second QoS domain, reflecting the importance and priority of that domain as determined by its weight; (3) selecting the first QoS domain or the second QoS domain based on at least on the first QoS domain weight, the second QoS domain weight, and an available credit of the first QoS domain and the second QoS domain: selecting the first QoS domain or the second QoS domain based on at least the first QoS domain weight, the second QoS domain weight, and an available credit of the first QoS domain and the second QoS domain provides that the system chooses between the two QoS domains for processing based on their respective weights and current available credit values. This ensures that the scheduling decision takes into account the priority of each domain, as well as the resources allocated to them, providing a fair and efficient distribution of processing resources; and (4) decrementing the first current credit value based on the first Qos domain weight of the first QoS domain: Once the first QoS domain has been selected and scheduled, the model decrements its current credit value by a predetermined value or based on the size of a write command ADU of the WLSTR. This adjustment reflects the resource allocation and processing time that the QoS domain has received and ensures that the credit values remain balanced across the domains, maintaining fairness in resource allocation.

In some arrangements, after block 3630, the multi-tenant storage system can receive a plurality of scheduled write commands that may originate from various sources such as user applications or internal processes. Once the write commands are received, the multi-tenant storage system can compare the priorities of the scheduled write commands with those of other commands in the queue to determine their relative importance. Based on this priority comparison, the multi-tenant storage system can select the next set of write commands to be programmed. During this selection process, the multi-tenant storage system can allocate internal write buffer space and populates source and destination addresses in a write pointer list, ensuring that the chosen write commands are properly prepared for programming and that the data is accurately stored in the memory.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A system comprising:
   a virtual device (VD) level disperser configured to:
   segregate new write commands based on each of the plurality of new write commands respective VD identifiers; and
   maintain separate VD specific in-place linked lists for each VD of a plurality of VDs;
   a Quality of Service (QOS) level disperser configured to:
   segregate a plurality of VD specific commands of the VD specific in-place linked lists based on each of the plurality of VD specific commands respective QoS domain identifiers; and
   maintain separate QoS domain specific linked lists for each QoS domain of a plurality of QoS domains within the respective VD of the plurality of VDs;
   a superblock level disperser configured to:
   segregate a plurality of QOS domain specific commands of the QoS domain specific in-place linked lists based on each of the plurality of QoS domain specific commands respective superblock identifiers or placement identifiers;
   maintain separate superblock-specific in-place linked lists for each superblock identifier or placement identifier within a respective QoS domain of the plurality of QoS domains; and
   provide the superblock-specific in-place linked lists to a write divider.

2. The system of claim 1, further comprising:
   the write divider configured to process, using a multi-stage round robin scheduler, a plurality of superblock commands of the superblock-specific in-place linked lists based on distributing the plurality of superblock commands into NAND flash units and providing the distributed plurality of superblock commands to individual die managers.

3. The system of claim 2, wherein each of the plurality of VD specific commands, the plurality of QOS domain specific commands, and the plurality of superblock commands comprise the new write commands.

4. The system of claim 3, wherein each of in-place linked lists maintains tenant isolation at a plurality of tenant isolations levels, the plurality of tenant isolations levels comprise at least a VD level, a QoS domain level, and a superblock level, and wherein each of the in-place linked lists comprises head and tails pointers for each tenant isolation level of the plurality of tenant isolations levels.

5. The system of claim 4, wherein a plurality of VD specific in-place linked lists maintain tenant isolation at the VD level based on the VD level disperser organizing the plurality of VD specific commands in separate VD lists, each VD list corresponding to one of the plurality of VDs, wherein a plurality of QOS specific in-place linked lists maintain tenant isolation at the QoS domain level based on the QoS level disperser organizing the plurality of QoS domain specific commands in separate QoS lists, each QoS list corresponding to one of the plurality of VDs, and wherein a plurality of superblock specific in-place linked lists maintain tenant isolation at the superblock level based on the superblock level disperser organizing the plurality of superblock commands in separate superblock lists, each superblock list corresponding to a specific superblock identifier or placement identifier within one of the plurality of QoS domains.

6. The system of claim 1, wherein each of the separate VD specific in-place linked lists is one of a plurality of in-place linked lists and share a same memory structure comprising a plurality of command indices, VD head pointers, and VD tail pointers, wherein the separate VD specific in-place linked list is processed sequentially in a first-in-first-out (FIFO) routine by the VD level disperser, wherein the separate VD specific in-place linked list does not comprise a previous pointer.

7. The system of claim 1, wherein a multi-stage round robin scheduler is implemented with a plurality of stages, each of the plurality of stages corresponding to a different level of tenant isolation of a plurality of tenant isolation levels, and wherein the multi-stage round robin scheduler comprises a first stage for the VD level disperser, a second stage for the QoS level disperser, and a third stage for the superblock level disperser.

8. The system of claim 7, wherein the multi-stage round robin scheduler maintains:
fairness among the plurality of VDs, the plurality of QoS domains, and the superblock identifiers or the placement identifiers for processing based on adjusting a selection frequency associated with a workload and priority of each tenant isolation level of the plurality of tenant isolation levels; and
tenant isolation based on scheduling commands from different VDs, different QoS domains, and different superblock identifiers or different placement identifiers.

9. The system of claim 7, wherein the multi-stage round robin scheduler is triggered by an event scheduler when any event in any tenant isolation level of the plurality of tenant isolation levels is set, and in response to triggering, initiating a scheduling process for a corresponding disperser operation of at least one of the VD level disperser, the QoS level disperser, or the superblock level disperser.

10. The system of claim 1, wherein the VD level disperser, the QoS level disperser, and the superblock level disperser are further configured to concurrently process commands in different tenant isolation levels.

11. A method comprising:
receiving new write commands associated with a plurality of virtual devices (VDs) and a plurality of Quality of Service (QOS) domains;
segregating, using separate VD specific in-place linked lists, the new write commands based on each of the new write commands respective VD identifiers;
segregating, using separate QoS domain specific in-place linked lists, a plurality of VD specific commands of the VD specific in-place linked lists based on each of the plurality of VD specific commands respective QoS domain identifiers;
segregating, using separate superblock-specific in-place linked lists, a plurality of QoS domain specific commands of the QoS domain specific in-place linked lists based on each of the plurality of QoS domain specific commands respective superblock identifiers or placement identifiers; and
providing one or more superblock-specific in-place linked list identifiers of the superblock-specific in-place linked lists to a write divider.

12. The method of claim 11, further comprising:
processing, using a round robin scheduler, a plurality of superblock commands of the superblock-specific in-place linked lists based on distributing the plurality of superblock commands into NAND flash units and providing the distributed plurality of superblock commands to individual die managers.

13. The method of claim 12, wherein each of the plurality of VD specific commands, the plurality of QoS domain specific commands, and the plurality of superblock commands comprise the new write commands.

14. The method of claim 13, wherein each of the in-place linked lists maintains tenant isolation at a plurality of tenant isolations levels, the plurality of tenant isolations levels comprise at least a VD level, a QoS domain level, and a superblock level, and wherein each of the in-place linked lists comprises head and tails pointers for each tenant isolation level of the plurality of tenant isolations levels.

15. The method of claim 11, wherein a multi-stage round robin scheduler is implemented with a plurality of stages, each of the plurality of stages corresponding to a different level of tenant isolation of a plurality of tenant isolation levels, and wherein the multi-stage round robin scheduler comprises a first stage for a VD level disperser, a second stage for a QoS level disperser, and a third stage for a superblock level disperser.

16. The method of claim 15, wherein the multi-stage round robin scheduler maintains:
fairness among a plurality of VDs, a plurality of QoS domains, and superblock identifiers or the placement identifiers for processing based on adjusting a selection frequency associated with a workload and priority of each tenant isolation level of the plurality of tenant isolation levels;
tenant isolation based on scheduling commands from different VDs, different QoS domains, and different superblock identifiers or different placement identifiers.

17. The method of claim 15, wherein the multi-stage round robin scheduler is triggered by an event scheduler when any event in any tenant isolation level of the plurality of tenant isolation levels is set, and in response to triggering, initiating a scheduling process for a corresponding disperser operation of at least one of the VD level disperser, the QoS level disperser, or the superblock level disperser.

18. A method comprising:
receiving write commands associated with a plurality of virtual devices (VDs) and a plurality of Quality of Service (QOS) domains;
segregating the write commands into a plurality of first segregated write commands for respective VDs;
segregating the plurality of first segregated write commands into a plurality of second segregated write commands for respective QoS domains within each VD;
segregating the plurality of second segregated write commands into a plurality of third segregated write commands for superblock IDs within each QoS domain; and
dividing the plurality of third segregated write commands into NAND flash units based on NAND die wordline strings (WLSTRs).

19. The method of claim 18, wherein segregating the write commands into the plurality of first segregated write commands for the respective VDs comprises implementing a VD specific in-place linked list of next pointers to maintain tenant isolation at a VD level, wherein segregating the plurality of first segregated write commands into the plurality of second segregated write commands for the respective QoS domains within the each VD comprises implementing a QoS domain specific in-place linked list of next pointers to maintain the tenant isolation at a QoS domain level within each VD, and wherein the segregating the plurality of second segregated write commands into the plurality of third segregated write commands for the superblock IDs within the each QoS domain comprises using a superblock specific in-place linked list of next pointers to maintain the tenant isolation for data of different placement IDs or superblock IDs in a respective QoS domain of the plurality of QoS domains.

20. The method of claim 18, wherein a multi-stage round robin scheduler is implemented with a plurality of stages, each of the plurality of stages corresponding to a different level of tenant isolation of a plurality of tenant isolation levels, and wherein the multi-stage round robin scheduler comprises a first stage for segregating the write commands into the plurality of first segregated write commands, a second stage for the segregating the plurality of first segregated write commands into the plurality of second segregated write commands, and a third stage for segregating the plurality of second segregated write commands into the plurality of third segregated write commands.

* * * * *